US011653327B2

(12) United States Patent
Abedini et al.

(10) Patent No.: US 11,653,327 B2
(45) Date of Patent: May 16, 2023

(54) PAGING INDICATING SYSTEM INFORMATION CHANGE

(71) Applicant: QUALCOMM Incorporated, San Diego, CA (US)

(72) Inventors: Navid Abedini, Basking Ridge, NJ (US); Jianghong Luo, Skillman, NJ (US); Karl Georg Hampel, Hoboken, NJ (US); Luca Blessent, Whitehouse Station, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/171,648

(22) Filed: Feb. 9, 2021

(65) Prior Publication Data

US 2021/0250898 A1    Aug. 12, 2021

Related U.S. Application Data

(60) Provisional application No. 62/972,593, filed on Feb. 10, 2020.

(51) Int. Cl.
*H04W 68/00* (2009.01)
*H04W 48/12* (2009.01)
*H04W 72/23* (2023.01)

(52) U.S. Cl.
CPC ......... *H04W 68/005* (2013.01); *H04W 48/12* (2013.01); *H04W 72/23* (2023.01)

(58) Field of Classification Search
CPC .. H04W 68/005; H04W 48/12; H04W 72/042
See application file for complete search history.

(56) References Cited

U.S. PATENT DOCUMENTS

2019/0021014 A1* 1/2019 Martin ................. H04W 24/02
2021/0007088 A1* 1/2021 Zhou .................... H04W 72/044

FOREIGN PATENT DOCUMENTS

EP          3281423 A1    2/2018
WO       2018144873 A1    8/2018

OTHER PUBLICATIONS

International Search Report and Written Opinion—PCT/US2021/017405—ISA/EPO—dated May 25, 2021.

\* cited by examiner

*Primary Examiner* — Farid Seyedvosoghi
(74) *Attorney, Agent, or Firm* — Arun Swain; Loza & Loza LLP

(57) ABSTRACT

Aspects relate to using different paging techniques for different sets of scheduled entities. In some examples, different paging message configurations are assigned to different sets of scheduled entities. In some examples, different paging resources are assigned to different sets of scheduled entities. In some examples, different paging-radio network temporary identifiers (P-RNTIs) are assigned to different sets of scheduled entities. In some examples, different SI modification fields indicate SI changes for different sets of scheduled entities. In some examples, different sets of scheduled entities use different paging search spaces. In some examples, different sets of scheduled entities use different paging parameters.

28 Claims, 32 Drawing Sheets

| VALUE (HEXA-DECIMAL) | RNTI |
|---|---|
| 0000 | N/A |
| 0001 - FFEF | RA-RNTI, TEMPORARY C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, AND SP-CSI-RNTI |
| FFF0 - FFFD | RESERVED |
| FFFE | P-RNTI |
| FFFF | SI-RNTI |

FIG. 4

DCI FORMAT 1_0 — 500

| CONTENTS | DESCRIPTION |
|---|---|
| SHORT MESSAGE INDICATOR | 2 BITS. |
| SHORT MESSAGES | 8 BITS. IF ONLY THE SCHEDULING INFORMATION FOR PAGING IS CARRIED, THIS BIT FIELD IS RESERVED. |
| FREQUENCY DOMAIN RESOURCE ASSIGNMENT | NUMBER OF BITS BASED ON SIZE OF CORESET 0. IF ONLY THE SHORT MESSAGE IS CARRIED, THIS BIT FIELD IS RESERVED. |
| TIME DOMAIN RESOURCE ASSIGNMENT | 4 BITS. IF ONLY THE SHORT MESSAGE IS CARRIED, THIS BIT FIELD IS RESERVED. |
| VRB-TO-PRB MAPPING | 1 BIT. IF ONLY THE SHORT MESSAGE IS CARRIED, THIS BIT FIELD IS RESERVED. |
| MODULATION AND CODING SCHEME | 5 BITS. IF ONLY THE SHORT MESSAGE IS CARRIED, THIS BIT FIELD IS RESERVED. |
| TB SCALING | 2 BITS. IF ONLY THE SHORT MESSAGE IS CARRIED, THIS BIT FIELD IS RESERVED. |
| RESERVED | 6 BITS. IF ONLY THE SHORT MESSAGE IS CARRIED, THIS BIT FIELD IS RESERVED. |

502 — SHORT MESSAGE INDICATOR
504 — SHORT MESSAGES
506 — FREQUENCY DOMAIN RESOURCE ASSIGNMENT / TIME DOMAIN RESOURCE ASSIGNMENT / VRB-TO-PRB MAPPING / MODULATION AND CODING SCHEME / TB SCALING
508 — RESERVED

FIG. 5

| BIT FIELD | SHORT MESSAGE INDICATOR |
|---|---|
| 00 | RESERVED |
| 01 | ONLY SCHEDULING INFORMATION FOR PAGING IS PRESENT IN THE DCI |
| 10 | ONLY SHORT MESSAGE IS PRESENT IN THE DCI |
| 11 | BOTH SCHEDULING INFORMATION FOR PAGING AND SHORT MESSAGE ARE PRESENT IN THE DCI |

FIG. 6

| BIT | SHORT MESSAGE |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 - 8 | Not used in this release of the specification, and shall be ignored by UE if received. |

FIG. 7

PAGING INDICATING SYSTEM INFORMATION CHANGE

CROSS-REFERENCE TO RELATED APPLICATIONS

The present application for patent claims priority to and the benefit of U.S. Provisional Application No. 62/972,593, titled "PAGING INDICATING SYSTEM INFORMATION CHANGE" filed Feb. 10, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to techniques for paging different sets of scheduled entities to indicate a change in system information (SI).

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a scheduled entity such as a user equipment (UE) may access a first cell of a first scheduling entity (e.g., a base station, such as a gNode B (gNB)) and/or access a second cell of a second scheduling entity.

In 5G NR wireless communication networks, a scheduling entity transmits SI that includes, for example, parameters that a scheduled entity uses to gain access to the network. Examples of SI may include, but are not limited to, subcarrier spacing, system frame number, cell bar indication, a list of common control resource sets, a list of common search spaces, a paging search space, a random access search space, and uplink configuration information.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a first scheduled entity may include receiving a first message from a scheduling entity and determining based on the first message that there is a first system information (SI) change for a first set of scheduled entities. The first set of scheduled entities may include the first scheduled entity and may be a subset of a plurality of scheduled entities. The method may also include monitoring a channel for the first SI change.

In some examples, a first scheduled entity may include a transceiver, a memory, and a processor communicatively coupled to the transceiver and the memory. The processor and the memory may be configured to receive a first message from a scheduling entity via the transceiver and determine based on the first message that there is a first system information (SI) change for a first set of scheduled entities. The first set of scheduled entities may include the first scheduled entity and may be a subset of a plurality of scheduled entities. The processor and the memory may also be configured to monitor a channel for the first SI change.

In some examples, a first scheduled entity may include means for receiving a first message from a scheduling entity and means for determining based on the first message that there is a first system information (SI) change for a first set of scheduled entities. The first set of scheduled entities may include the first scheduled entity and may be a subset of a plurality of scheduled entities. The first scheduled entity may also include means for monitoring a channel for the first SI change.

In some examples, an article of manufacture for use by a first scheduled entity includes a computer-readable medium having stored therein instructions executable by one or more processors of the first scheduled entity to receive a first message from a scheduling entity and determine based on the first message that there is a first system information (SI) change for a first set of scheduled entities. The first set of scheduled entities may include the first scheduled entity and may be a subset of a plurality of scheduled entities. The computer-readable medium may also have stored therein instructions executable by one or more processors of the first scheduled entity to monitor a channel for the first SI change.

In some examples, a method for wireless communication at a scheduling entity may include determining that there is a first system information (SI) change for a first set of scheduled entities. The first set of scheduled entities may be a subset of a plurality of scheduled entities. The method may also include generating a first message including a first indication of the first SI change and transmitting the first message to the first set of scheduled entities.

In some examples, a scheduling entity may include a transceiver, a memory, and a processor communicatively coupled to the transceiver and the memory. The processor and the memory may be configured to determine that there is a first system information (SI) change for a first set of scheduled entities. The first set of scheduled entities may be a subset of a plurality of scheduled entities. The processor and the memory may also be configured to generate a first message including a first indication of the first SI change and transmit the first message to the first set of scheduled entities via the transceiver.

In some examples, a scheduling entity may include means for determining that there is a first system information (SI) change for a first set of scheduled entities. The first set of scheduled entities may be a subset of a plurality of scheduled entities. The scheduling entity may also include means for generating a first message including a first indication of the first SI change and means for transmitting the first message to the first set of scheduled entities.

In some examples, an article of manufacture for use by a scheduling entity includes a computer-readable medium having stored therein instructions executable by one or more processors of the scheduling entity to determine that there is a first system information (SI) change for a first set of scheduled entities. The first set of scheduled entities may be a subset of a plurality of scheduled entities. The computer-readable medium may also have stored therein instructions executable by one or more processors of the scheduling entity to generate a first message including a first indication of the first SI change and transmit the first message to the first set of scheduled entities.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 4 illustrates an example of a radio network temporary identifier (RNTI) table according to some aspects.

FIG. 5 illustrates an example of a downlink control information (DCI) according to some aspects.

FIG. 6 illustrates an example of a short message indicator according to some aspects.

FIG. 7 illustrates an example of a short message according to some aspects.

DETAILED DESCRIPTION

Figure 1:
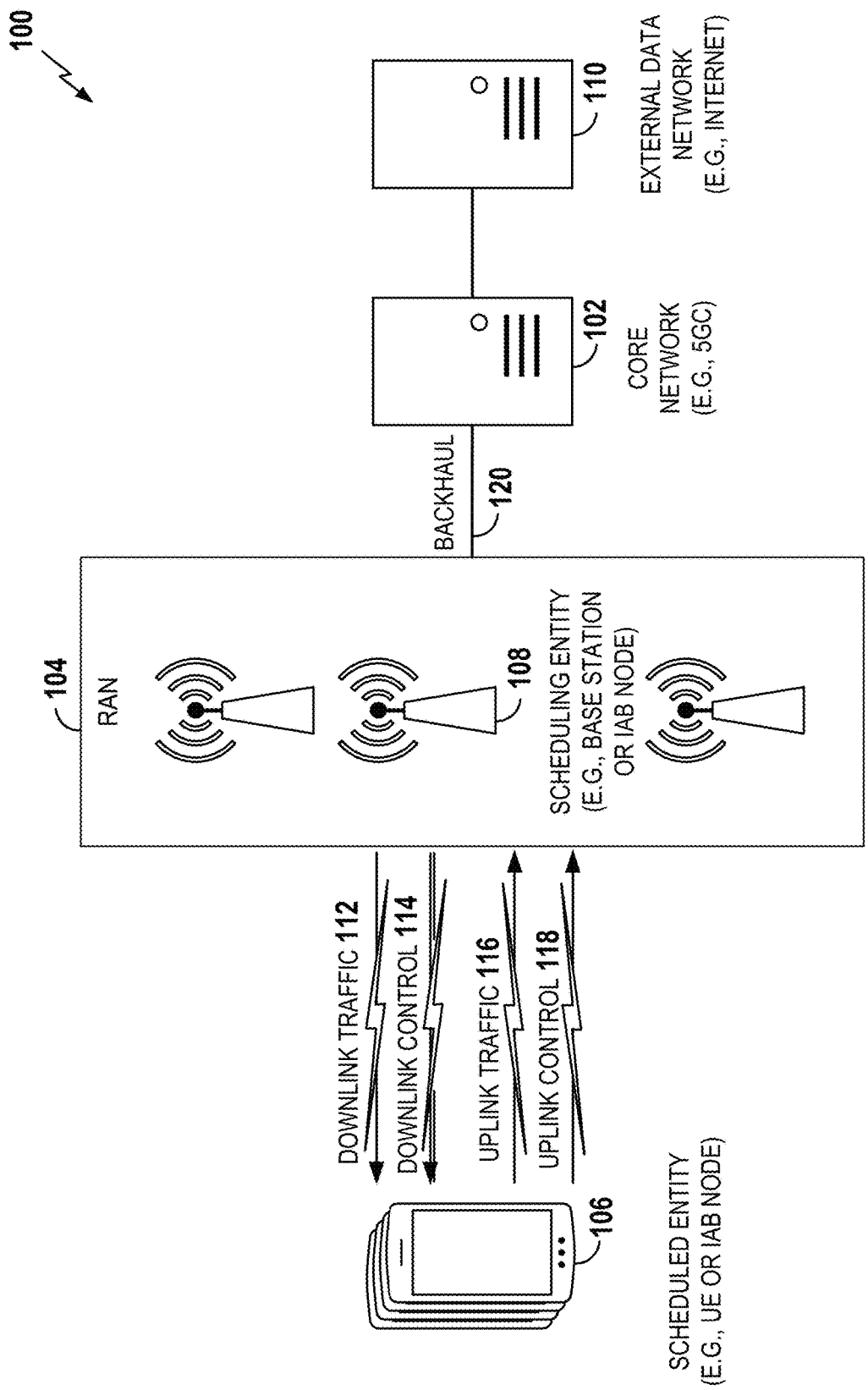
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Additionally, well-known elements will not be described in detail or will be omitted so as not to obscure the relevant details of the disclosure.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the present disclosure relate to using different paging techniques for different sets of scheduled entities. For example, a change in system information (SI) may be applicable to a first set of scheduled entities but not to a second set of scheduled entities. In this case, a scheduling entity (e.g., a base station) may send a paging message that indicates this change in SI in a manner that mitigates the impact of the paging on the second set of scheduled entities. For example, the scheduling entity may send a paging message that will be acted on by the first set of scheduled entities but ignored by the second set of scheduled entities. In some examples, different sets of scheduled entities may correspond to different classes and/or types of devices (e.g., different user devices).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below; e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
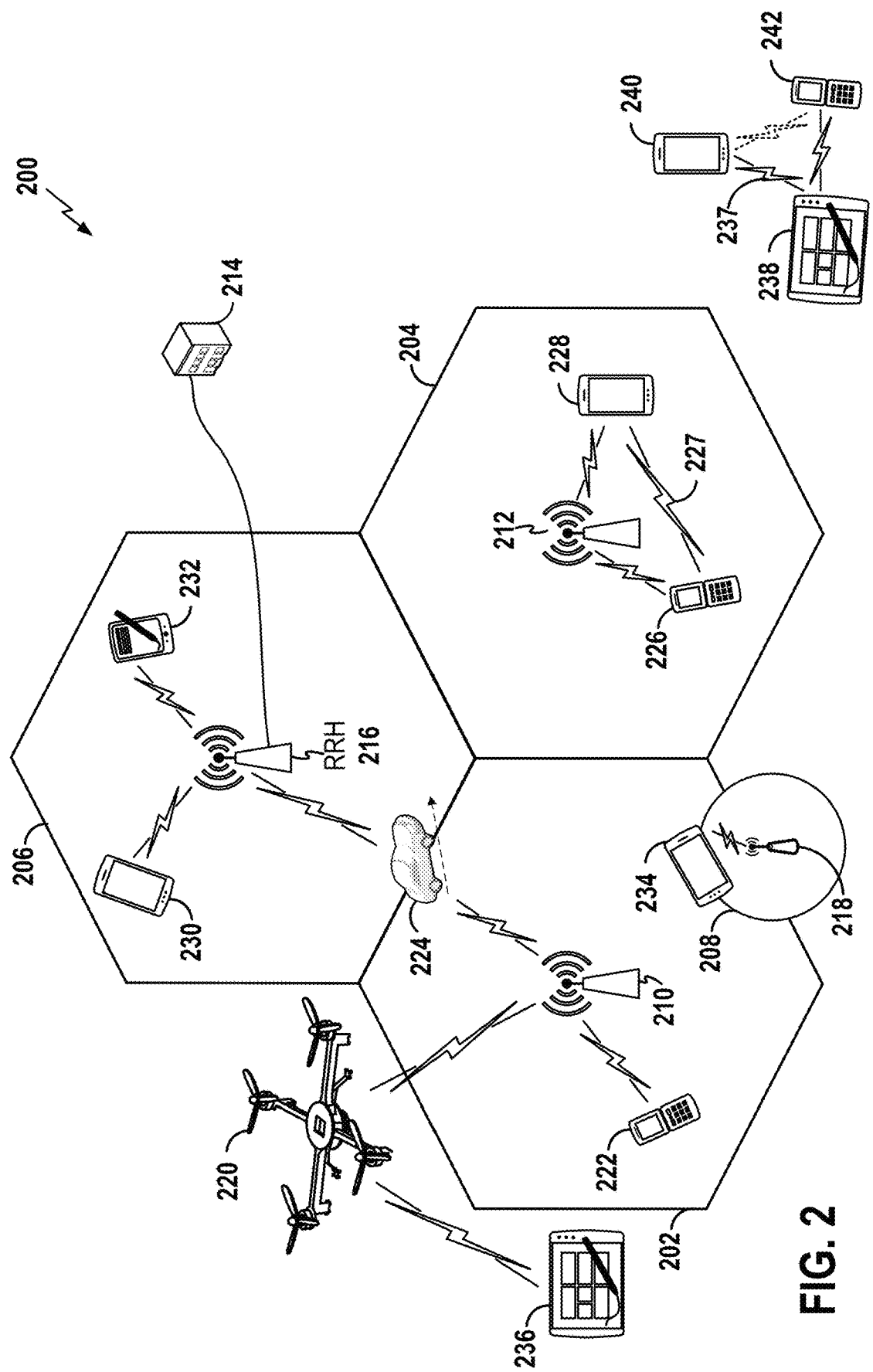
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving the UE 236). That is, in some examples, a cell may not necessarily be stationary, and the geographic area of the cell may move according to the location of a mobile base station such as a UAV 220.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network. In some examples, the sidelink signals 227 and 237 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
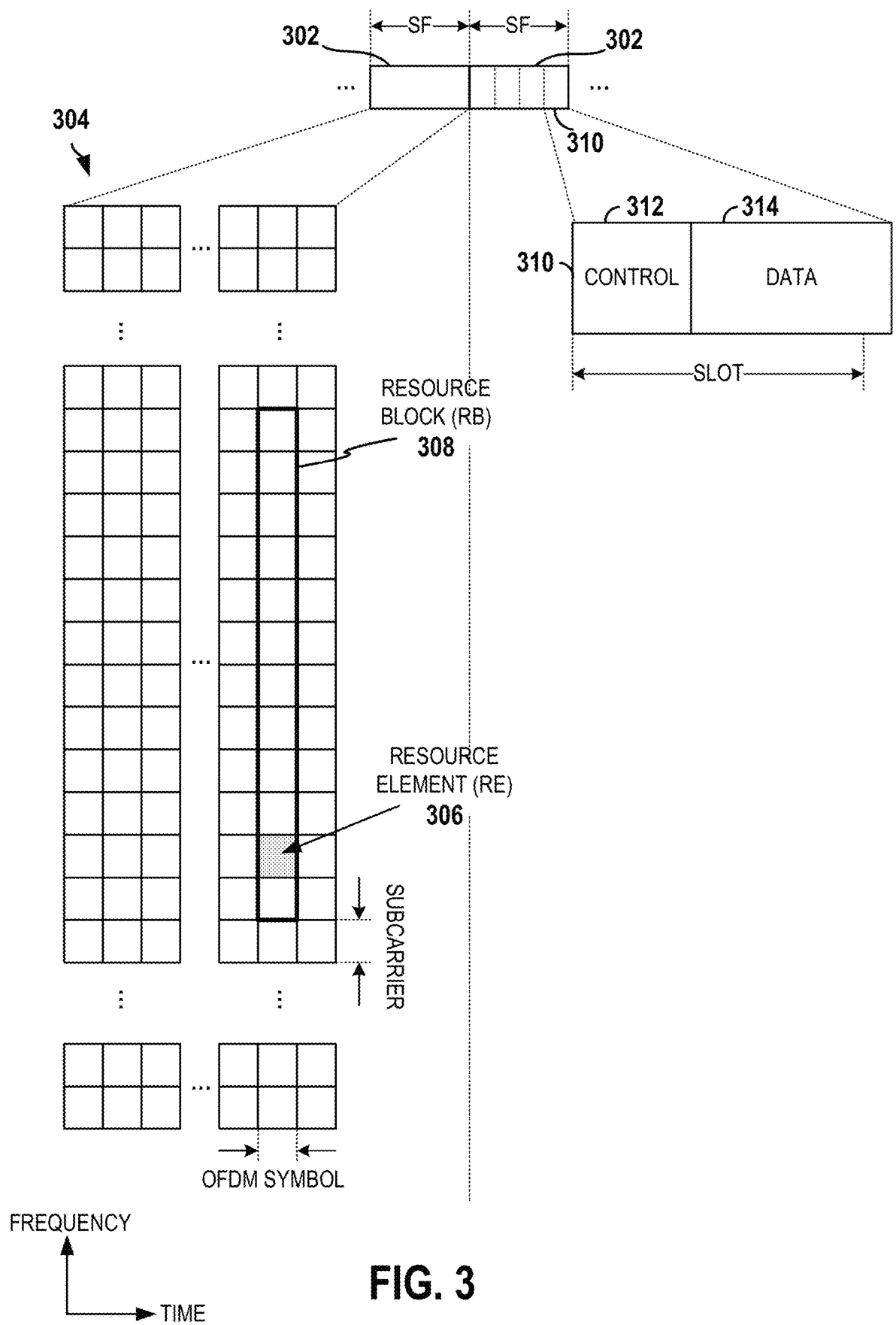
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13

OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

As the SI may change over time, the scheduling entity may send paging messages that indicate a change in the SI. Accordingly, a UE may periodically monitor a paging channel for these and other paging messages. If a paging message indicates that the SI has changed, the UE monitors a broadcast channel or some other designated channel for the new SI.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

A UE may use a random access procedure for initial access to a RAN (e.g., the RAN 200 of FIG. 2). The RAN (e.g., a base station) broadcasts information that enables a UE to determine how to conduct the initial access. This information may include a configuration for a random access channel (RACH) that the UE uses to communicate with the RAN during initial access. The RACH configuration may indicate, for example, the resources allocated by the RAN for the RACH.

A UE under the coverage area of a RAN may operate in one of several defined operating states (also referred to as modes). In some examples, these states include an idle state, an inactive state, and a connected state. In 5G NR, these operating states are defined as radio resource control (RRC) states: RRC_IDLE, RRC_INACTIVE, and RRC_CONNECTED.

A UE will be in an idle state when it first powers up. The UE may transition to a connected state with a RAN by performing a random access procedure with that RAN. In the connected state, the UE may communicate with the RAN via dedicated signaling (e.g., dedicated channels). A UE may switch to idle state or inactive state under certain circumstances. For example, a UE that does not have data to send to the RAN and that is not receiving data from the RAN may elect to switch to the idle state or the inactive state to conserve battery power. In these states, since the UE is not actively communicating with the RAN, the UE may power off some of its components (e.g., radio components). That is, the UE enters a lower power state.

The UE will periodically wake up from the low power state to monitor for signaling from the RAN (e.g., to determine whether the RAN has data to send to the UE). This periodicity is based on a discontinuous reception (DRX) cycle specified by the RAN. If the RAN has data to send to the UE or if the RAN needs to communicate with the UE for other reasons, the RAN will page the UE according to the DRX cycle (i.e., during the time intervals when the UE periodically wakes up from the lower power state). The RAN sends a paging message via a paging channel (e.g., via a paging frame). In addition, the RAN may define different paging opportunities (also referred to as paging occasions) that can be used by different UEs to receive a paging message. That is, UEs remain in the lower power state until their own paging opportunities occur. The use of different paging opportunities for different UEs allows the RAN to direct paging to a particular UE or a small subset of UEs. This reduces the likelihood that a UE will need to expend battery power to process paging that is directed to another UE. Upon receiving a paging message indicating that the network will be sending data (or other information) that a UE needs to receive, the UE may resume full operations (e.g., turn on all radio components) and, if needed, reestablish a connected state with the RAN.

The RAN may configure a UE (e.g., via broadcast) with information that enables a UE to receive a paging message. For example, this information may identify one or more of: a paging channel (e.g., the resources used for paging), a paging frame, at least one parameter that a UE uses to determine its paging opportunities, or a paging-radio network temporary identifier (P-RNTI) that the RAN uses to send a paging message.

The RAN uses different RNTIs to scramble different information sent to UEs. This enables a UE to ignore transmitted information (e.g., information transmitted using a different RNTI) that does not concern that UE. The RNTI table 400 of FIG. 4 illustrates different types of RNTIs that may be used in some examples. The RNTI values 0001-FFEF in a first field 402 are designated by the network as needed to transmit information over different channels. For example, the RAN may designate one of these values for a random access RNTI (RA-RNTI), the RAN may designate another one of these values for a transmit power control RNTI (TPC-PUCCH-RNTI), and so on. A fixed RNTI value (FFFE) in a second field 404 is used for sending a paging message (P-RNTI). Another fixed RNTI value (FFFF) in a third field 406 is used for sending SI (P-RNTI). A fourth field 408 is reserved.

A RAN may use DCI to page a UE. For example, the RAN may transmit DCI including a paging indicator during a paging opportunity. As discussed above, a DCI may schedule uplink or downlink transmissions. In addition, a DCI may include a short message that includes a paging indicator. FIG. 5 illustrates an example of a DCI table 500 for DCI Format 1_0. A first field 502 includes a short message indicator. A second field 504 optionally includes one or more short messages. A third set of fields 506 optionally includes scheduling information for paging. A fourth field 508 is reserved.

As shown in the short message indicator table 600 of FIG. 6, the short message indicator indicates whether the DCI includes a short message. FIG. 7 illustrates an example of a short message 700. A first field 702 indicates whether SI has been modified. A second field 704 is used for alerts. A third field 706 is unused. Thus, in some examples, the DCI format illustrated in FIGS. 4-7 may be used to send a paging message to UEs indicating that SI has changed. However, it should be understood that this DCI format is merely an example, and other suitable DCI formats may be used to transmit paging messages indicating a change in SI.

For short message reception in a paging occasion, a UE may monitor the PDCCH monitoring occasion(s) for paging as follows. The paging frame (PF) and paging occasion (PO) used for paging are determined by the following formulas: system frame number (SFN) for the PF is determined by: (SFN+PF_offset) mod T=(T div N)*(UE_ID mod N); and Index (i_s), indicating the index of the PO is determined by: i_s=floor (UE_ID/N) mod Ns.

The PDCCH monitoring occasions for paging may be determined according to a pagingSearchSpace and a firstPDCCH-MonitoringOccasionOfPO, if configured. When SearchSpaceId=0 is configured for the paging-SearchSpace, the PDCCH monitoring occasions for paging are the same as for the remaining minimum SI (RMSI).

The following parameters may be used for the calculation of the PF and i_s parameters mentioned above: T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied). N: number of total paging frames in T. Ns: number of paging occasions for a PF. PF_offset: offset used for PF determination. UE_ID: 5G-S-TMSI mod 1024. Here, the 5G-S-TMSI is a shortened version of the 5G global unique temporary identifier (GUTI) that includes the 5G temporary mobile subscriber identity (TMSI).

The parameters Ns, nAndPagingFrameOffset, and the length of default DRX Cycle are signaled in SIB1. The values of N and PF_offset are derived from the parameter nAndPagingFrameOffset. The parameter first-PDCCH-MonitoringOccasionOfPO is signaled in SIB1 for paging in an initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE may use as a default identity UE_ID=0 in the PF and i_s formulas above. 5G-S-TMSI is a 48 bit long bit string, interpreted as a binary number where the left most bit represents the most significant bit.

Figure 8:
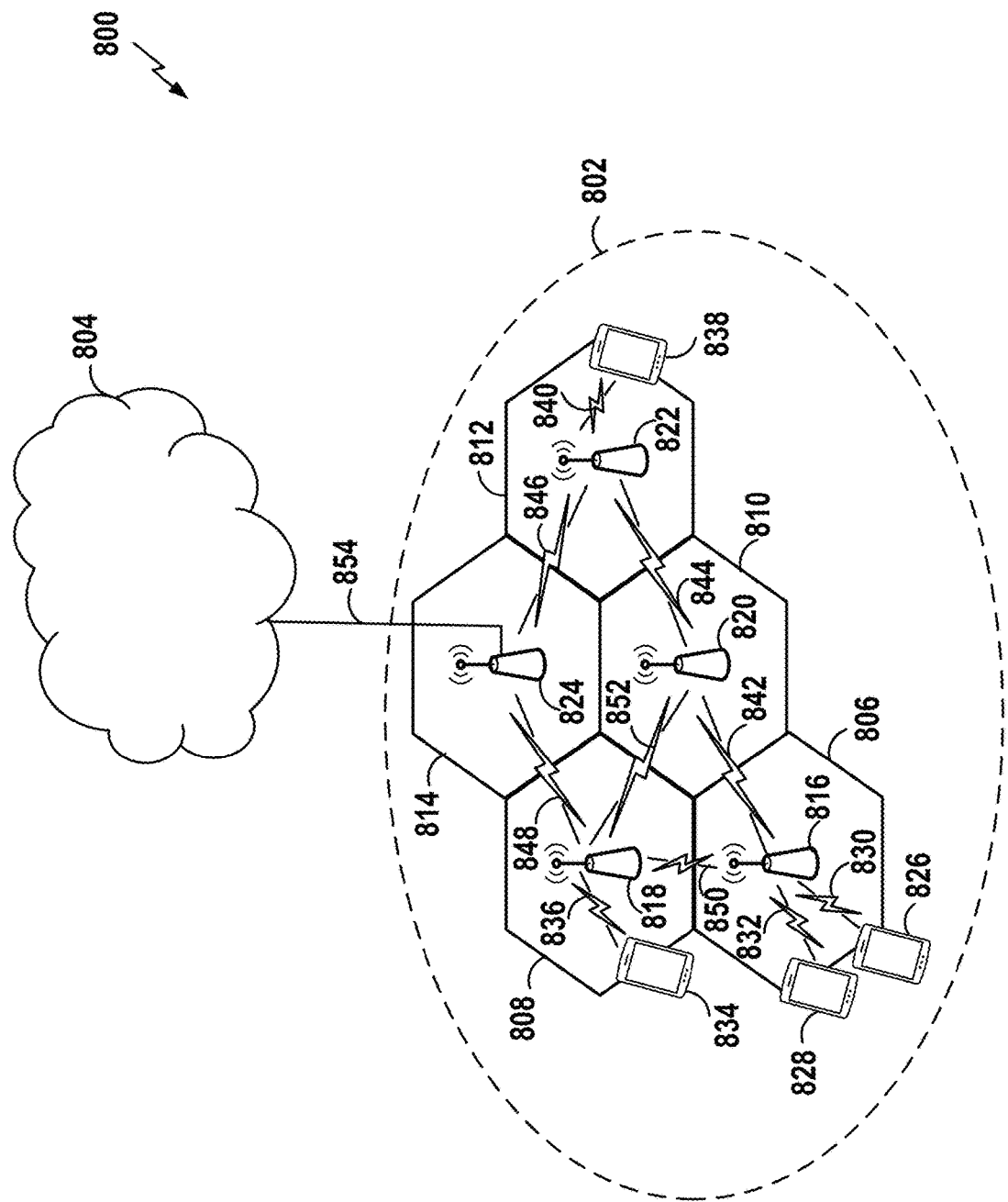
FIG. 8 is a diagram providing a high-level illustration of one example of a network configuration including an integrated access backhaul (IAB) network according to some aspects.

As mentioned above, a communication network may incorporate an integrated access backhaul (IAB) configuration. FIG. 8 is a schematic diagram providing a high-level illustration of one example of an IAB network configuration 800 that may be utilized in some aspects of the disclosure. In this illustration, a communication network 802, such as an IAB network, is coupled to a remote network 804, such as a main backhaul network or mobile core network. In such an IAB network 802, the wireless spectrum may be used for both access links and backhaul links. In some examples, the wireless spectrum may utilize millimeter-wave (mmWave) or sub-6 GHz carrier frequencies.

The IAB network 802 may be similar to the radio access network 200 shown in FIG. 2, in that the IAB network 802 may be divided into a number of cells 806, 808, 810, 812, and 814, each of which may be served by a respective IAB node 816, 818, 820, 822, and 824. Each of the IAB nodes 816-824 may be an access point, base station (BS), eNB, gNB, or other node that utilizes wireless spectrum (e.g., the radio frequency (RF) spectrum) to support access for one or more UEs located within the cells 806-814 served by the IAB nodes.

In the example shown in FIG. 8, IAB node 816 communicates with UEs 826 and 828 via wireless access links 830 and 832, IAB node 818 communicates with UE 834 via wireless access link 836, and IAB node 822 communicates with UE 838 via wireless access link 840. The IAB nodes 816-824 are further interconnected via one or more wireless backhaul links 842, 844, 846, 848, 850, and 852. Each of the wireless backhaul links 842-852 may utilize the same wireless spectrum (e.g., the radio frequency (RF) spectrum) as the access links 830-840 to backhaul access traffic to/from the remote network 804. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 802.

In the example shown in FIG. 8, IAB node 816 communicates with IAB node 820 via wireless backhaul link 842, IAB node 820 communicates with IAB node 822 via wireless backhaul link 844, IAB node 822 communicates with IAB node 824 via wireless backhaul link 846, IAB node 824 communicates with IAB node 818 via wireless backhaul link 848, IAB node 818 communicates with IAB node 816 via wireless backhaul link 850, and IAB node 818 communicates with IAB node 820 via wireless backhaul link 852. As shown in FIG. 8, each IAB node 816-824 may be connected via respective wireless backhaul links 842-852 to two or more other IAB nodes for robustness.

Some or all of the IAB nodes 816-824 may also be connected via wired backhaul links (e.g., fiber, coaxial cable, Ethernet, copper wires, etc.) and/or microwave backhaul links. Thus, the IAB network 802 may support both wired/microwave and wireless backhaul traffic. At least one of the IAB nodes (e.g., IAB node 824) may be a border IAB node, also referred to herein as an IAB donor node, that also provides a communication link 854 to the remote network 804. For example, the IAB donor node 824 may include a wired (e.g., fiber, coaxial cable, Ethernet, copper wires), microwave, or other suitable link 854 to the remote network 804.

To facilitate wireless communication between the IAB nodes 816-824 and between the IAB nodes 816-824 and the UEs served by the IAB nodes 816-824, each IAB node 816-824 may be configured to operate as both a scheduling entity and a scheduled entity. Thus, an IAB node (e.g., IAB node 816) may utilize the same wireless spectrum to transmit access traffic to/from UEs and to then backhaul that access traffic to/from the remote network 804. For example, to backhaul access traffic to/from IAB node 816, IAB node 816 may communicate with IAB node 820 to transmit backhaul access traffic via wireless backhaul link 842, IAB node 820 may communicate with IAB node 822 to transmit the backhaul access traffic via wireless backhaul link 844, and IAB node 822 may communicate with IAB node 824 to transmit the backhaul access traffic via wireless backhaul link 846. In this example, IAB nodes 820 and 822 may each operate as both a scheduling entity and a scheduled entity to backhaul access traffic to/from IAB node 816. As such, communication between a pair of IAB nodes may be individually scheduled by one of the IAB nodes within the pair.

In other examples, an IAB node may schedule wireless backhaul communications between other pairs of IAB nodes. For example, IAB node 824 may operate as the scheduling entity for the IAB network 802, while IAB nodes 816, 820, and 822 each operate as a scheduled entity to backhaul access traffic to/from IAB node 816. In this example, IAB node 824 may schedule wireless backhaul communications between each of the pairs of IAB nodes (e.g., between IAB node 816 and IAB node 820, between IAB node 820 and IAB node 822, and between IAB node 822 and IAB node 824). As another example, IAB node 822 may operate as a scheduling entity to schedule wireless backhaul communications between IAB nodes 816 and 820 and also between IAB node 820 and IAB node 822. IAB node 822 may then operate as a scheduled entity to allow IAB node 824 to schedule wireless backhaul communications therebetween.

Figure 9:
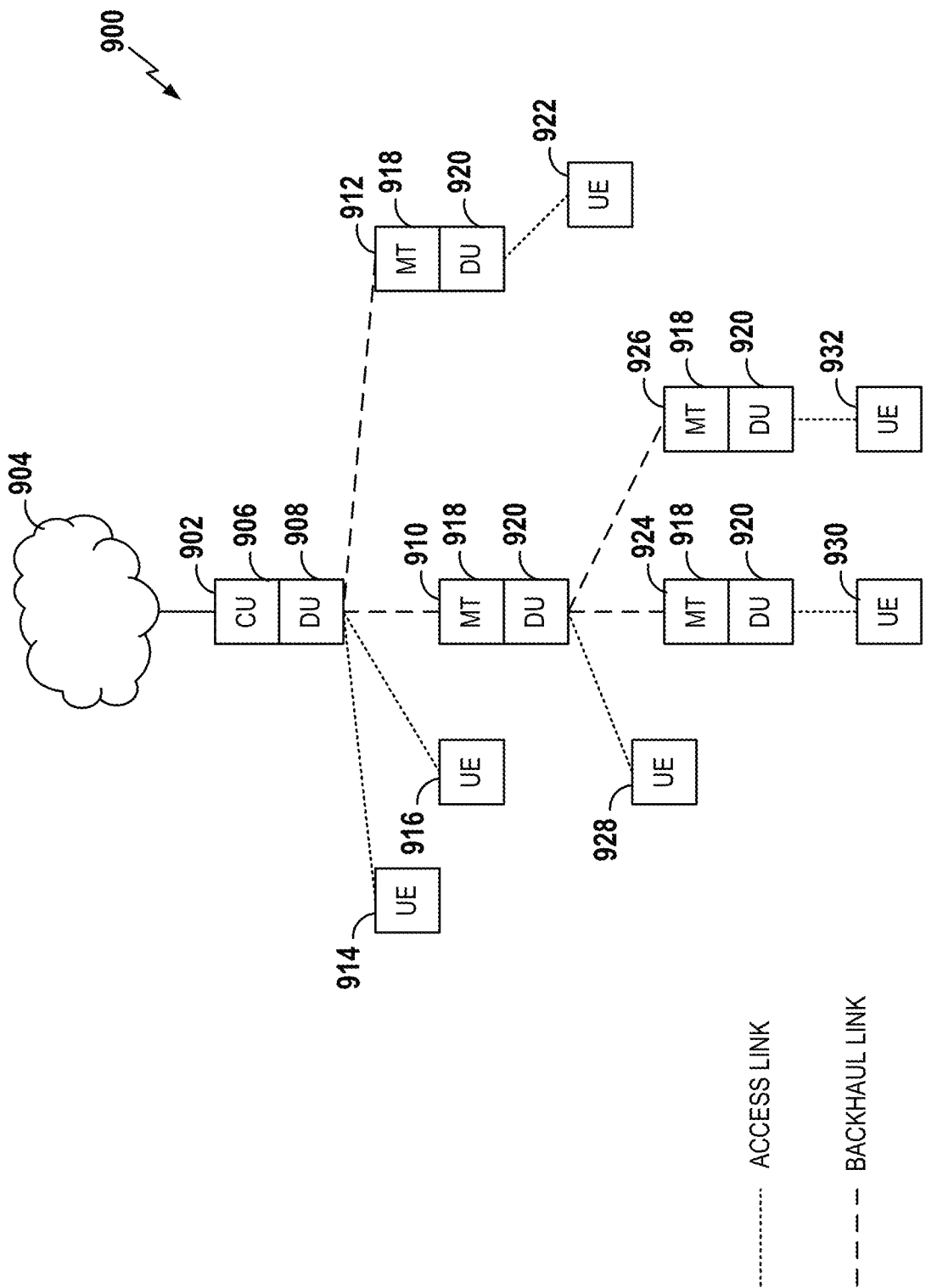
FIG. 9 is a diagram illustrating an example of IAB node functionality within an IAB network according to some aspects.

FIG. 9 is a schematic diagram illustrating an example of IAB node functionality within an IAB network 900. In the example shown in FIG. 9, an IAB node 902 is shown coupled to a core network 904 via a wireline connection. This IAB node 902 may be referred to herein as an IAB donor node, which may be, for example, an enhanced gNB including functionality for controlling the IAB network 900. In some examples, the IAB donor node 902 may include a central unit (CU) 906 and a distributed unit (DU) 908. The CU 906 is configured to operate as a centralized network node (or central entity) within the IAB network 900. For example, the CU 906 may include radio resource control (RRC) layer functionality and packet data convergence protocol (PDCP) layer functionality to control/configure the other nodes (e.g., IAB nodes and UEs) within the IAB network 900.

The DU 908 is configured to operate as a scheduling entity to schedule scheduled entities (e.g., other IAB nodes and UEs) of the IAB donor node 902. For example, the DU 908 of the IAB donor node 902 may operate as a scheduling entity to schedule IAB nodes 910 and 912 and UEs 914 and 916. Thus, the DU 908 of the IAB donor node 902 may schedule communication with IAB nodes 910 and 912 via respective backhaul links and schedule communication with UEs 914 and 916 via respective access links. In some examples, the DU 908 may include the radio link control (RLC), medium access control (MAC), and physical (PHY) layer functionality to enable operation as a scheduling entity.

Each of the IAB nodes 910 and 912 may be configured as a Layer 2 (L2) relay node including a respective DU 920 and a mobile termination (MT) unit 918 to enable each L2 relay IAB node 910 and 912 to operate as a scheduling entity and a scheduled entity. For example, the MT unit 918 within each of the L2 relay IAB nodes 910 and 912 is configured to operate as a scheduled entity that may be scheduled by the IAB donor node 902. Each MT unit 918 within the L2 relay IAB nodes 910 and 912 further facilitates communication with the IAB donor node 902 via respective backhaul links. In addition, the DU 920 within each of the L2 relay IAB nodes 910 and 912 operates similar to the DU 908 within the IAB donor node 902 to function as a scheduling entity to schedule one or more respective scheduled entities (e.g., other IAB nodes and/or UEs) of the L2 relay IAB nodes 910 and 912.

For example, the DU 920 of L2 relay IAB node 912 functions as a scheduling entity to schedule communication with a UE 922 via an access link, while the DU 920 of L2 relay IAB node 910 functions as a scheduling entity to schedule communication with the MT units 918 of L2 relay IAB nodes 926 and 926 via respective backhaul links and a UE 928 via an access link. Each of the L2 relay IAB nodes 924 and 926 further includes a respective DU 920 that functions as a scheduling entity to communicate with respective UEs 930 and 932. Thus, in the network topology illustrated in FIG. 9, since IAB donor node 902 is configured to control each of the other nodes in the IAB network, the IAB donor node 902 is a parent IAB node of child IAB nodes 910, 912, 924 and 926. In addition, IAB node 910 is further a parent IAB node of child IAB nodes 924 and 926. For example, the CU 906 and DU 908 within IAB donor node 902 may function as the parent IAB node of child IAB nodes 910, 912, 924, and 926 and the DU 920 within IAB node 910 may function as the parent IAB node of child IAB nodes 924 and 926. The MT unit 918 within IAB nodes 910, 912, 924, and 926 may further function as child IAB nodes.

In a mobile IAB network, one or more of the L2 relay IAB nodes 910, 912, 924, and/or 926 may be moving within the IAB network 900. For example, an L2 relay IAB node (e.g., IAB node 924) may be a mobile IAB node installed on a bus, train, taxi, platooned vehicle, or other moveable object. As a mobile child IAB node 924 moves through the IAB network 900, the propagation delay from the parent IAB node 910 to the child IAB node 924 dynamically changes. Thus, the downlink reception timing of downlink signals received at the child IAB node 924 changes. To ensure synchronization of downlink and uplink transmission timing between the parent IAB node 910 and child IAB node 924, the parent IAB node 910 may measure the round-trip time (RTT) of communication between the parent IAB node 910 and the child IAB node 924 and provide a timing advance (TA) command to the UE containing a TA value indicative of the RTT for use by the child IAB node 924 in adjusting the uplink transmission timing of signals to the parent IAB node 910.

In IAB networks and other scenarios, there may be changes in SI that affect some nodes or devices but not others. For example, new RACH configurations specific to IAB-nodes may be supported. Thus, separate RACH occasions (ROs) may be used for UEs and IAB-MTs. In addition, IAB-specific backhaul RACH configurations may be used for initial access of IAB nodes. These IAB-specific RACH configurations (e.g., if configured for initial access) may be broadcast by SI (e.g., in SIB1 or another SIB).

If an IAB-specific RACH configuration is changed, there may be a corresponding change in the SI. If there is a change in SI, a UE/MT (in RRC-idle/inactive and RRC-connected if so configured) receives a notification using a short message transmitted with P-RNTI over DCI (format 1_0) as discussed above. For example, a UE in RRC_IDLE or in RRC_INACTIVE may monitor for an SI change indication in the UE's paging occasion every DRX cycle. In addition, a UE in RRC_CONNECTED may monitor for an SI change indication in any paging occasion at least once per modification period if the UE is provided with common search space on the active bandwidth part (BWP) to monitor paging. For example, a Type2-PDCCH common search space (CSS) set may be configured by a pagingSearchSpace parameter in a PDCCH-ConfigCommon message for a DCI format with CRC scrambled by a P-RNTI on the primary cell of a master cell group (MCG).

Figure 10:
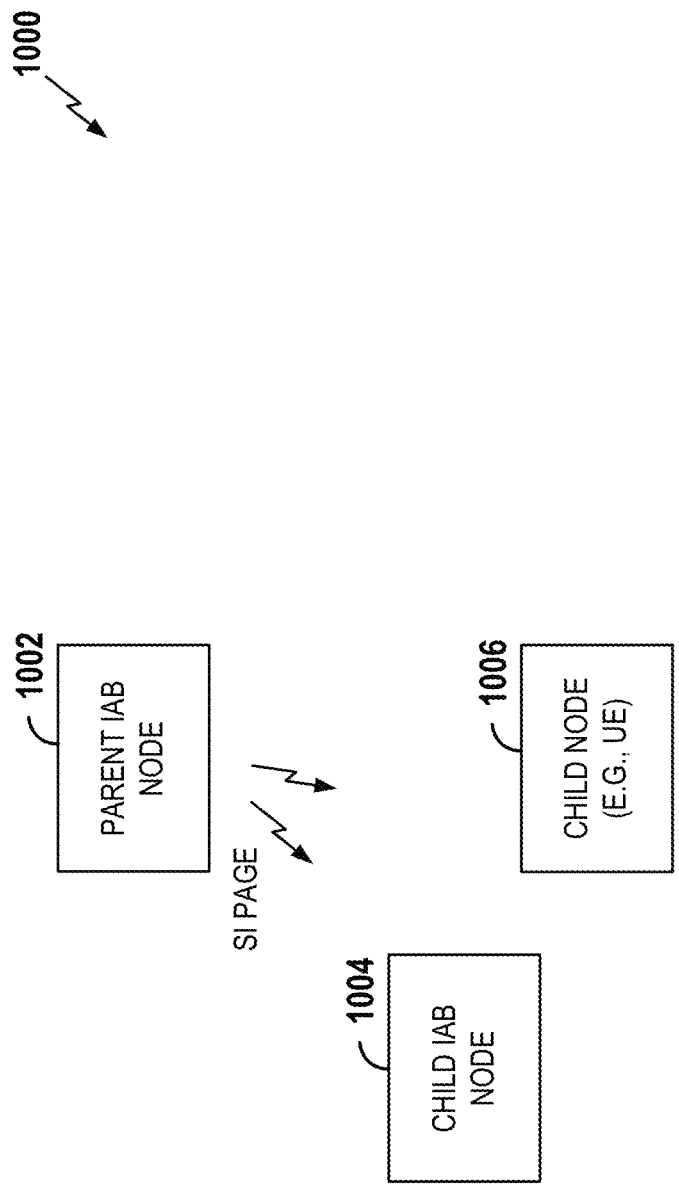
FIG. 10 is a diagram illustrating SI paging in an IAB network according to some aspects.

When SI changes, the network (e.g., a parent IAB node or a donor IAB node) may notify (page) its child UEs and/or MTs to reacquire the changed SI. However, this could cause unnecessary paging for UEs (e.g., UEs in idle/inactive mode) that are not affected by this SI change. As shown in the IAB system 1000 of FIG. 10, an SI page transmitted by a parent IAB node 1002 to a child IAB node 1004 may be received by a child node 1006 (e.g., a UE). However, a UE might not have any use for the corresponding IAB-specific SI.

Moreover, IAB-specific RACH configuration changes may occur more frequently that other SI changes. For example, the IAB-specific RACH configuration may change in response to changes in the load or topology of the IAB-network. Consequently, the corresponding SI paging may negatively impact UEs in the network (e.g., due to the UEs wasting battery power processing the SI paging).

The disclosure relates in some aspect to using separate paging for different sets of devices. For example, one paging scheme may be used for UEs and another paging scheme used for IAB-MTs. As another example, one paging scheme may be used for one set of UEs and another paging scheme used for another set of UEs. Paging may be separated in other ways in other examples. These different paging schemes may be used, for example, when the network desires the flexibility of paging a first (e.g., default) group of users and a second group of users. The two groups could be of different types, the two groups may have different requirements, the two groups may request different services, or the groups may be different in some other way. Also, the teachings herein are applicable to more than two groups (e.g., three different paging schemes may be used for three groups, and so on).

Figure 11:
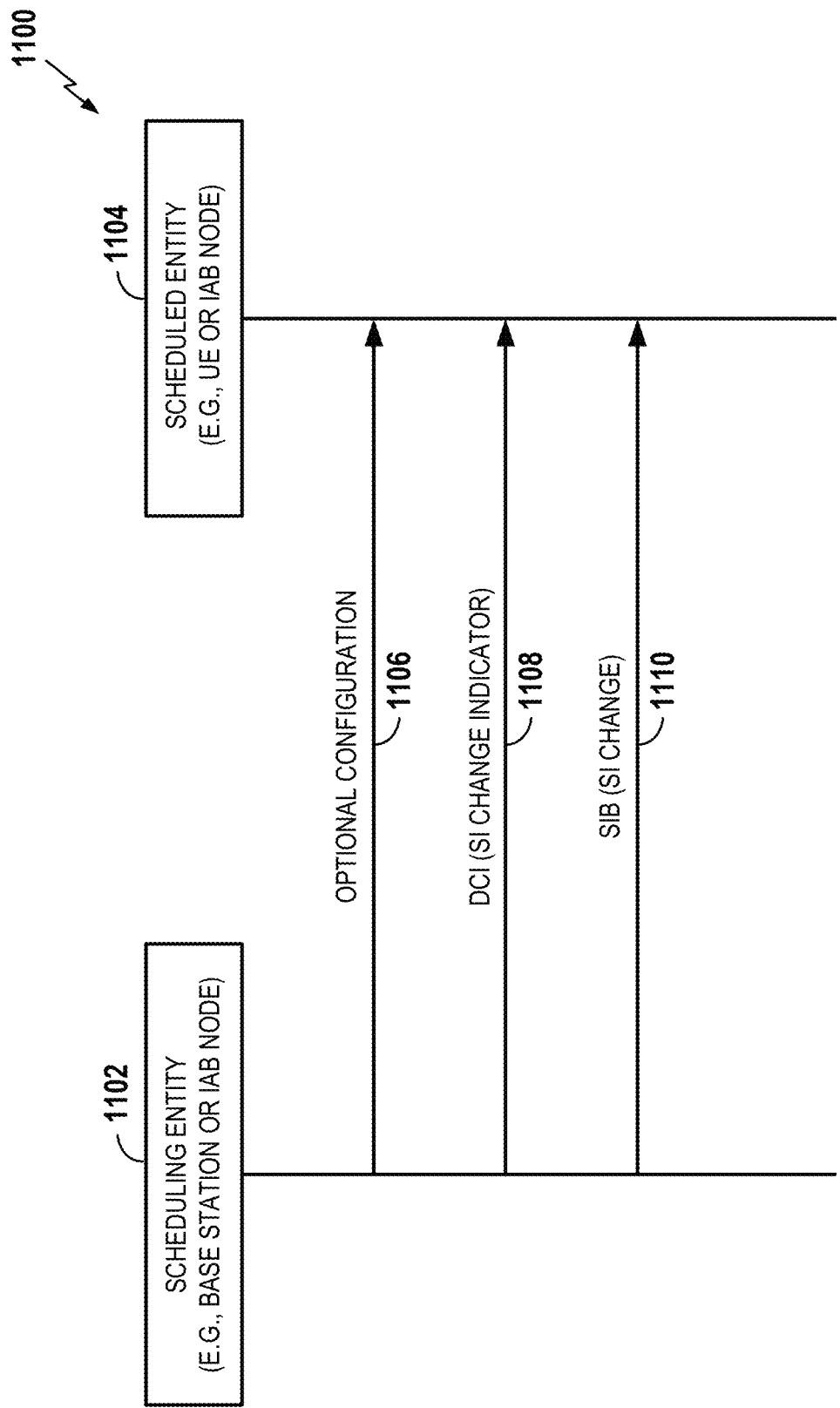
FIG. 11 is a block diagram illustrating a wireless communication system where different paging is used for different sets of devices according to some aspects.

FIG. 11 is a schematic illustration of a wireless communication system 1100 that may be used to provide separate paging for different sets of devices as taught herein. The wireless communication system 1100 includes a scheduling entity 1102 (e.g., a base station or an IAB-DU) and a scheduled entity 1104 (e.g., a UE or an IAB-MT), and potentially other devices (not shown). In some implementations, the scheduling entity 1102 may correspond to the scheduling entity 108 (e.g., a gNB, a transmit receive point, etc.) of FIG. 1 and/or any of the scheduling entities (e.g., base stations, IAB nodes, etc.) of any of FIGS. 2, 8, 9, 10, and 12-16. In some implementations, the scheduled entity 1104 may correspond to the scheduled entity 106 (e.g., a UE) of FIG. 1 and/or any of the scheduled entities (e.g., UEs, IAB nodes, etc.) of any of FIGS. 2, 8, 9, 10, 12-15 and 26.

The scheduling entity 1102 includes functionality for generating configuration information for the scheduled entity 1104 and/or other devices in the system 1100, and for managing SI changes. For example, the scheduling entity 1102 may determine which paging configuration is to be used by the scheduled entity 1104 (and/or other devices) to receive a paging message from the scheduling entity 1102. As discussed in more detail below, paging configurations may specify which P-RNTI is to be used, which bit is to be used for indicating an SI change, which paging search space is to be used, and which paging parameters are to be used. The scheduling entity 1102 may also determine when SI has changed, identify a set of devices affected by the SI change, and cause an indication of the SI change to be sent (e.g., broadcast).

The scheduling entity 1102 also includes functionality for paging the scheduled entity 1104 and/or other devices in the system 1100. For example, the scheduling entity 1102 may send a page indicating that SI has changed. As discussed in more detail below, for a particular set of devices being paged, this paging may use a specified P-RNTI, a specified bit for the SI change indicator, a specified paging search space, a specified paging parameter, or any combination thereof.

The scheduling entity 1102 further includes functionality for sending and receiving messages, signaling, and other communication to and from the scheduled entity 1104 and/or other devices via a transceiver (not shown). For example, the scheduling entity 1102 may send a configuration 1106 (e.g., via a broadcast or a dedicated link to a particular device). As another example, the scheduling entity 1102 may send a DCI 1108 with an SI change indicator (e.g., via a broadcast or a dedicated link to a particular device). As yet another example, the scheduling entity 1102 may send a SIB 1110 include an SI change (e.g., via a broadcast or a dedicated link to a particular device).

The scheduled entity 1104 includes functionality for configuring the scheduled entity 1104 based on received configuration information and SI changes. For example, the scheduled entity 1104 may include functionality for controlling how a paging message is received by the scheduled entity 1104. The scheduled entity 1104 may include functionality for managing access to the scheduling entity 1102 based on a received SI change.

As mentioned above, the scheduled entity 1104 may receive a paging message from the scheduling entity 1102 and/or other devices in the system 1100. For example, based on the current paging configuration (e.g., for a particular set of devices) the scheduled entity 1104 may monitor for a paging message using a specified P-RNTI, may monitor a specified bit for an SI change indicator, may monitor a specified paging search space, may use a specified paging parameter, and so on.

The scheduled entity 1104 sends and receives messages, signaling, and other communication to and from the scheduling entity 1102 and/or other devices via a transceiver (not shown). For example, the scheduled entity 1104 may receive the configuration 1106, the DCI 1108, the SIB 1110, and other signaling from the scheduling entity 1102.

Four example implementations for using different paging schemes for different sets of devices and/or different classes of users will now be discussed with reference to FIGS. 12-15. The system 1100 of FIG. 11 may be configured to provide any one or any combination of these example implementations.

In a first example implementation, different P-RNTIs are used for different sets of devices. In this case, the devices of a first set that use a first P-RNTI will not decode a paging message sent using a second P-RNTI. Thus, the devices of the first set will not waste battery power exiting from a lower power mode to decode a paging message that does not relate to those devices.

As discussed above, an SI change notification is sent via a short message in a DCI scrambled by P-RNTI, where P-RNTI conventionally has a fixed value of FFFE. The disclosure relates in some aspects to defining another RNTI value (different from FFFE) for paging a set of devices. For example, a backhaul-specific RNTI may be defined for IAB nodes.

In one example, a fixed P-RNTI is specified and indicated in the RNTI table 400 of FIG. 4. Here, one of the reserved values (FFF0-FFFD) in the field 408 or one of the values (0001-FFEF) in the field 402 may be allocated for the set of devices (e.g., the backhaul-specific RNTI).

In another example, the network optionally configures a specific P-RNTI in one of the SIB or RRC messages. This value can be chosen flexibly from any unused/unreserved RNTI values (0001-FIEF) in the field 402.

In scenarios where a specific P-RNTI is not configured (e.g., for the backhaul), a default RNTI value of FFFE may be used by the set of devices (e.g., IAB-MTs).

The network may configure a set of devices to use only one P-RNTI or to use more than one P-RNTI. For example, in the event a specific P-RNTI is configured by the network or specified for a set of devices in addition to P-RNTI FFFE, the set of devices may be configured to monitor paging using only the specific P-RNTI (e.g., a backhaul-specific P-RNTI).

Alternatively, the set of devices may also be configured to monitor paging using the default P-RNTI (FFFE). For example, IAB-MTs may be indicated (by the network) to also monitor for FFFE. This allows allow the network the flexibility to, for example, page UEs and MTs together using a common paging message/DCI.

Figure 12:
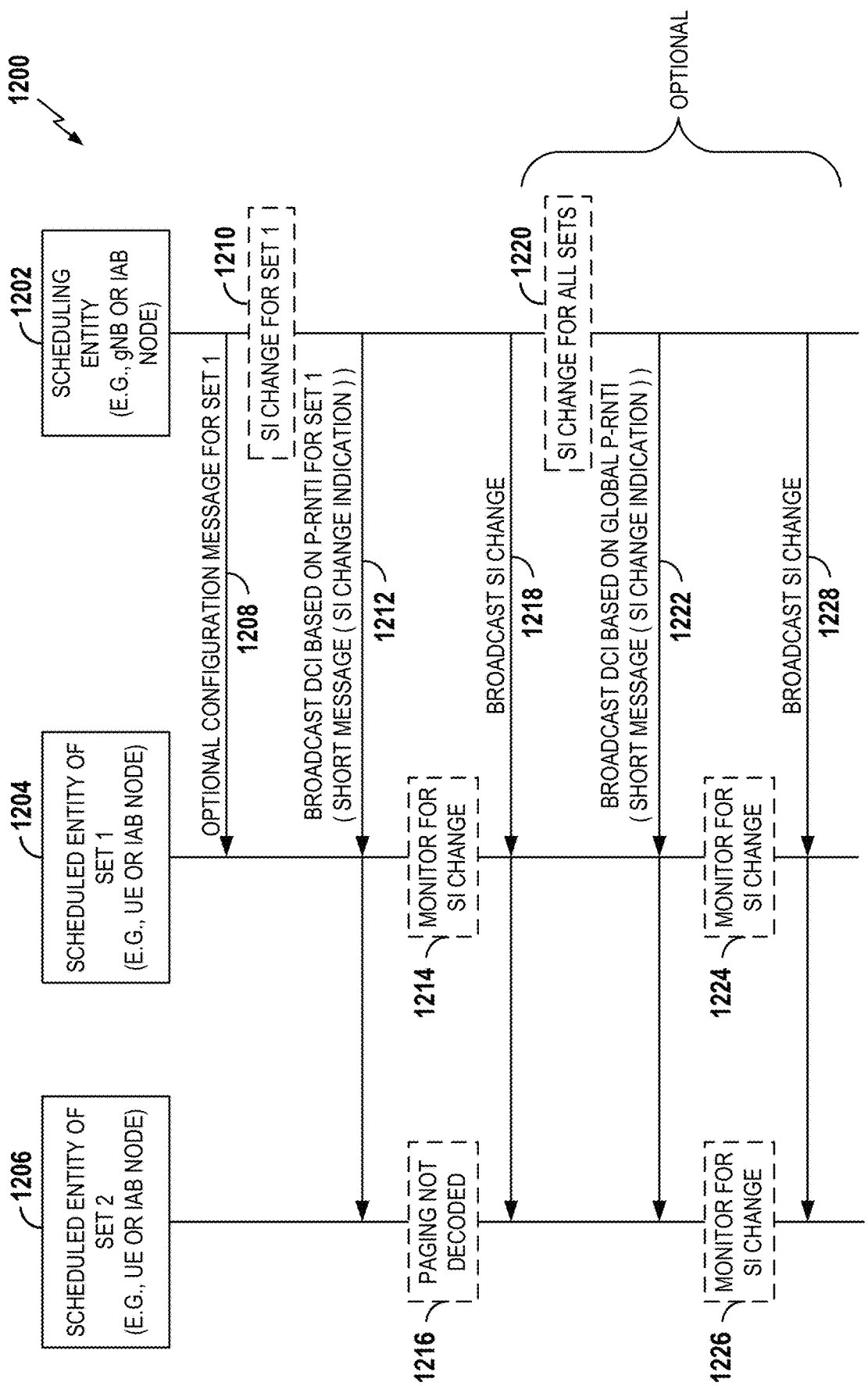
FIG. 12 is a diagram illustrating signaling when using different paging-RNTIs (P-RNTIs) for indicating an SI change according to some aspects.

FIG. 12 illustrates an example of signaling in a communication system 1200 according to the first example implementation. The system 1200 includes a scheduling entity 1202, a scheduled entity 1204 that is associated with a first set of devices (set 1), and a scheduled entity 1206 that is associated with a second set of devices (set 2). It should be appreciated that the system 1200 would typically include other devices as well. In some implementations, the scheduling entity 1202 may correspond to the scheduling entity 108 (e.g., a gNB, a transmit receive point, etc.) of FIG. 1 and/or any of the scheduling entities (e.g., base stations, IAB nodes, etc.) of any of FIGS. 2, 8, 9, 10, 11, and 13-16. In some implementations, the scheduled entity 1204 and/or the scheduled entity 1206 may correspond to the scheduled entity 106 (e.g., a UE) of FIG. 1 and/or any of the scheduled entities (e.g., UEs, IAB nodes, etc.) of any of FIGS. 2, 8, 9, 10, 11, 13-15, and 26.

At step 1208, the scheduling entity 1202 optionally sends a configuration message for devices belonging to set 1. For example, the scheduling entity 1202 may specify a particular P-RNTI to be used by these devices for receiving paging messages.

At block 1210, the scheduling entity 1202 determines that there is an SI change for the devices of set 1. Consequently, at step 1212, the scheduling entity 1202 sends a DCI that is based on (e.g., scrambled by) a P-RNTI designated for set 1. This DCI includes a short message that includes an SI change indication.

At block 1214, the scheduled entity 1204 uses the specified P-RNTI to decode the DCI sent at step 1212 (e.g., the scheduled entity 1204 wakes according to its DRX cycle to search for paging). Consequently, the scheduled entity 1204 may commence monitoring (e.g., by exiting low power mode) for a SIB that includes the SI change.

In contrast, at block 1216, the scheduled entity 1206 does not use the specified P-RNTI to decode the DCI sent at step 1212. For example, the scheduled entity 1206 may be configured to use the default P-RNTI (e.g., FFFE). As a result, the scheduled entity 1206 may immediately return to a lower power state until its next DRX wakeup period occurs.

At step 1218, the scheduling entity broadcasts the SI change (e.g., new SI information). Accordingly, this SI change may be received by the scheduled entity 1204 (and other members of set 1).

Optionally, the scheduling entity 1202 may page the devices of set 1 and set 2 together and using a common paging message/DCI. At block 1220, the scheduling entity 1202 determines that there is an SI change for all devices. Consequently, at step 1222, the scheduling entity 1202 sends a DCI that is based on (e.g., scrambled by) a global P-RNTI (e.g., FFFE). This DCI includes a short message that includes an SI change indication.

At block 1224, the scheduled entity 1204 uses the global P-RNTI to decode the DCI sent at step 1222 (e.g., the scheduled entity 1204 wakes according to its DRX cycle to search for a paging message). Consequently, the scheduled entity 1204 may commence monitoring (e.g., by exiting low power mode) for a SIB that includes the SI change.

At block 1226, the scheduled entity 1206 also uses the global P-RNTI to decode the DCI sent at step 1222 (e.g., the scheduled entity 1206 wakes according to its DRX cycle to search for a paging message). Consequently, the scheduled entity 1206 may commence monitoring (e.g., by exiting low power mode) for a SIB that includes the SI change.

At step 1228, the scheduling entity broadcasts the SI change. Accordingly, this SI change may be received by the scheduled entity 1204 and the scheduled entity 1206 (and other devices served by the scheduling entity 1202).

In a second example implementation, one or more bits of a DCI (e.g., DCI Format 1_0) are used to notify a set of devices (e.g., IAB-MTs) about an SI change that only affects that set of devices. As discussed above, a short message carried by DCI may be used to indicate an SI change. In the second example implementation, at least one other bit of the DCI may be used to indicate an SI change that is specific to a given set of devices. Other devices that are not a member of this set may ignore a set-specific bit. Thus, these other devices will not waste battery power responding to paging indicated by this bit.

In one example, one or more of the reserved bits of the short message (e.g., the third field 706 of FIG. 7) is used to notify the set of devices about an SI change. For example, one of the reserved bits (3-8) in the short message may be designated as "systemInfoModification_IAB" to notify IAB-MTs about an SI update. In this case, UEs may ignore this bit and, therefore, not respond to the set-specific paging.

In another example, one or more of the reserved bits of the DCI (e.g., the fourth field 508 of FIG. 5) may be used to notify the set of devices about an SI change. For example, one of the six reserved bits may be designated as "systemInfoModification_IAB" to notify IAB-MTs about an SI update. Again, UEs may ignore this bit.

In yet another example, one or more of the bits of the DCI assigned to other parameters for scheduling an upcoming paging PDSCH (e.g., the third field 506 of FIG. 5) is used to notify the set of devices about an SI change. In scenarios where the DCI carries only the short message, these fields are all reserved, and can therefore be repurposed for indicating a specific SI change. For example, one of these bits may be designated as "systemInfoModification_IAB" to notify IAB-MTs about an SI update. Again, UEs may ignore this bit.

If there is an SI change that is relevant to multiple sets of devices (e.g., both UEs and IAB-MTs), the network can use the first field 702 in the short message to page all of the devices.

Figure 13:
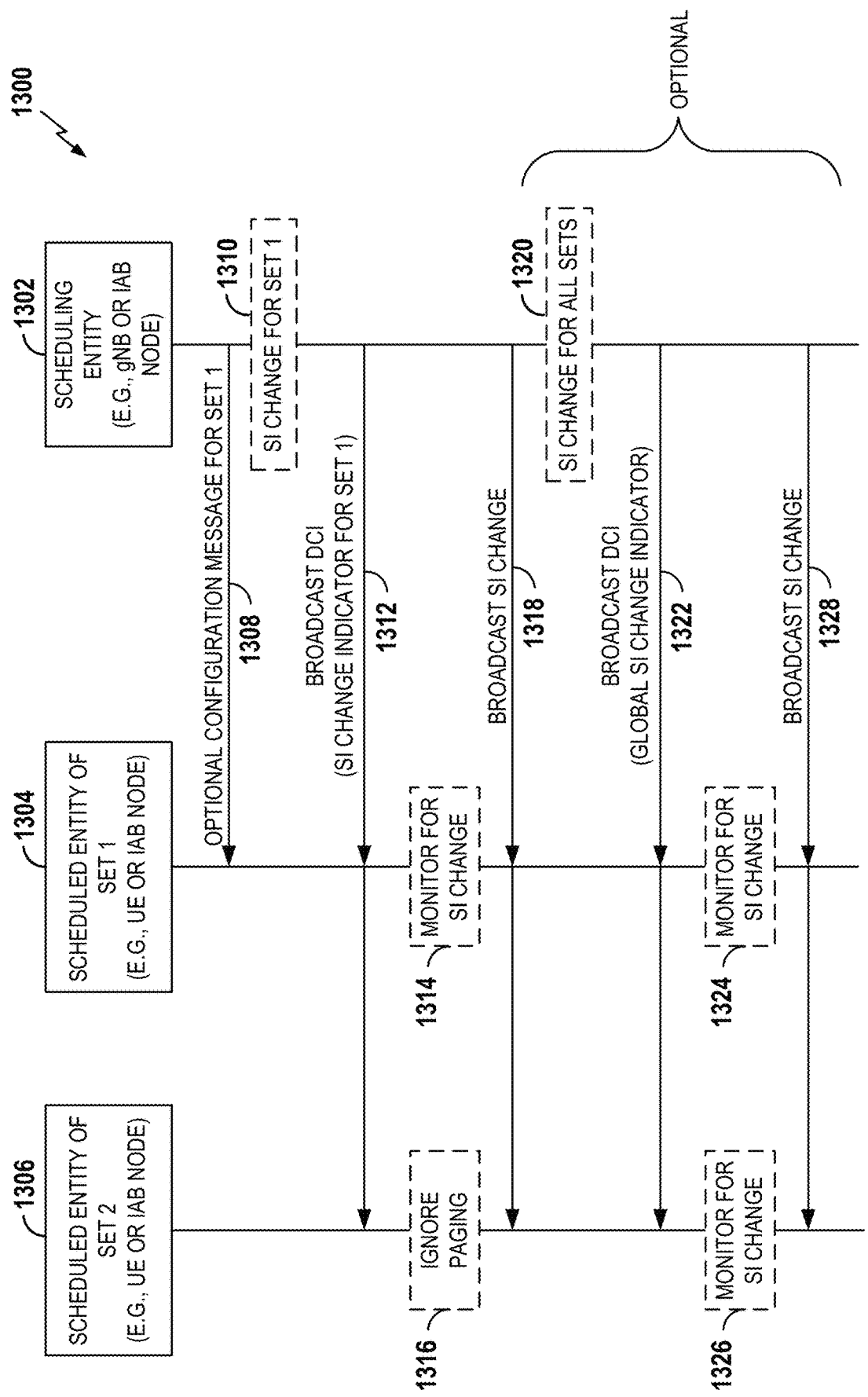
FIG. 13 is a diagram illustrating signaling when using different bits for indicating an SI change according to some aspects.

FIG. 13 illustrates an example of signaling in a communication system 1300 according to the second example implementation. The system 1300 includes a scheduling entity 1302, a scheduled entity 1304 that is associated with a first set of devices (set 1), and a scheduled entity 1306 that is associated with a second set of devices (set 2). It should be appreciated that the system 1300 would typically include other devices as well. In some implementations, the scheduling entity 1302 may correspond to the scheduling entity 108 (e.g., a gNB, a transmit receive point, etc.) of FIG. 1 and/or any of the scheduling entities (e.g., base stations, IAB nodes, etc.) of any of FIGS. 2, 8, 9, 10, 11, 12, and 14-16. In some implementations, the scheduled entity 1304 and/or the scheduled entity 1306 may correspond to the scheduled entity 106 (e.g., a UE) of FIG. 1 and/or any of the scheduled entities (e.g., UEs, IAB nodes, etc.) of any of FIGS. 2, 8, 9, 10, 11, 12, 14-15, and 26.

At step 1308, the scheduling entity 1302 optionally sends a configuration message for devices belonging to set 1. For example, the scheduling entity 1302 may specify a particular bit in DCI to be used by these devices for receiving a paging indication.

At block 1310, the scheduling entity 1302 determines that there is an SI change for the devices of set 1. Consequently, at step 1312, the scheduling entity 1302 sends a DCI that includes an SI change indication in a specific bit for set 1.

At block 1314, the scheduled entity 1304 looks for the specified bit in the DCI sent at step 1312 (e.g., the scheduled entity 1304 wakes according to its DRX cycle to search for a paging message). Consequently, the scheduled entity 1304 may commence monitoring (e.g., by exiting low power mode) for a SIB that includes the SI change.

In contrast, at block 1316, the scheduled entity 1306 does not look for the specified bit in the DCI sent at step 1312. For example, the scheduled entity 1306 may be configured to look for a default bit (e.g., bit 1 of a short message in the DCI). As a result, the scheduled entity 1306 may immediately return to a lower power state until its next DRX wakeup period occurs.

At step 1318, the scheduling entity broadcasts the SI change. Accordingly, this SI change may be received by the scheduled entity 1304 (and other members of set 1).

Optionally, the scheduling entity 1302 may page the devices of set 1 and set 2 together and using a common paging message/DCI. At block 1320, the scheduling entity 1302 determines that there is an SI change for all devices. Consequently, at step 1322, the scheduling entity 1302 sends a DCI that includes a global SI change indicator (e.g., bit 1 of a short message in the DCI).

At block 1324, the scheduled entity 1304 looks for the global bit in the DCI sent at step 1322 (e.g., the scheduled entity 1304 wakes according to its DRX cycle to search for a paging message). Consequently, the scheduled entity 1304 may commence monitoring (e.g., by exiting low power mode) for a SIB that includes the SI change.

At block 1326, the scheduled entity 1306 also looks for a global bit in the DCI sent at step 1322 (e.g., the scheduled entity 1306 wakes according to its DRX cycle to search for a paging message). Consequently, the scheduled entity 1306 may commence monitoring (e.g., by exiting low power mode) for a SIB that includes the SI change.

At step 1328, the scheduling entity broadcasts the SI change. Accordingly, this SI change may be received by the scheduled entity 1304 and the scheduled entity 1306 (and other devices served by the scheduling entity 1302).

In a third example implementation, a separate paging resource such as a search space is used to notify a set of devices (e.g., IAB-MTs) about an SI change that only affects that set of devices. In some networks, a cell-specific (common) search space is used for paging. In the third example implementation, at least one other paging search space is defined for indicating an SI change that is specific to a given set of devices. Other devices that are not a member of this set will not search for a paging message in this specific search space. Thus, these other devices will not waste battery power responding to the set-specific paging.

The network may configure a set of devices to use only one paging search space or to use more than one paging search space. For example, in the event a specific paging search space is configured by the network in addition to a common paging search space, the set of devices may be configured to monitor paging using only the specific paging search space (e.g., a backhaul-specific paging search space).

Alternatively, the set of devices may also be configured to monitor paging using the common paging search space. For example, IAB-MTs may be indicated (by the network) to also monitor the common paging search space. This allows allow the network the flexibility to, for example, page UEs and MTs together using a common paging message/DCI.

Figure 14:
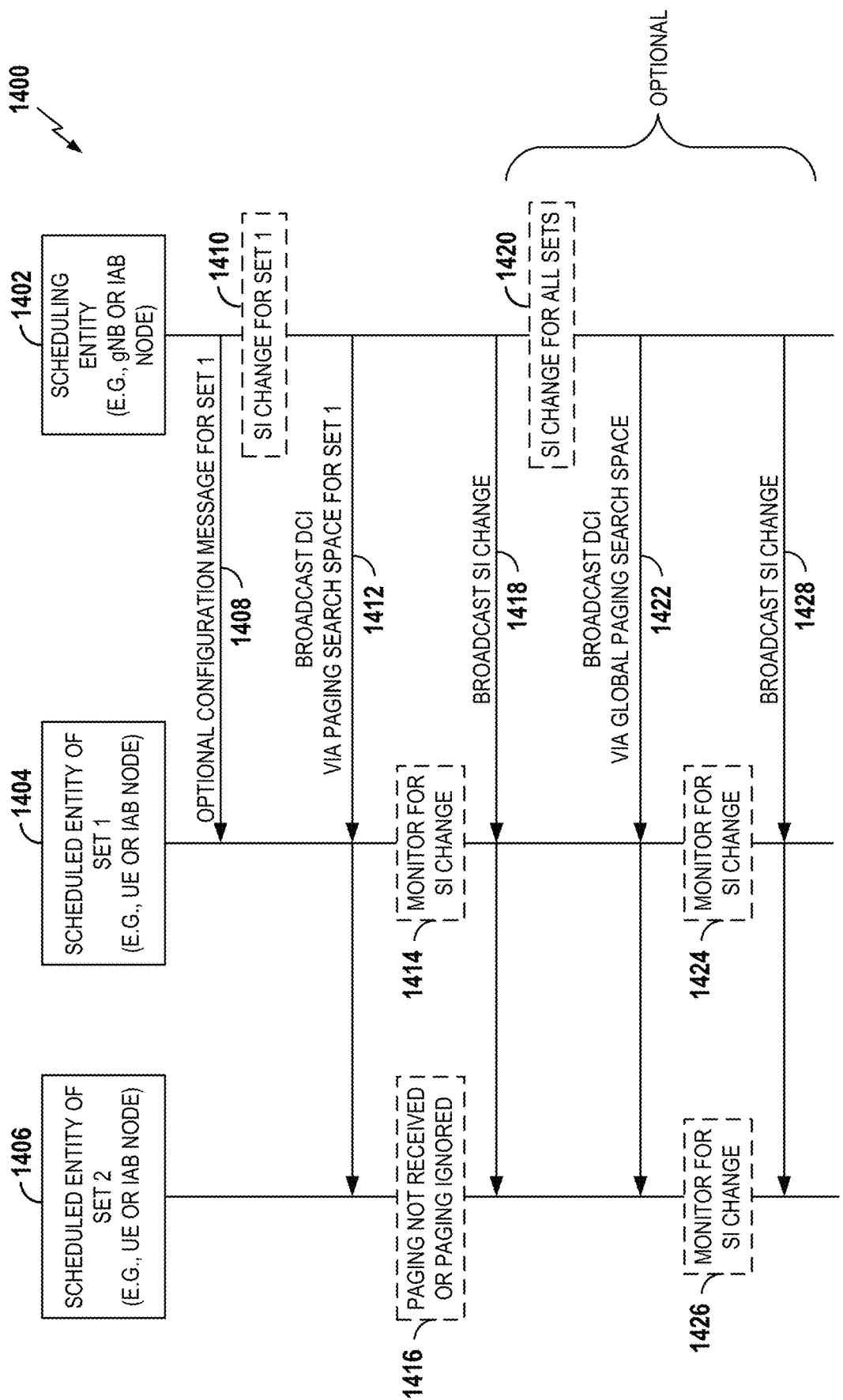
FIG. 14 is a diagram illustrating signaling when using different paging search spaces for indicating an SI change according to some aspects.

FIG. 14 illustrates an example of signaling in a communication system 1400 according to the third example implementation. The system 1400 includes a scheduling entity 1402, a scheduled entity 1404 that is associated with a first set of devices (set 1), and a scheduled entity 1406 that is associated with a second set of devices (set 2). It should be appreciated that the system 1400 would typically include other devices as well. In some implementations, the scheduling entity 1402 may correspond to the scheduling entity 108 (e.g., a gNB, a transmit receive point, etc.) of FIG. 1 and/or any of the scheduling entities (e.g., base stations, IAB nodes, etc.) of any of FIGS. 2, 8, 9, 10, 11, 12, 13, 15, and 16. In some implementations, the scheduled entity 1404 and/or the scheduled entity 1406 may correspond to the scheduled entity 106 (e.g., a UE) of FIG. 1 and/or any of the scheduled entities (e.g., UEs, IAB nodes, etc.) of any of FIGS. 2, 8, 9, 10, 11, 12, 13, 15, and 26.

At step 1408, the scheduling entity 1402 optionally sends a configuration message for devices belonging to set 1. For example, the scheduling entity 1402 may specify a particular paging search space to be used by these devices for receiving a paging indication.

At block 1410, the scheduling entity 1402 determines that there is an SI change for the devices of set 1. Consequently, at step 1412, the scheduling entity 1402 sends a DCI that includes an SI change indication via a specific paging search space for set 1.

At block 1414, the scheduled entity 1404 monitors the specific paging search space for the DCI sent at step 1412 (e.g., the scheduled entity 1404 wakes according to its DRX cycle to search for a paging message). Consequently, the scheduled entity 1404 may commence monitoring (e.g., by exiting low power mode) for a SIB that includes the SI change.

In contrast, at block 1416, the scheduled entity 1406 does not monitor the specific paging search space for the DCI sent at step 1412. For example, the scheduled entity 1406 may be configured to use a default paging search space. As a result, the scheduled entity 1406 may immediately return to a lower power state until its next DRX wakeup period occurs.

At step 1418, the scheduling entity broadcasts the SI change. Accordingly, this SI change may be received by the scheduled entity 1404 (and other members of set 1).

Optionally, the scheduling entity 1402 may page the devices of set 1 and set 2 together and using a common paging message/DCI. At block 1420, the scheduling entity 1402 determines that there is an SI change for all devices. Consequently, at step 1422, the scheduling entity 1402 sends a DCI that includes a SI change indicator via a global paging search space.

At block 1424, the scheduled entity 1404 monitors the global paging search space for the DCI sent at step 1422 (e.g., the scheduled entity 1404 wakes according to its DRX cycle to search for a paging message). Consequently, the scheduled entity 1404 may commence monitoring (e.g., by exiting low power mode) for a SIB that includes the SI change.

At block 1426, the scheduled entity 1406 also monitors the global paging search space for the DCI sent at step 1422 (e.g., the scheduled entity 1406 wakes according to its DRX cycle to search for a paging message). Consequently, the scheduled entity 1406 may commence monitoring (e.g., by exiting low power mode) for a SIB that includes the SI change.

At step 1428, the scheduling entity broadcasts the SI change. Accordingly, this SI change may be received by the scheduled entity 1404 and the scheduled entity 1406 (and other devices served by the scheduling entity 1402).

In a fourth example implementation, a separate paging resource such as a paging parameter is used by a set of devices (e.g., IAB-MTs) to determine the paging occasions to use to receive a paging message about an SI change that only affects that set of devices. In some networks, a UE (or MT) calculates its paging frame (PF) and paging occasions (PO) based on configured parameters. In the fourth example implementation, at least one other paging parameter is defined for a given set of devices. Since these devices use a different paging parameter than other devices, the set of devices will likely calculate a different paging occasion. It is therefore unlikely that other devices that are not a member of this set will monitor for a paging message in this paging occasion. Thus, these other devices will not waste battery power responding to the set-specific paging.

As discussed above, a UE (or IAB-MT) in RRC_IDLE or in RRC_INACTIVE will monitor for an SI change indication in its own paging occasion every DRX cycle. A UE (MT) calculates its paging frame (PF) and paging occasions (PO) based on several configured parameters. In some examples, the system frame number (SFN) for the PF may be determined by: (SFN+PF_offset) mod T=(T div N)* (UE_ID mod N). Here, T=DRX cycle of the UE, N=the number of total paging frames in T, PF_offset=the offset used for the PF determination, and UE_ID=5G-S-TMSI mod 1024. The values of N and PF_offset are derived from the paging parameter nAndPagingFrameOffset that is signaled in SIB1. Thus, by defining a specific nAndPagingFrameOffset parameter for a set of devices, the set of devices can be configured to use paging opportunities that are likely to be different from the paging opportunities used by other devices. For example, the network may define a backhaul-specific nAndPagingFrameOffset parameter (nAndPagingFrameOffset_IAB), that is optionally configured separately (e.g., in SIB1 or another SIB/RRC message). Thus, the network can configure backhaul-specific paging frames (or occasions). In practice, some of these paging occasions/frames may overlap with the default paging occasions (configured for UEs).

The network may configure a set of devices to use only one paging parameter or to use more than one paging parameter. For example, in the event a specific paging parameter is configured by the network in addition to a common paging parameter, the set of devices may be configured to determine a paging occasion using only the specific paging parameter (e.g., a backhaul-specific paging parameter).

Alternatively, the set of devices may also be configured to determine a paging occasion using a common paging parameter. For example, IAB-MTs may be indicated (by the network) to also use the common paging parameter. This allows allow the network the flexibility to, for example, page UEs and MTs together and using a common paging message/DCI.

Figure 15:
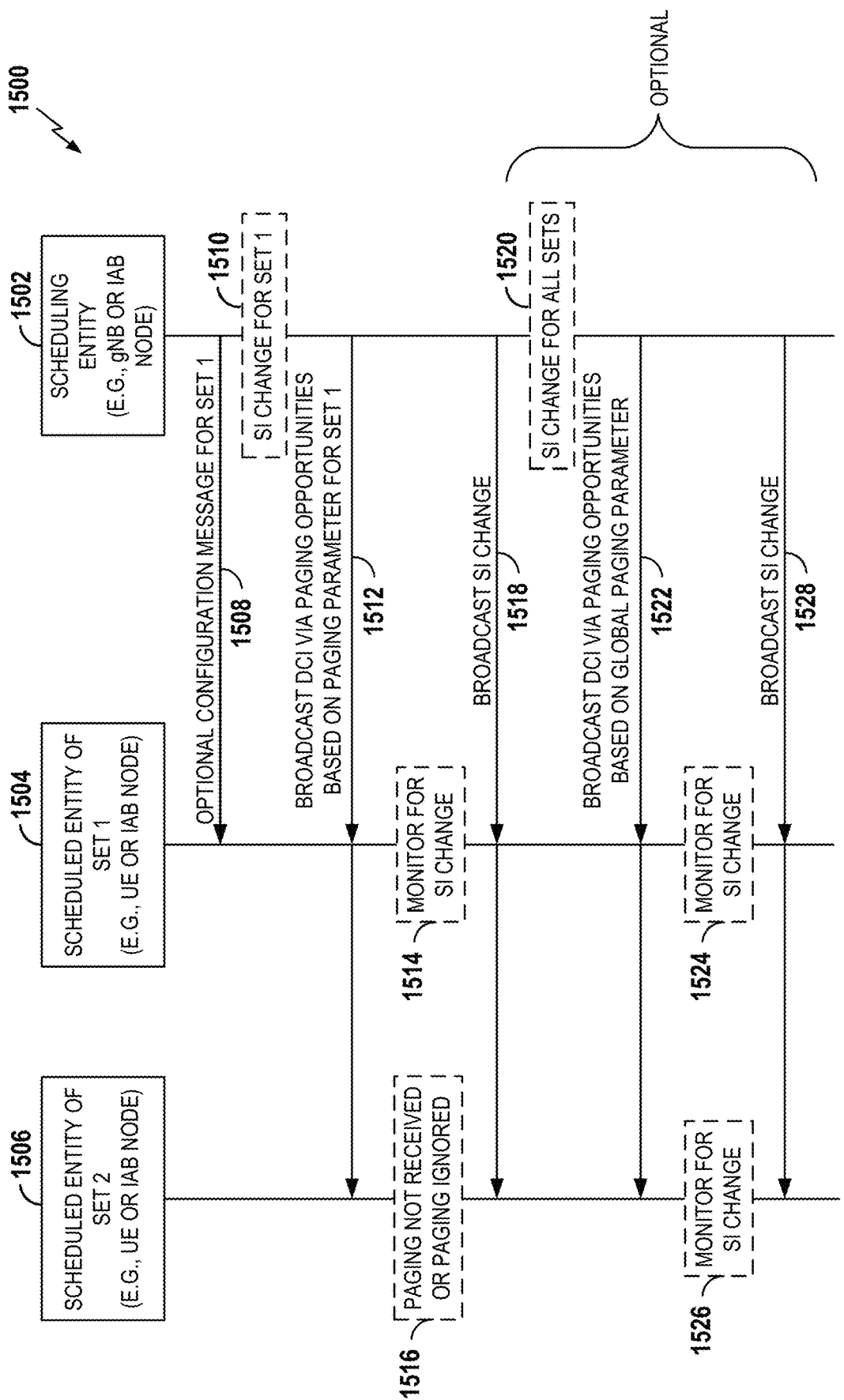
FIG. 15 is a diagram illustrating signaling when using different paging parameters for indicating an SI change according to some aspects.

FIG. 15 illustrates an example of signaling in a communication system 1500 according to the fourth example implementation. The system 1500 includes a scheduling entity 1502, a scheduled entity 1504 that is associated with a first set of devices (set 1), and a scheduled entity 1506 that is associated with a second set of devices (set 2). It should be appreciated that the system 1500 would typically include other devices as well. In some implementations, the scheduling entity 1502 may correspond to the scheduling entity 108 (e.g., a gNB, a transmit receive point, etc.) of FIG. 1 and/or any of the scheduling entities (e.g., base stations, IAB nodes, etc.) of any of FIGS. 2, 8, 9, 10, 11, 12, 13, 14, and 16. In some implementations, the scheduled entity 1504 and/or the scheduled entity 1506 may correspond to the scheduled entity 106 (e.g., a UE) of FIG. 1 and/or any of the scheduled entities (e.g., UEs, IAB nodes, etc.) of any of FIGS. 2, 8, 9, 10, 11, 12, 13, 14, and 26.

At step 1508, the scheduling entity 1502 optionally sends a configuration message for devices belonging to set 1. For example, the scheduling entity 1502 may specify a particular paging parameter (e.g., an nAndPagingFrameOffset parameter) to be used by these devices for determining at least one paging occasion for receiving a paging message.

At block 1510, the scheduling entity 1502 determines that there is an SI change for the devices of set 1. Consequently, at step 1512, the scheduling entity 1502 sends a DCI that includes an SI change indication via a paging opportunity that is based on the specific paging parameter for set 1.

At block 1514, the scheduled entity 1504 uses the specific paging parameter to identify a paging opportunity and monitors that paging parameter for the DCI sent at step 1512 (e.g., the scheduled entity 1504 wakes according to its DRX cycle to search for a paging message). Consequently, the scheduled entity 1504 may commence monitoring (e.g., by exiting low power mode) for a SIB that includes the SI change.

In contrast, at block 1516, the scheduled entity 1506 does not use the specific paging parameter that was using for sending the DCI sent at step 1512. For example, the scheduled entity 1506 may be configured to use a default paging parameter. As a result, the scheduled entity 1506 may immediately return to a lower power state until its next DRX wakeup period occurs.

At step 1518, the scheduling entity broadcasts the SI change. Accordingly, this SI change may be received by the scheduled entity 1504 (and other members of set 1).

Optionally, the scheduling entity 1502 may page the devices of set 1 and set 2 together and using a common paging message/DCI. At block 1520, the scheduling entity 1502 determines that there is an SI change for all devices. Consequently, at step 1522, the scheduling entity 1502 sends a DCI that includes a SI change indicator via a paging opportunity that was determined based on a global paging parameter (e.g., an nAndPagingFrameOffset parameter).

At block 1524, the scheduled entity 1504 uses the global paging parameter to identify a paging opportunity and monitors that paging parameter for the DCI sent at step 1522 (e.g., the scheduled entity 1504 wakes according to its DRX cycle to search for a paging message). Consequently, the scheduled entity 1504 may commence monitoring (e.g., by exiting low power mode) for a SIB that includes the SI change.

At block 1526, the scheduled entity 1506 also uses the global paging parameter to identify a paging opportunity and monitors that paging parameter for the DCI sent at step 1522 (e.g., the scheduled entity 1506 wakes according to its DRX cycle to search for a paging message). Consequently, the scheduled entity 1506 may commence monitoring (e.g., by exiting low power mode) for a SIB that includes the SI change.

At step 1528, the scheduling entity broadcasts the SI change. Accordingly, this SI change may be received by the scheduled entity 1504 and the scheduled entity 1506 (and other devices served by the scheduling entity 1502).

Figure 16:
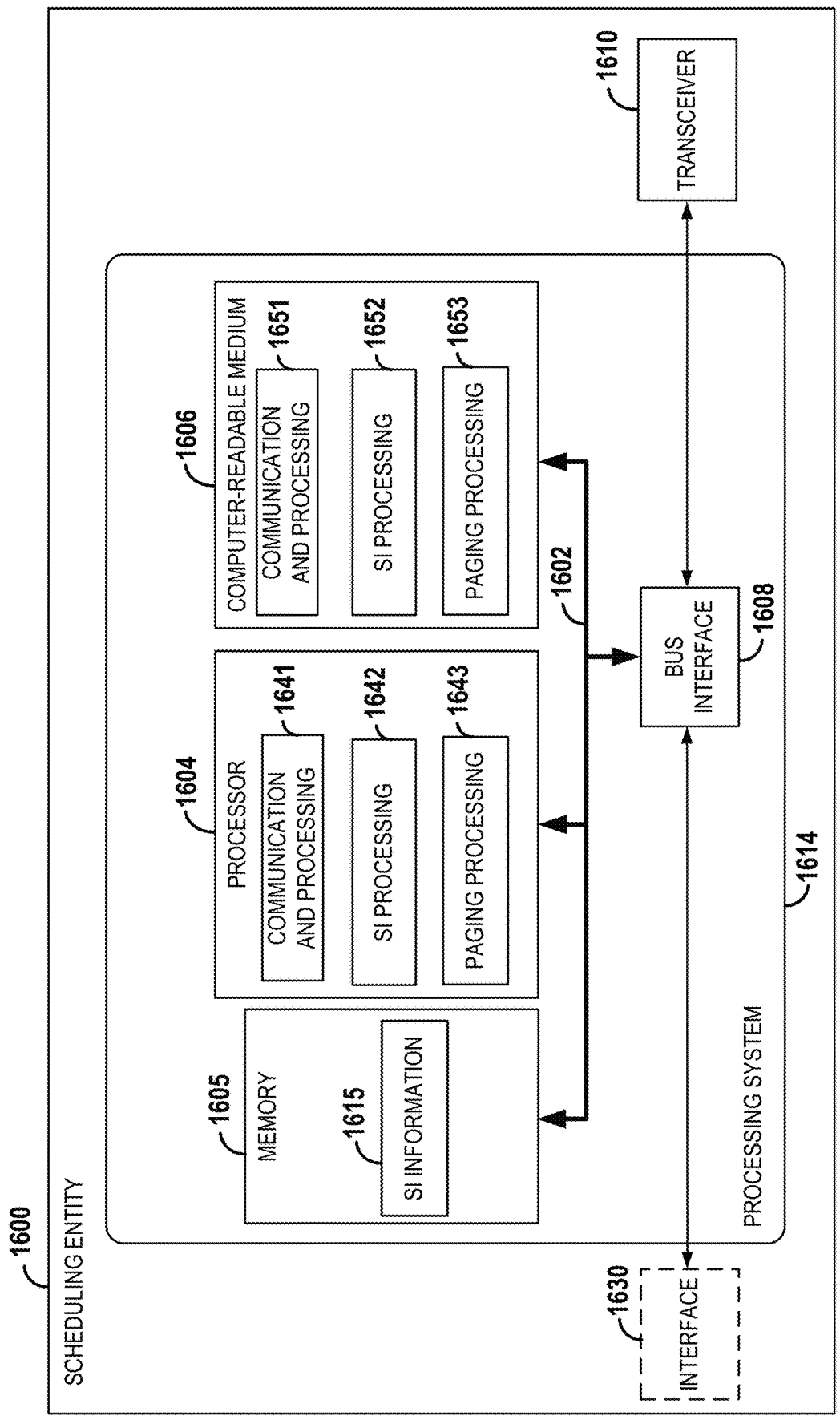
FIG. 16 is a block diagram illustrating an example of a hardware implementation for a scheduling entity employing a processing system according to some aspects.

FIG. 16 is a block diagram illustrating an example of a hardware implementation for a scheduling entity 1600 employing a processing system 1614. For example, the scheduling entity 1600 may be a device configured to wirelessly communicate with a scheduled entity, as discussed in any one or more of FIGS. 1-15. In some examples, the scheduling entity 1600 may be a base station (e.g., a gNB). In some examples, the scheduling entity 1600 may include IAB node functionality. In some implementations, the scheduling entity 1600 may correspond to any of the scheduling entities (e.g., base stations, IAB nodes, etc.) of any of FIGS. 1, 2, 8, 9, 10, 11, 12, 13, 14, and 15.

In accordance with various aspects of the disclosure, an element, or any portion of an element, or any combination of elements may be implemented with the processing system 1614. The processing system 1614 may include one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1600 may be configured to perform any one or more of the functions described herein. That is, the processor 1604, as utilized in a scheduling entity 1600, may be used to implement any one or more of the processes and procedures described herein.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from one or more scheduled entities.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610 and between the bus 1602 and an interface 1630. The transceiver 1610 may represent transmit functionality and/or receive functionality. The transceiver 1610 provides a communication interface or means for communicating with various other apparatus over a wireless transmission medium. The interface 1630 provides a communication interface or means of communicating with various other apparatuses and devices over an internal bus or external transmission medium, such as an Ethernet cable. For example, the interface 1630 (e.g., a network interface) may provide a means for communicating with at least one other apparatus within a core network and with at least one radio access network.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software. The memory 1605 may store SI information 1615 (e.g., SI-related parameters) used by the processor 1604 in cooperation with the transceiver 1610 for transmitting paging-related messages.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The scheduling entity 1600 may be configured to perform any one or more of the operations described herein (e.g., as described above in conjunction with FIGS. 1-15 and as described below in conjunction with FIGS. 17-25). In some aspects of the disclosure, the processor 1604, as utilized in the scheduling entity 1600, may include circuitry configured for various functions.

In examples in which the scheduling entity 1600 includes a child IAB node DU, a parent IAB node DU or an IAB donor node CU, the processor 1604 may generate, schedule, and modify a resource assignment or grant of time-frequency resources (e.g., a set of one or more resource elements) to a set of one or more child nodes of the IAB node. For example, the processor 1604 may schedule time-frequency resources within a plurality of time division duplex (TDD) and/or frequency division duplex (FDD) slots to carry user data traffic and/or control information to and/or from the set of one or more child nodes (e.g., UEs or child IAB nodes).

The processor 1604 may include communication and processing circuitry 1641. The communication and processing circuitry 1641 may be configured to communicate with a scheduled entity, such as a UE or IAB node. The communication and processing circuitry 1641 may include one or more hardware components that provide the physical structure that performs various processes related to wireless communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. In some examples, the communication and processing circuitry 1641 may include two or more transmit/receive chains, each configured to process signals in a different RAT (or RAN) type. The communication and processing circuitry 1641 may further be configured to execute communication and processing software 1651 included on the computer-readable medium 1606 to implement one or more functions described herein.

In examples in which the scheduling entity 1600 is a parent IAB node, the communication and processing circuitry 1542 may further be configured to communicate with a child IAB node via a first link (e.g., a backhaul link). In examples in which the scheduling entity 1600 is a child IAB node, the communication and processing circuitry 1542 may further be configured to communicate with a parent IAB node via a first link (e.g., a backhaul link) and a set of one or more child nodes (e.g., UEs or child IAB nodes) via respective second links (e.g., access or backhaul links). In examples in which the scheduling entity 1600 is an IAB donor node, the communication and processing circuitry 1542 may be configured to communicate with a parent IAB node and a child IAB node in an IAB network via one or more backhaul links.

In some implementations where the communication involves receiving information, the communication and processing circuitry 1641 may obtain information from a component of the scheduling entity 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving.

In some implementations where the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., means for transmitting).

The processor 1604 may include SI processing circuitry 1642 configured to perform SI processing-related operations as discussed herein (e.g., one or more of the operations described in conjunction with FIGS. 11-15). The SI processing circuitry 1642 may further be configured to provide the functionality of a means for determining that there is a system information change (e.g., as described at step 1208 of FIG. 12 and/or block 1310 of FIG. 13 and/or block 1410 of FIG. 14 and/or block 1510 of FIG. 15 and/or block 1702 of FIG. 17 and/or block 1802 of FIG. 18 and/or block 2002 of FIG. 20 and/or block 2102 of FIG. 21 and/or block 2202 of FIG. 22 and/or block 2402 of FIG. 24). The SI processing circuitry 1642 may further be configured to provide the functionality of a means for selecting a paging resource (e.g., selecting a paging search space and/or determining a paging opportunity) (e.g., as described at step 1408 of FIG. 14 and/or step 1508 of FIG. 15 and/or block 2106 of FIG. 21 and/or block 2206 of FIG. 22 and/or block 2406 of FIG. 24 and/or block 2408 of FIG. 24). The SI processing circuitry 1642 may further be configured to provide the functionality of a means for selecting a paging parameter (e.g., as described at step 1508 of FIG. 15 and/or block 2406 of FIG. 24). The SI processing circuitry 1642 may further be configured to provide the functionality of a means for transmitting a message via a paging resource (e.g., as described at step 1212 of FIG. 12 and/or step 1312 of FIG. 13 and/or step 1412 of FIG. 14 and/or step 1512 of FIG. 15 and/or block 1706 of FIG. 17 and/or block 1808 of FIG. 18 and/or block 2010 of FIG. 20 and/or block 2108 of FIG. 21 and/or block 2208 of FIG. 22 and/or block 2410 of FIG. 24). The SI processing circuitry 1642 may further be configured to execute SI processing software 1652 included on the computer-readable medium 1606 to implement one or more functions described herein.

The processor 1604 may include paging processing circuitry 1643 configured to perform paging processing-related operations as discussed herein. The paging processing circuitry 1643 may further be configured to provide the functionality of a means for selecting a P-RNTI (e.g., as described at step 1208 of FIG. 12 and/or block 1804 of FIG. 18 and/or block 1902 of FIG. 19). The paging processing circuitry 1643 may further be configured to provide the functionality of a means for generating a message indicating an SI change (e.g., as described at step 1212 of FIG. 12 and/or step 1312 of FIG. 13 and/or step 1412 of FIG. 14 and/or step 1512 of FIG. 15 and/or block 1704 of FIG. 17 and/or block 1806 of FIG. 18 and/or block 2004 of FIG. 20 and/or block 2104 of FIG. 21 and/or block 2204 of FIG. 22 and/or block 2404 of FIG. 24). The paging processing circuitry 1643 may further be configured to provide the functionality of a means for transmitting a message indicating an SI change (e.g., as described at step 1212 of FIG. 12 and/or step 1312 of FIG. 13 and/or step 1412 of FIG. 14 and/or step 1512 of FIG. 15 and/or block 1706 of FIG. 17 and/or block 1808 of FIG. 18 and/or block 2010 of FIG. 20 and/or block 2108 of FIG. 21 and/or block 2208 of FIG. 22 and/or block 2410 of FIG. 24). The paging processing circuitry 1643 may further be configured to provide the functionality of a means for generating a message including an SI modification field (e.g., as described at step 1312 of FIG. 13 and/or block 2004 of FIG. 20). The paging processing circuitry 1643 may further be configured to provide the functionality of a means for setting an SI modification field (e.g., as described at step 1312 of FIG. 13 and/or block 2006 of FIG. 20 and/or block 2008 of FIG. 20). The paging processing circuitry 1643 may further be configured to provide the functionality of a means for transmitting a message including an SI modification field (e.g., as described at step 1312 of FIG. 13 and/or block 2010 of FIG. 20). The paging processing circuitry 1643 may further be configured to execute paging processing software 1653 included on the computer-readable medium 1606 to implement one or more functions described herein.

Figure 17:
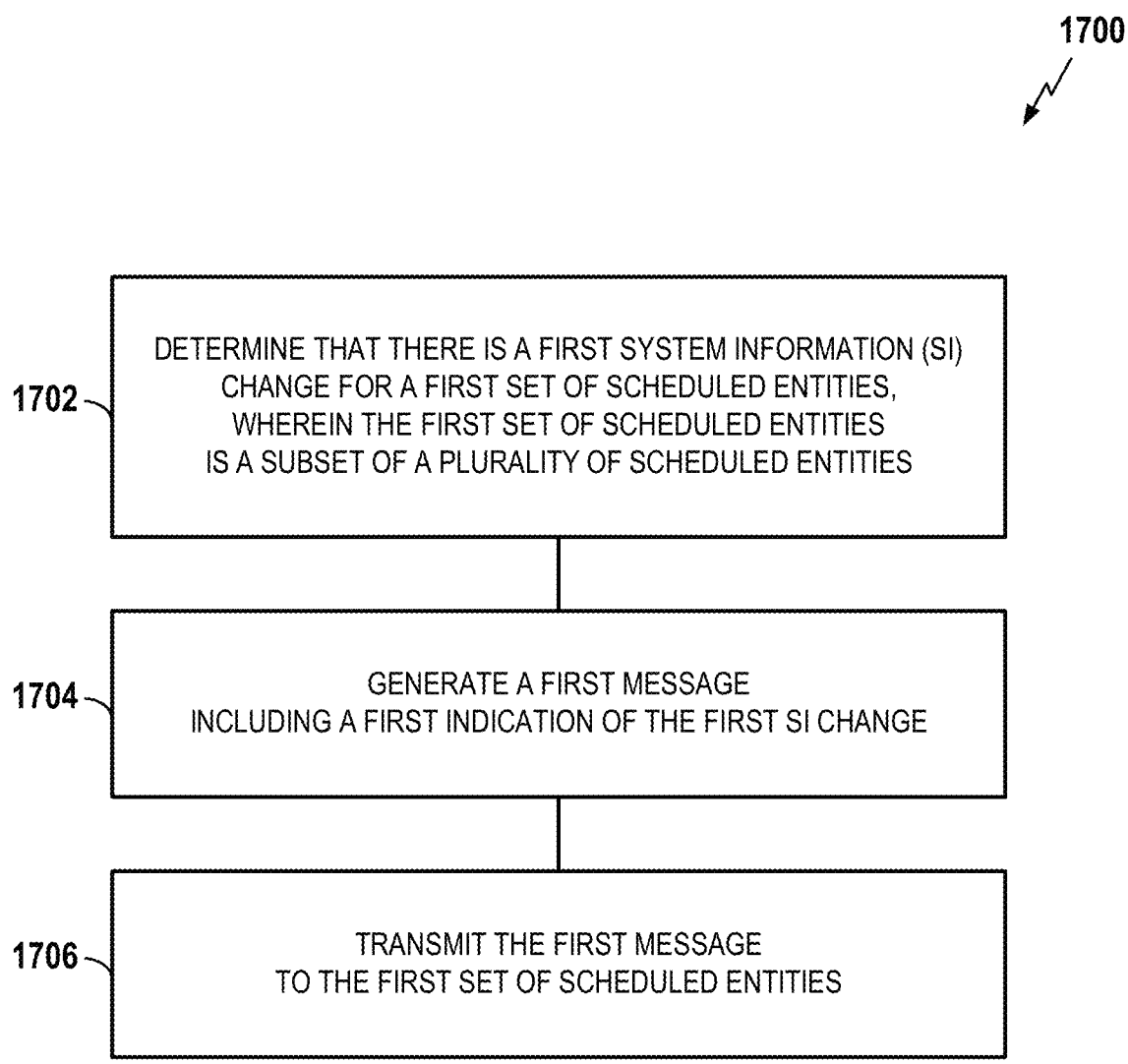
FIG. 17 is a flowchart illustrating an example process for indicating an SI change according to some aspects.

FIG. 17 is a flow chart illustrating an example process 1700 for a wireless communication system in accordance with some aspects of the present disclosure. As described below, some or all illustrated features may be omitted in a particular implementation within the scope of the present disclosure, and some illustrated features may not be required for implementation of all examples. In some examples, the process 1700 may be carried out by the scheduling entity 1600 of FIG. 16. In some examples, the process 1700 may be carried out by any suitable apparatus or means for carrying out the functions or algorithm described below.

At block 1702, a scheduling entity (e.g., an IAB node) may determine that there is a first system information (SI) change for a first set of scheduled entities, wherein the first set of scheduled entities is a subset of a plurality of scheduled entities. For example, the SI processing circuitry 1642, shown and described above in connection with FIG. 16, may determine that changes in the load or topology of the network result in a change in the SI for at least one scheduled entity.

At block 1704, the scheduling entity may generate a first message including a first indication of the first SI change. For example, the paging processing circuitry 1643 may generate a DCI that includes a short message (e.g., the short message of FIG. 7) indicating a change in SI.

In some examples, generating the first message may include generating the first message according to at least one configuration (e.g., a bit included in the message or a P-RNTI used to scramble the message) allocated for paging the first set of scheduled entities.

At block 1706, the scheduling entity may transmit the first message to the first set of scheduled entities. For example, the paging processing circuitry 1643 together with the communication and processing circuitry 1641 and the transceiver 1610, shown and described above in connection with FIG. 16, may transmit a DCI generated at block 1704 on a resource (e.g., a PDCCH) allocated for downlink transmissions to at least one scheduled entity.

In some examples, transmitting the first message may include transmitting the first message on at least one paging resource (e.g., a paging search space or a paging occasion) allocated for paging the first set of scheduled entities.

In some examples, generating the first message may include generating the first message with a first SI modification field allocated for paging the first set of scheduled entities and a second SI modification field allocated for paging a second set of scheduled entities of the plurality of scheduled entities. In some examples, generating the first message may include setting the first SI modification field to indicate the first SI change. In some examples, the process may further include determining that there is a second SI change for the second set of scheduled entities and setting the second SI modification field to indicate the second SI change.

In some examples, generating the first message may include encoding the first message using a first paging-radio network temporary identifier (P-RNTI) of a plurality of P-RNTIs. In some examples, the first P-RNTI is allocated for paging the first set of scheduled entities. In some examples, the process may further include determining that there is a second SI change for a second set of scheduled entities of the plurality of scheduled entities, selecting a second P-RNTI of the plurality of P-RNTIs, wherein the second P-RNTI is allocated for paging the second set of scheduled entities, encoding a second message using the second P-RNTI, wherein the second message may include a second indication of the second SI change, and transmitting the second message.

In some examples, transmitting the first message may include transmitting the first message via a first paging search space of a plurality of paging search spaces. In some examples, the first paging search space is allocated for paging the first set of scheduled entities. In some examples, the process may further include determining that there is a second SI change for a second set of scheduled entities of the plurality of scheduled entities, generating a second message including a second indication of the second SI change, and transmitting the second message via a second paging search space of the plurality of paging search spaces. In some examples, the second paging search space is allocated for paging the second set of scheduled entities.

In some examples, transmitting the first message may include selecting a first paging parameter of a plurality of paging parameters, wherein the first paging parameter is associated with the first set of scheduled entities, identifying a first paging occasion of a plurality of paging occasions based on the first paging parameter, and transmitting the first message via the first paging occasion. In some examples, the process may further include determining that there is a second SI change for a second set of scheduled entities of the plurality of scheduled entities, generating a second message including a second indication of the second SI change, selecting a second paging parameter of the plurality of paging parameters, wherein the second paging parameter is associated with the second set of scheduled entities, identifying a second paging occasion of the plurality of paging occasions based on the second paging parameter, and transmitting the second message via the second paging occasion.

Figure 18:
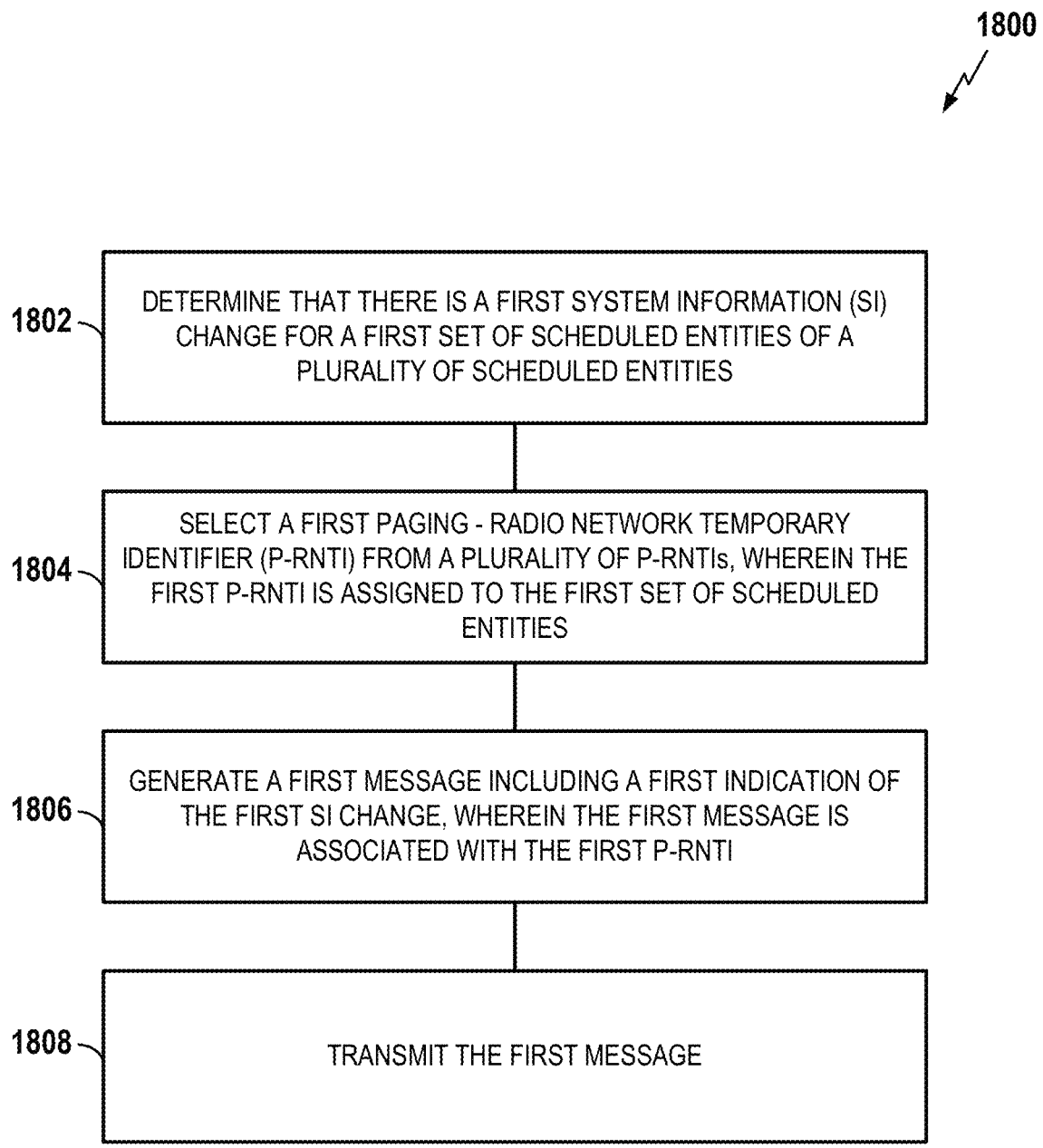
FIG. 18 is a flowchart illustrating an example process for using different P-RNTIs for indicating an SI change according to some aspects.

FIG. 18 is a flow chart illustrating an example process 1800 for a wireless communication system in accordance with some aspects of the present disclosure. In some examples, one or more aspects of the process 1800 may be implemented in conjunction with (e.g., as part of and/or in addition to) the process 1700 of FIG. 17. As described below, some or all illustrated features may be omitted in a particular implementation within the scope of the present disclosure, and some illustrated features may not be required for implementation of all examples. In some examples, the process 1800 may be carried out by the scheduling entity 1600 of FIG. 16. In some examples, the process 1800 may be carried out by any suitable apparatus or means for carrying out the functions or algorithm described below.

At block 1802, a scheduling entity (e.g., an IAB node) may determine that there is a first system information (SI) change for a first set of scheduled entities of a plurality of scheduled entities. For example, the SI processing circuitry 1642, shown and described above in connection with FIG. 16, may determine that changes in the load or topology of the network result in a change in the SI for at least one scheduled entity.

At block 1804, the scheduling entity may select a first paging-radio network temporary identifier (P-RNTI) from a plurality of P-RNTIs, wherein the first P-RNTI is assigned to the first set of scheduled entities. For example, the paging processing circuitry 1643, shown and described above in connection with FIG. 16, may select a P-RNTI from the set of P-RNTIs shown in FIG. 4.

At block 1806, the scheduling entity may generate a first message including a first indication of the first SI change, wherein the first message is associated with the first P-RNTI. For example, the paging processing circuitry 1643 may generate a DCI that includes a short message (e.g., the short message of FIG. 7) indicating a change in SI.

At block 1808, the scheduling entity may transmit the first message. For example, the paging processing circuitry 1643 together with the communication and processing circuitry 1641 and the transceiver 1610, shown and described above in connection with FIG. 16, may transmit the DCI generated at block 1806 on a resource (e.g., a PDCCH) allocated for downlink transmissions to at least one scheduled entity.

In some examples, the first set of scheduled entities may include at least one integrated access backhaul (IAB) node. In some examples, the first SI change may include a change in a random access channel (RACH) configuration for the at least one IAB node. In some examples, a second P-RNTI of the plurality of P-RNTIs is assigned to a second set of scheduled entities. In some examples, the second set of scheduled entities may include at least one user equipment (UE). In some examples, the first P-RNTI is exclusively reserved for the first set of scheduled entities. In some examples, the process further includes specifying a first RNTI value of a plurality of RNTI values for the first P-RNTI, and sending an indication that the first RNTI value is to be used for the first P-RNTI. In some examples, the process further includes determining that there is a second SI change for a second set of scheduled entities, selecting a second P-RNTI assigned to the second set of scheduled entities from the plurality of P-RNTIs, generating a second message that includes a second indication of the second SI change, wherein the second message is associated with the second P-RNTI, and sending the second message. In some examples, the first set of scheduled entities is a subset of the second set of scheduled entities. In some examples, the generating the first message may include including the first indication in a short message of a downlink control information (DCI), and scrambling the DCI using the first P-RNTI. In some examples, a process in accordance with the teachings herein may include any combination of the above operations.

Figure 19:
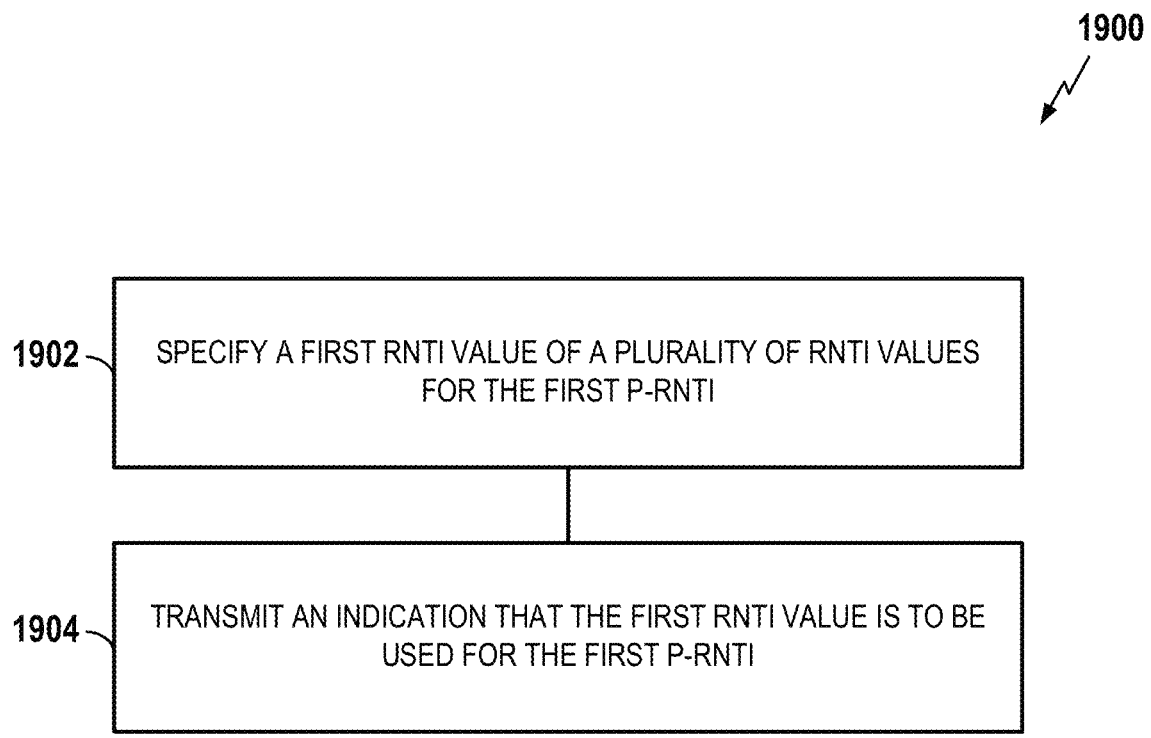
FIG. 19 is a flowchart illustrating an example process for using different P-RNTIs for indicating an SI change according to some aspects.

FIG. 19 is a flow chart illustrating an example process 1900 for a wireless communication system in accordance with some aspects of the present disclosure. In some examples, one or more aspects of the process 1900 may be implemented in conjunction with (e.g., as part of and/or in addition to) the process 1700 of FIG. 17. As described below, some or all illustrated features may be omitted in a particular implementation within the scope of the present disclosure, and some illustrated features may not be required for implementation of all examples. In some examples, the process 1900 may be carried out by the scheduling entity 1600 of FIG. 16. In some examples, the process 1900 may be carried out by any suitable apparatus or means for carrying out the functions or algorithm described below.

At block 1902, a scheduling entity (e.g., an IAB node) may specify a first RNTI value of a plurality of RNTI values for the first P-RNTI. For example, the paging processing circuitry 1643, shown and described above in connection with FIG. 16, may select a P-RNTI from the set of P-RNTIs shown in FIG. 4.

At block 1904, the scheduling entity may transmit an indication that the first RNTI value is to be used for the first P-RNTI. For example, the paging processing circuitry 1643 together with the communication and processing circuitry 1641 and the transceiver 1610, shown and described above in connection with FIG. 16, may generate a SIB or RRC message that includes the RNTI indication and transmit the SIB or RRC on an allocated resource.

Figure 20:
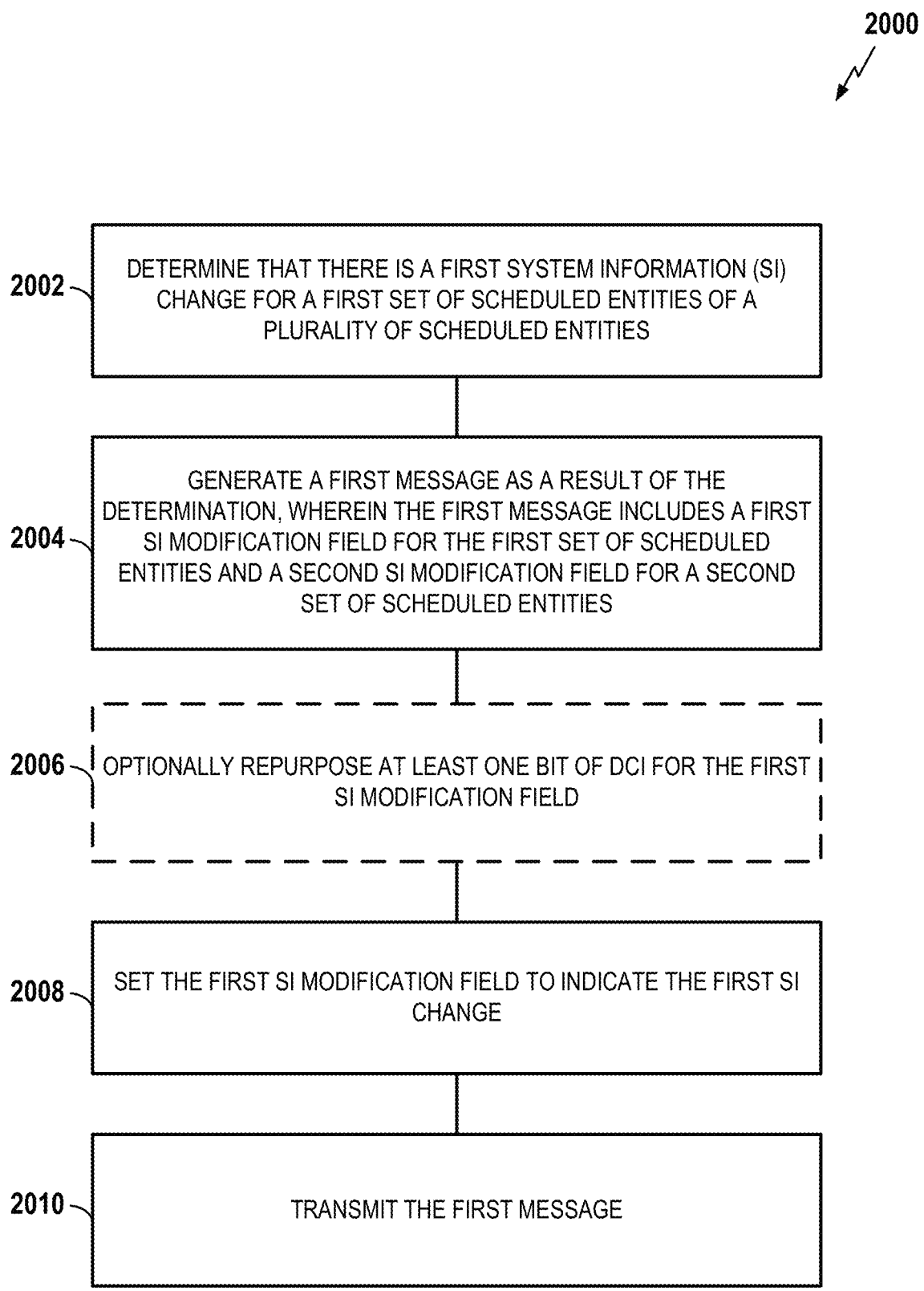
FIG. 20 is a flowchart illustrating an example process for using different bits for indicating an SI change according to some aspects.

FIG. 20 is a flow chart illustrating an example process 2000 for a wireless communication system in accordance with some aspects of the present disclosure. In some examples, one or more aspects of the process 2000 may be implemented in conjunction with (e.g., as part of and/or in addition to) the process 1700 of FIG. 17. As described below, some or all illustrated features may be omitted in a particular implementation within the scope of the present disclosure, and some illustrated features may not be required for implementation of all examples. In some examples, the process 2000 may be carried out by the scheduling entity 1600 of FIG. 16. In some examples, the process 2000 may be carried out by any suitable apparatus or means for carrying out the functions or algorithm described below.

At block 2002, a scheduling entity (e.g., an IAB node) may determine that there is a first system information (SI) change for a first set of scheduled entities of a plurality of scheduled entities. For example, the SI processing circuitry 1642, shown and described above in connection with FIG. 16, may determine that changes in the load or topology of the network result in a change in the SI for at least one scheduled entity.

At block 2004, the scheduling entity may generate a first message as a result of the determination, wherein the first message includes a first SI modification field for the first set of scheduled entities and a second SI modification field for a second set of scheduled entities. For example, the paging processing circuitry 1643, shown and described above in connection with FIG. 16, may generate a DCI with a field for indicating a change in SI.

At optional block 2006, the scheduling entity may repurpose at least one bit of the DCI for the first SI modification field. For example, the paging processing circuitry 1643 may generate a DCI where at least one bit of the third field 506 of FIG. 5 is repurposed to indicate a change in SI.

At block 2008, the scheduling entity may set the first SI modification field to indicate the first SI change. For example, the paging processing circuitry 1643 may set a bit in a field for indicating a change in SI to a value of 1.

At block 2010, the scheduling entity may transmit the first message. For example, the paging processing circuitry 1643 together with the communication and processing circuitry 1641 and the transceiver 1610, shown and described above in connection with FIG. 16, may transmit the DCI generated at block 2004 on a resource (e.g., a PDCCH) allocated for downlink transmissions to at least one scheduled entity.

In some examples, the first set of scheduled entities may include at least one integrated access backhaul (IAB) node. In some examples, the second set of scheduled entities may include at least one user equipment (UE). In some examples, the first SI change may include a change in a random access channel (RACH) configuration for the at least one IAB node. In some examples, the first message may include a short message of a downlink control information (DCI). In some examples, the second SI modification field may include a systemInfoModification bit. In some examples, the first SI modification field may include at least one bit exclusively reserved in the short message for indicating SI changes for the first set of scheduled entities. In some examples, the first message may include a downlink control information (DCI). In some examples, the DCI may include a short message, and the second SI modification field may include a systemInfoModification bit of the short message. In some examples, the process further includes repurposing at least one bit of the DCI for the first SI modification field. In some examples, the at least one bit may include at least one of a frequency domain resource assignment bit, a time domain resource assignment bit, a virtual resource block-to-physical resource block (VRB-to-PRB) mapping bit, a modulation and coding scheme (MCS) bit, a transport block (TB) scaling bit, or any combination thereof. In some examples, the process further includes determining that there is a second SI change for the second set of scheduled entities, and setting the second field to indicate the second SI change. In some examples, the first set of scheduled entities is a subset of the second set of scheduled entities. In some examples, a process in accordance with the teachings herein may include any combination of the above operations.

Figure 21:
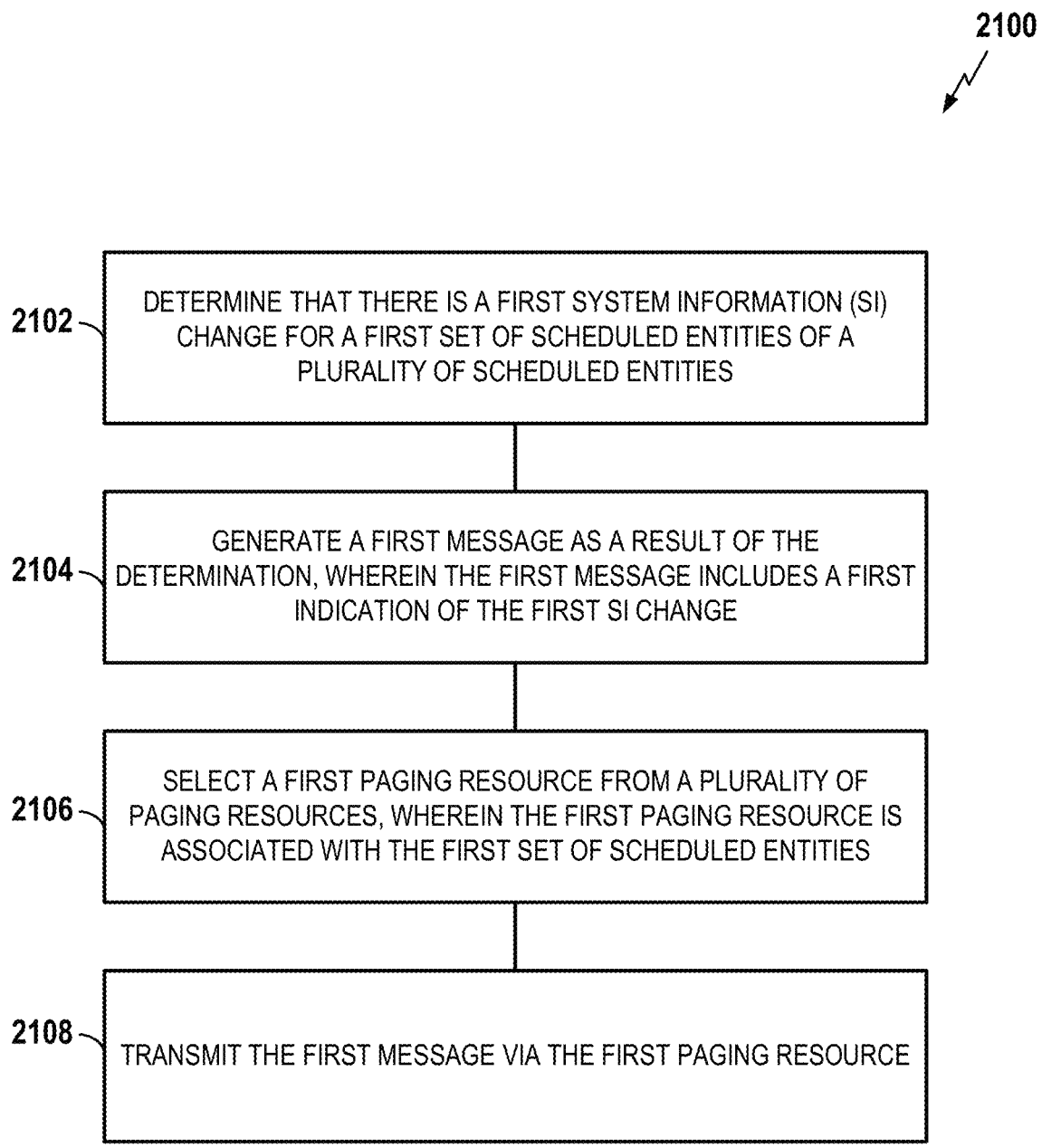
FIG. 21 is a flowchart illustrating an example process for using different paging resources for indicating an SI change according to some aspects.

FIG. 21 is a flow chart illustrating an example process 2100 for a wireless communication system in accordance with some aspects of the present disclosure. In some examples, one or more aspects of the process 2100 may be implemented in conjunction with (e.g., as part of and/or in addition to) the process 1700 of FIG. 17. As described below, some or all illustrated features may be omitted in a particular implementation within the scope of the present disclosure, and some illustrated features may not be required for implementation of all examples. In some examples, the process 2100 may be carried out by the scheduling entity 1600 of FIG. 16. In some examples, the process 2100 may be carried out by any suitable apparatus or means for carrying out the functions or algorithm described below.

At block 2102, a scheduling entity (e.g., an IAB node) may determine that there is a first system information (SI) change for a first set of scheduled entities of a plurality of scheduled entities. For example, the SI processing circuitry 1642, shown and described above in connection with FIG. 16, may determine that changes in the load or topology of the network result in a change in the SI for at least one scheduled entity.

At block 2104, the scheduling entity may generate a first message as a result of the determination, wherein the first message includes a first indication of the first SI change. For example, the paging processing circuitry 1643, shown and described above in connection with FIG. 16, may generate a DCI that includes a short message (e.g., the short message of FIG. 7) where one or more bits (e.g., reserved bits) are used for indicating a change in SI.

At block 2106, the scheduling entity may select a first paging resource from a plurality of paging resources, wherein the first paging resource is associated with (e.g., is assigned to) the first set of scheduled entities. For example, the paging processing circuitry 1643 may select a subset of a set of available paging resources.

At block 2108, the scheduling entity may transmit the first message via the first paging resource. For example, the paging processing circuitry 1643 together with the communication and processing circuitry 1641 and the transceiver 1610, shown and described above in connection with FIG. 16, may transmit the message generated at block 2104 on the paging resource (e.g., on the specified frequency and time resources) selected at block 2106.

In some examples, the plurality of paging resources may include a plurality of paging search spaces, and the first paging resource may include a first paging search space of the plurality of paging search spaces. In some examples, a second paging search space of the plurality of paging search spaces is associated with a second set of scheduled entities. In some examples, the second set of scheduled entities may include at least one user equipment (UE). In some examples, the first message may include a short message of a downlink control information (DCI).

In some examples, the plurality of paging resources may include a plurality of paging opportunities, the first paging resource may include at least one first paging opportunity of the plurality of paging opportunities, and a second paging opportunity of the plurality of paging opportunities is associated with a second set of scheduled entities. In some examples, the process may further include determining, based on a first paging parameter, a number of total paging frames and a paging frame offset, and determining, based on the number of total paging frames and the paging frame offset, a system frame number for a paging frame. In some examples, the first paging parameter may include an nAndPagingFrameOffset parameter.

In some examples, the first set of scheduled entities may include at least one integrated access backhaul (IAB) node. In some examples, the first SI change may include a change in a random access channel (RACH) configuration for the at least one IAB node. In some examples, a second paging search space of the plurality of paging search spaces is associated with (e.g., is assigned to) a second set of scheduled entities. In some examples, the second set of scheduled entities may include at least one user equipment (UE). In some examples, the first message may include a short message of a downlink control information (DCI). In some examples, the process further includes specifying the first paging search space for paging the first set of scheduled entities, and sending an indication that the first paging search space is to be used for paging the first set of scheduled entities. In some examples, the process further includes determining that there is a second SI change for a second set of scheduled entities, generating a second message as a result of the determination that there is a second SI change, wherein the second message may include a second indication of the second SI change, selecting a second paging search space associated with (e.g., assigned to) the second set of scheduled entities from the plurality of paging search spaces, and sending the second message via the second paging search space. In some examples, the first set of scheduled entities is a subset of the second set of scheduled entities. In some examples, a process in accordance with the teachings herein may include any combination of the above operations.

Figure 22:
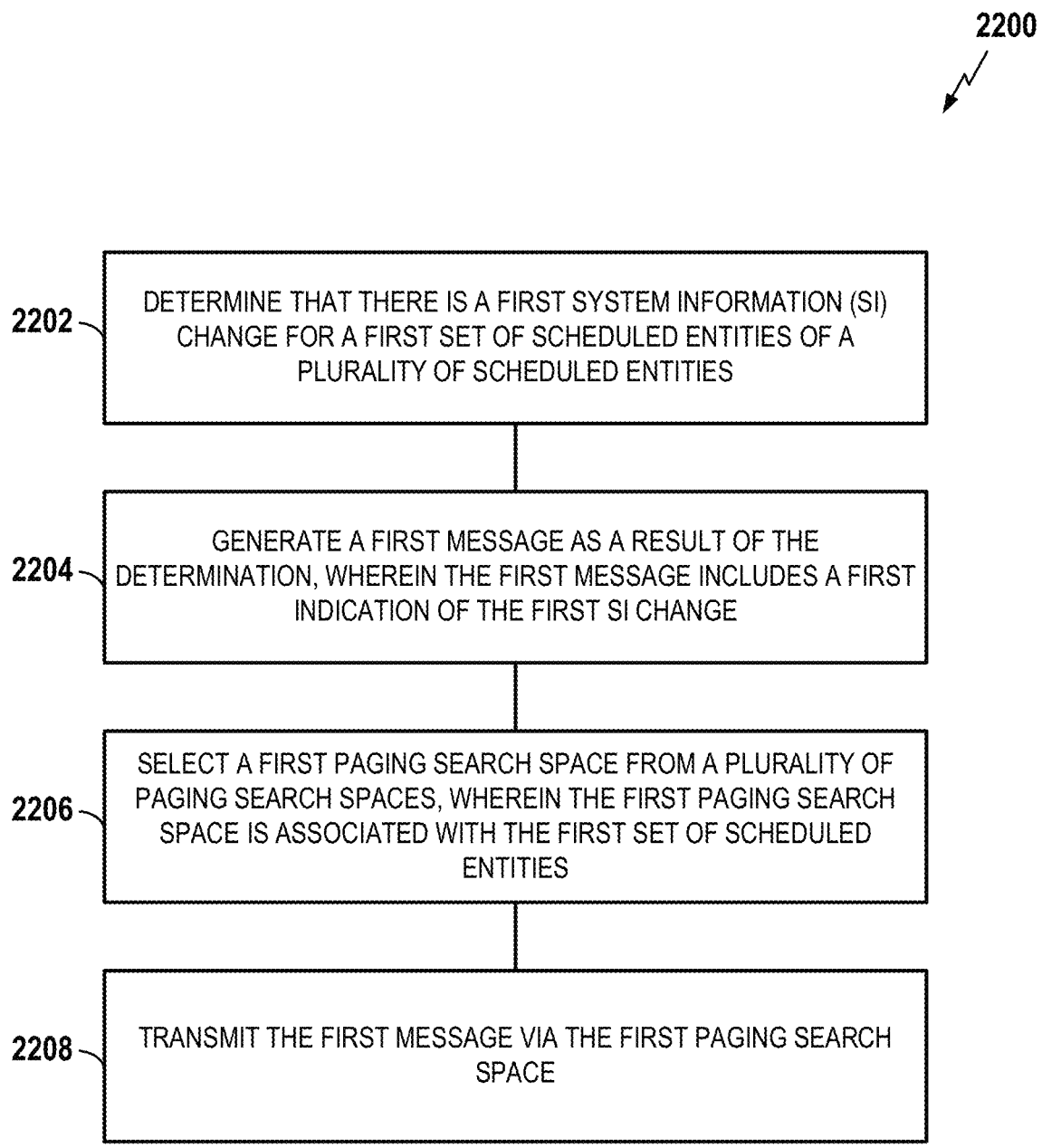
FIG. 22 is a flowchart illustrating an example process for using different paging search spaces for indicating an SI change according to some aspects.

FIG. 22 is a flow chart illustrating an example process 2200 for a wireless communication system in accordance with some aspects of the present disclosure. In some examples, one or more aspects of the process 2200 may be implemented in conjunction with (e.g., as part of and/or in addition to) the process 1700 of FIG. 17. As described below, some or all illustrated features may be omitted in a particular implementation within the scope of the present disclosure, and some illustrated features may not be required for implementation of all examples. In some examples, the process 2200 may be carried out by the scheduling entity 1600 of FIG. 16. In some examples, the process 2200 may be carried out by any suitable apparatus or means for carrying out the functions or algorithm described below.

At block 2202, a scheduling entity (e.g., an IAB node) may determine that there is a first system information (SI) change for a first set of scheduled entities of a plurality of scheduled entities. For example, the SI processing circuitry 1642, shown and described above in connection with FIG. 16, may determine that changes in the load or topology of the network result in a change in the SI for at least one scheduled entity.

At block 2204, the scheduling entity may generate a first message as a result of the determination, wherein the first message includes a first indication of the first SI change. For example, the paging processing circuitry 1643, shown and described above in connection with FIG. 16, may generate a DCI that includes a short message (e.g., the short message of FIG. 7) where one or more bits (e.g., reserved bits) are used for indicating a change in SI.

At block 2206, the scheduling entity may select a first paging search space from a plurality of paging search spaces, wherein the first paging search space is associated with (e.g., is assigned to) the first set of scheduled entities.

For example, the paging processing circuitry 1643 may select a subset of a set of available paging search space resources.

At block 2208, the scheduling entity may transmit the first message via the first paging search space. For example, the paging processing circuitry 1643 together with the communication and processing circuitry 1641 and the transceiver 1610, shown and described above in connection with FIG. 16, may transmit the message generated at block 2204 on the paging search space (e.g., on the specified frequency and time resources) selected at block 2206.

In some examples, the first set of scheduled entities may include at least one integrated access backhaul (IAB) node. In some examples, the first SI change may include a change in a random access channel (RACH) configuration for the at least one IAB node. In some examples, a second paging search space of the plurality of paging search spaces is associated with (e.g., is assigned to) a second set of scheduled entities. In some examples, the second set of scheduled entities may include at least one user equipment (UE). In some examples, the first message may include a short message of a downlink control information (DCI). In some examples, the process further includes specifying the first paging search space for paging the first set of scheduled entities, and sending an indication that the first paging search space is to be used for paging the first set of scheduled entities. In some examples, the process further includes determining that there is a second SI change for a second set of scheduled entities, generating a second message as a result of the determination that there is a second SI change, wherein the second message may include a second indication of the second SI change, selecting a second paging search space associated with (e.g., assigned to) the second set of scheduled entities from the plurality of paging search spaces, and sending the second message via the second paging search space. In some examples, the first set of scheduled entities is a subset of the second set of scheduled entities. In some examples, a process in accordance with the teachings herein may include any combination of the above operations.

Figure 23:
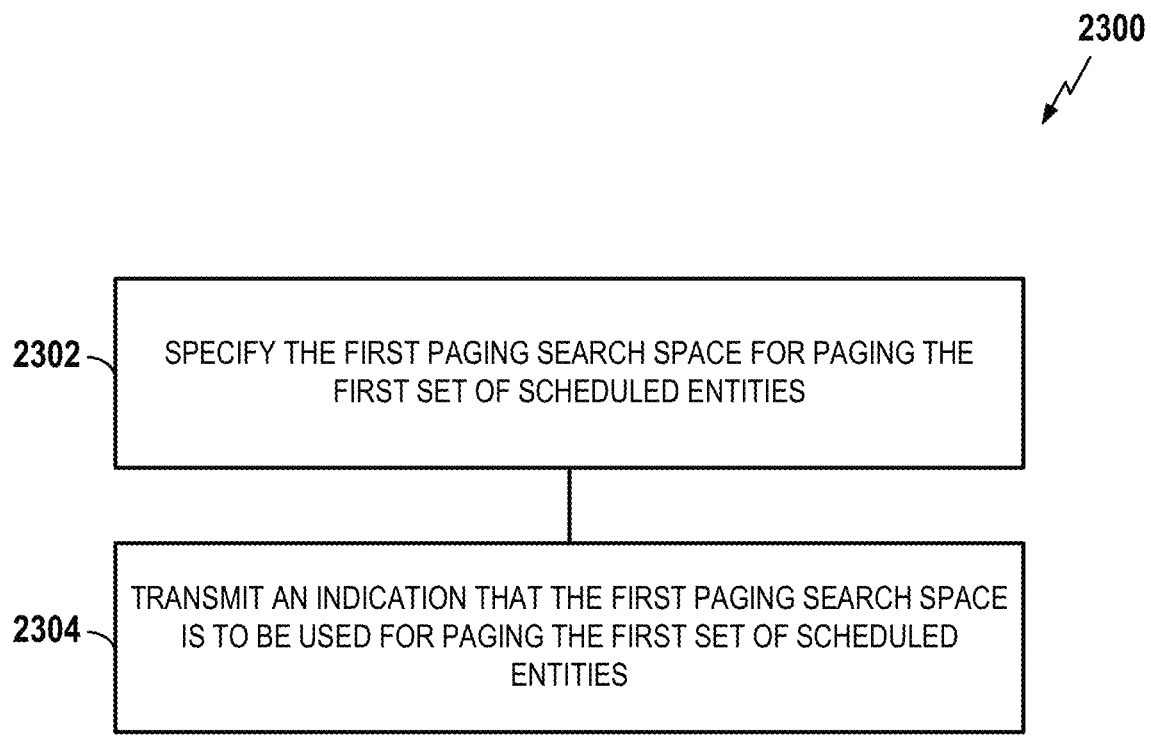
FIG. 23 is a flowchart illustrating an example process for using different paging search spaces for indicating an SI change according to some aspects.

FIG. 23 is a flow chart illustrating an example process 2300 for a wireless communication system in accordance with some aspects of the present disclosure. In some examples, one or more aspects of the process 2300 may be implemented in conjunction with (e.g., as part of and/or in addition to) the process 1700 of FIG. 17. As described below, some or all illustrated features may be omitted in a particular implementation within the scope of the present disclosure, and some illustrated features may not be required for implementation of all examples. In some examples, the process 2300 may be carried out by the scheduling entity 1600 of FIG. 16. In some examples, the process 2300 may be carried out by any suitable apparatus or means for carrying out the functions or algorithm described below.

At block 2302, a scheduling entity (e.g., an IAB node) may specify the first paging search space for paging the first set of scheduled entities. For example, the paging processing circuitry 1643, shown and described above in connection with FIG. 16, may select a paging search space from a subset of available paging resources.

At block 2304, the scheduling entity may transmit an indication that the first paging search space is to be used for paging the first set of scheduled entities. For example, the paging processing circuitry 1643 together with the communication and processing circuitry 1641 and the transceiver 1610, shown and described above in connection with FIG. 16, may generate a SIB or RRC message that includes an indication of the designated search space and transmit the SIB or RRC on an allocated resource.

Figure 24:
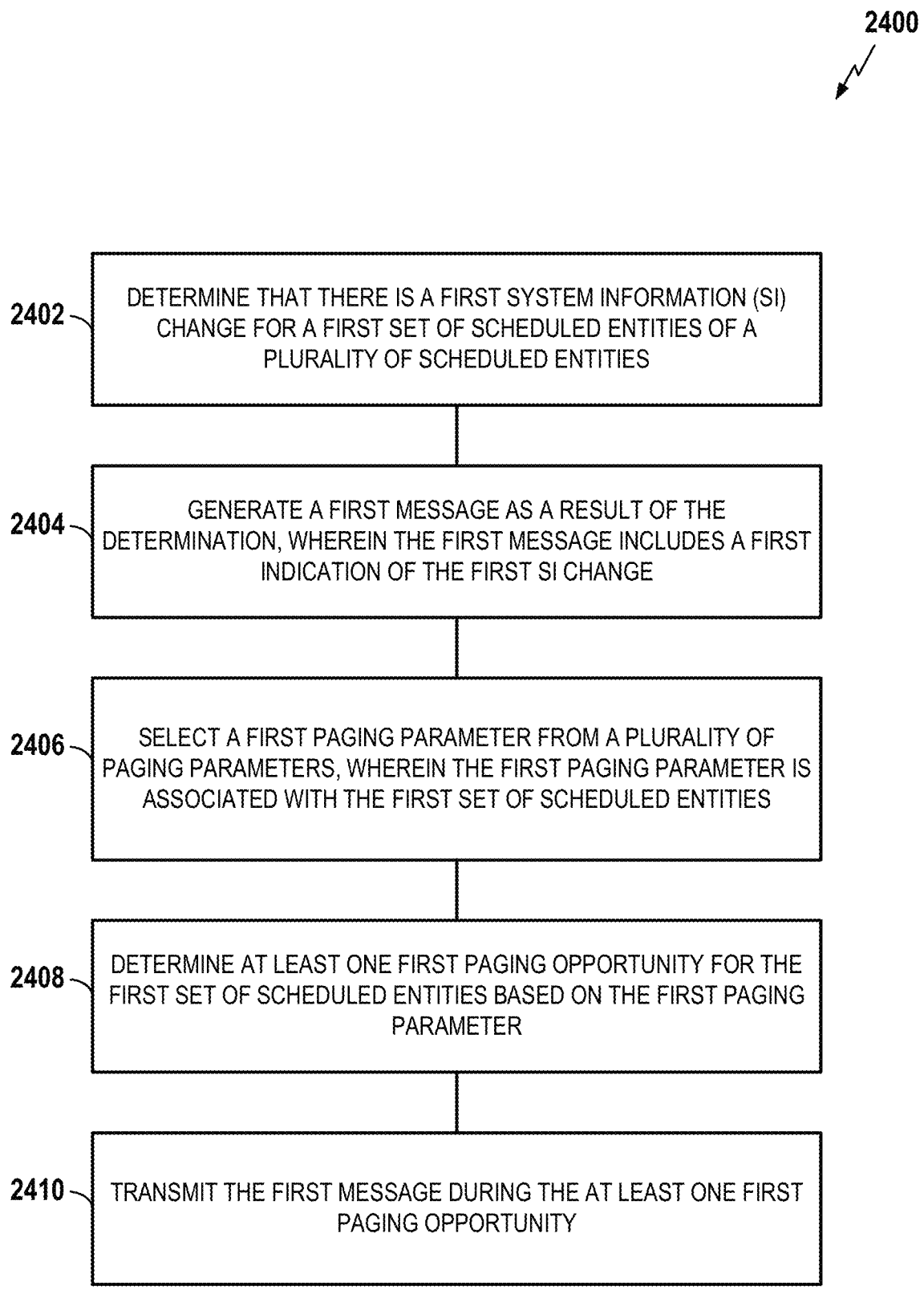
FIG. 24 is a flowchart illustrating an example process for using different paging parameters for indicating an SI change according to some aspects.

FIG. 24 is a flow chart illustrating an example process 2400 for a wireless communication system in accordance with some aspects of the present disclosure. In some examples, one or more aspects of the process 2400 may be implemented in conjunction with (e.g., as part of and/or in addition to) the process 1700 of FIG. 17. As described below, some or all illustrated features may be omitted in a particular implementation within the scope of the present disclosure, and some illustrated features may not be required for implementation of all examples. In some examples, the process 2400 may be carried out by the scheduling entity 1600 of FIG. 16. In some examples, the process 2400 may be carried out by any suitable apparatus or means for carrying out the functions or algorithm described below.

At block 2402, a scheduling entity (e.g., an IAB node) may determine that there is a first system information (SI) change for a first set of scheduled entities of a plurality of scheduled entities. For example, the SI processing circuitry 1642, shown and described above in connection with FIG. 16, may determine that changes in the load or topology of the network result in a change in the SI for at least one scheduled entity.

At block 2404, the scheduling entity may generate a first message as a result of the determination, wherein the first message includes a first indication of the first SI change. For example, the paging processing circuitry 1643, shown and described above in connection with FIG. 16, may generate a DCI that includes a short message (e.g., the short message of FIG. 7) where one or more bits (e.g., reserved bits) are used for indicating a change in SI.

At block 2406, the scheduling entity may select a first paging parameter from a plurality of paging parameters, wherein the first paging parameter is associated with (e.g., is assigned to) the first set of scheduled entities. For example, the paging processing circuitry 1643 may select a parameter value (e.g., nAndPagingFrameOffset) that is unique to the first set of scheduled entities.

At block 2408, the scheduling entity may determine at least one first paging opportunity for the first set of scheduled entities based on the first paging parameter. For example, the paging processing circuitry 1643 may use the formula described above in conjunction with the fourth example implementation of FIG. 15 to calculate one or more paging opportunity locations based on the first paging parameter.

At block 2410, the scheduling entity may transmit the first message during the at least one first paging opportunity. For example, the paging processing circuitry 1643 together with the communication and processing circuitry 1641 and the transceiver 1610, shown and described above in connection with FIG. 16, may transmit the message generated at block 2404 on a paging opportunity determined at block 2408.

In some examples, the first set of scheduled entities may include at least one integrated access backhaul (IAB) node. In some examples, the first SI change may include a change in a random access channel (RACH) configuration for the at least one IAB node. In some examples, a second paging opportunity of the plurality of paging opportunities is associated with (e.g., is assigned to) a second set of scheduled entities. In some examples, the second set of scheduled entities may include at least one user equipment (UE). In some examples, the first paging parameter may include an nAndPagingFrameOffset parameter. In some examples, the determination of the at least one first paging opportunity may include determining, based on the first paging parameter, a number of total paging frames and a paging frame offset, and determining, based on the number of total paging frames and the paging frame offset, a system frame number for a paging frame. In some examples, the first message may include a short message of a downlink control information (DCI). In some examples, the process further includes specifying the first paging parameter for paging the first set of scheduled entities, and sending an indication that the first paging parameter is to be used for paging the first set of scheduled entities. In some examples, the process further includes determining that there is a second system information (SI) change for a second set of scheduled entities, generating a second message as a result of the determination, wherein the second message may include a second indication of the second SI change, selecting a second paging parameter from the plurality of paging parameters, wherein the second paging parameter is associated with (e.g., is assigned to) the second set of scheduled entities, determining at least one second paging opportunity for the second set of scheduled entities based on the second paging parameter, and sending the second message during the at least one second paging opportunity. In some examples, the first set of scheduled entities is a subset of the second set of scheduled entities. In some examples, a process in accordance with the teachings herein may include any combination of the above operations.

Figure 25:
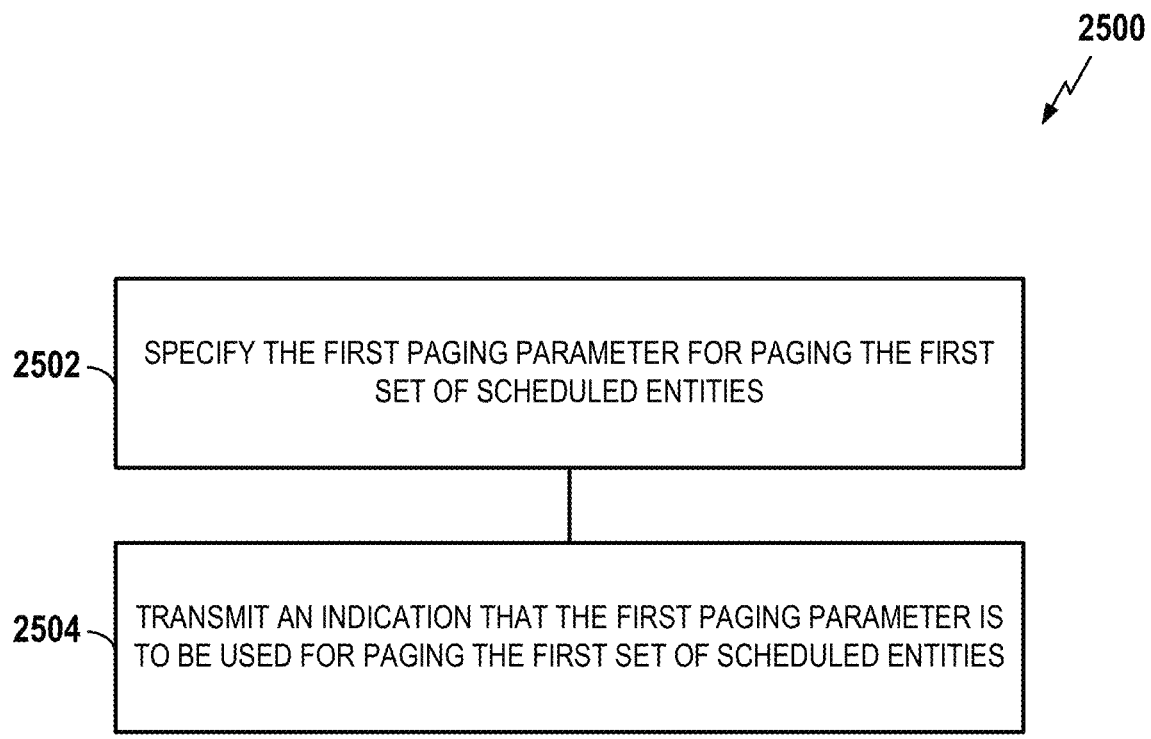
FIG. 25 is a flowchart illustrating an example process for using different paging parameters for indicating an SI change according to some aspects.

FIG. 25 is a flow chart illustrating an example process 2500 for a wireless communication system in accordance with some aspects of the present disclosure. In some examples, one or more aspects of the process 2500 may be implemented in conjunction with (e.g., as part of and/or in addition to) the process 1700 of FIG. 17. As described below, some or all illustrated features may be omitted in a particular implementation within the scope of the present disclosure, and some illustrated features may not be required for implementation of all examples. In some examples, the process 2500 may be carried out by the scheduling entity 1600 of FIG. 16. In some examples, the process 2500 may be carried out by any suitable apparatus or means for carrying out the functions or algorithm described below.

At block 2502, a scheduling entity (e.g., an IAB node) may specify the first paging parameter for paging the first set of scheduled entities. For example, the paging processing circuitry 1643, shown and described above in connection with FIG. 16, may select a paging parameter value (e.g., a value for the nAndPagingFrameOffset parameter) that is unique to the first set of schedule entities.

At block 2504, the scheduling entity may transmit an indication that the first paging parameter is to be used for paging the first set of scheduled entities. For example, the paging processing circuitry 1643 together with the communication and processing circuitry 1641 and the transceiver 1610, shown and described above in connection with FIG. 16, may generate a SIB or RRC message that includes the paging parameter indication and transmit the SIB or RRC on an allocated resource.

In some examples, a process in accordance with the teachings herein may include any combination of the above operations.

Figure 26:
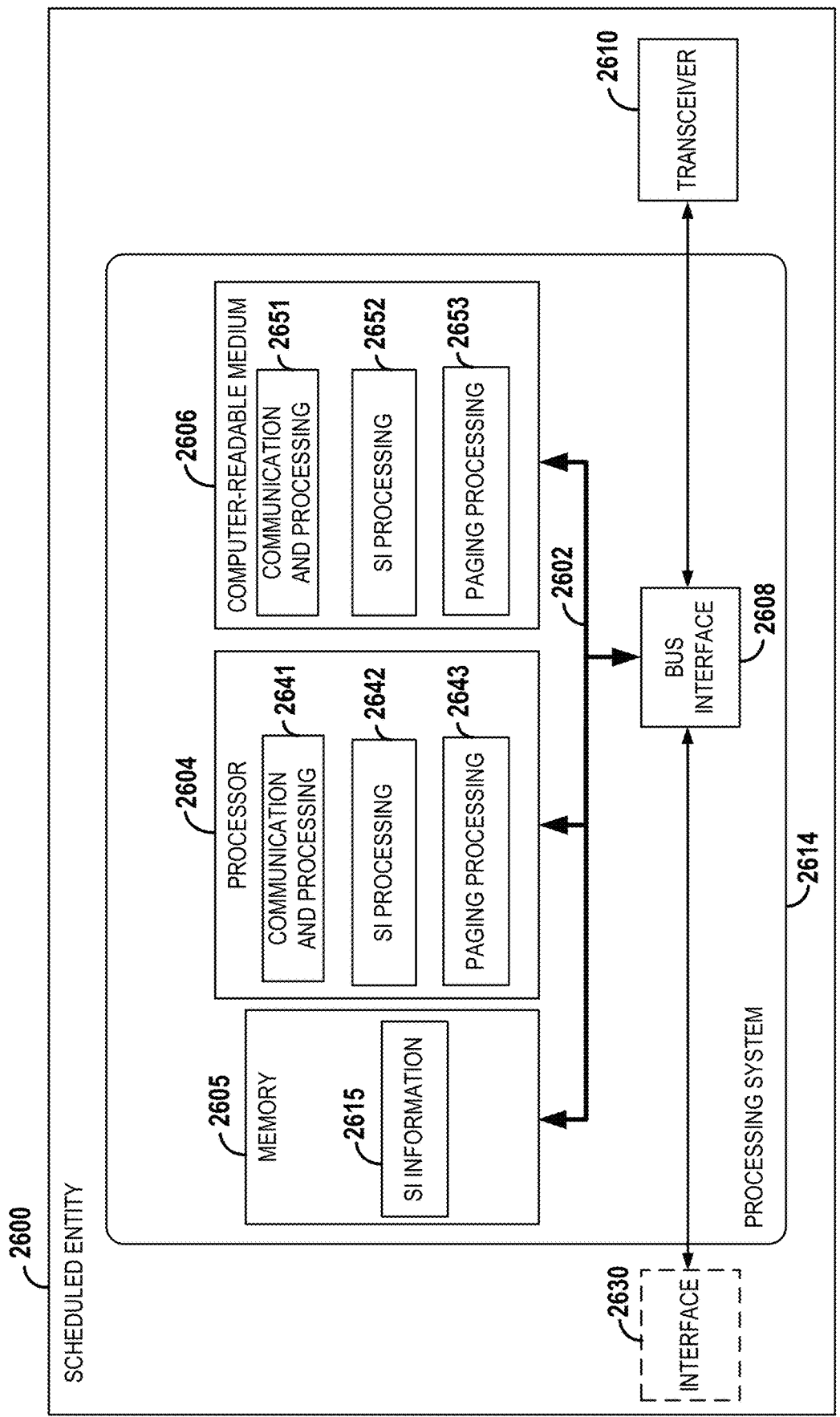
FIG. 26 is a block diagram illustrating an example of a hardware implementation for a scheduled entity employing a processing system according to some aspects.

FIG. 26 is a conceptual diagram illustrating an example of a hardware implementation for scheduled entity 2600 employing a processing system 2614. In some implementations, the scheduled entity 2600 may correspond to any of the scheduled entities (e.g., UEs) of any of FIGS. 1, 2, 8, 9, 10, 11, 12, 13, 14, and 15.

In accordance with various aspects of the disclosure, an element, or any portion of an element, or any combination of elements may be implemented with the processing system 2614. The processing system may include one or more processors 2604. The processing system 2614 may be substantially the same as the processing system 1614 illustrated in FIG. 16, including a bus interface 2608, a bus 2602, memory 2605, a processor 2604, and a computer-readable medium 2606. The memory 2605 may store SI information 2615 (e.g., SI-related parameters) used by the processor 2604 in cooperation with the transceiver 2610 for receiving paging messages. The bus interface 2608 provides an interface between the bus 2602 and a transceiver 2610 and between the bus 2602 and an interface 2630. The transceiver 2610 may represent transmit functionality and/or receive functionality. The transceiver 2610 provides a communication interface or means for communicating with various other apparatus over a wireless transmission medium. The interface 2630 provides a communication interface or means of communicating with various other apparatuses and devices over an internal bus or external transmission medium. Depending upon the nature of the apparatus, the interface 2630 may include a user interface (e.g., keypad, display, speaker, microphone, joystick). Of course, such a user interface is optional, and may be omitted in some examples.

The processor 2604 may in some instances be implemented via a baseband or modem chip and in other implementations, the processor 2604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

The scheduled entity 2600 may be configured to perform any one or more of the operations described herein (e.g., as described above in conjunction with FIGS. 1-15 and as described below in conjunction with FIGS. 27-32). In some aspects of the disclosure, the processor 2604, as utilized in the scheduled entity 2600, may include circuitry configured for various functions.

The processor 2604 may include communication and processing circuitry 2641. The communication and processing circuitry 2641 may be configured to communicate with a scheduling entity, such as a gNB or an IAB node. The communication and processing circuitry 2641 may include one or more hardware components that provide the physical structure that performs various processes related to wireless communication (e.g., signal reception and/or signal transmission) as described herein. The communication and processing circuitry 2641 may further include one or more hardware components that provide the physical structure that performs various processes related to signal processing (e.g., processing a received signal and/or processing a signal for transmission) as described herein. In some examples, the communication and processing circuitry 2641 may include two or more transmit/receive chains, each configured to process signals in a different RAT (or RAN) type. The communication and processing circuitry 2641 may further be configured to execute communication and processing software 2651 included on the computer-readable medium 2606 to implement one or more functions described herein.

In some implementations where the communication involves receiving information, the communication and processing circuitry 2641 may obtain information from a component of the scheduled entity 2600 (e.g., from the transceiver 2610 that receives the information via radio frequency signaling or some other type of signaling suitable for the applicable communication medium), process (e.g., decode) the information, and output the processed information. For example, the communication and processing circuitry 2641 may output the information to another component of the processor 2604, to the memory 2605, or to the bus interface 2608. In some examples, the communication and processing circuitry 2641 may receive one or more of signals, messages, other information, or any combination thereof. In some examples, the communication and processing circuitry 2641 may receive information via one or more channels. In some examples, the communication and processing circuitry 2641 may include functionality for a means for receiving.

In some implementations where the communication involves sending (e.g., transmitting) information, the communication and processing circuitry 2641 may obtain information (e.g., from another component of the processor 2604, the memory 2605, or the bus interface 2608), process (e.g., encode) the information, and output the processed information. For example, the communication and processing circuitry 2641 may output the information to the transceiver 2610 (e.g., that transmits the information via radio frequency signaling or some other type of signaling suitable for the applicable communication medium). In some examples, the communication and processing circuitry 2641 may send one or more of signals, messages, other information, or any combination thereof. In some examples, the communication and processing circuitry 2641 may send information via one or more channels. In some examples, the communication and processing circuitry 2641 may include functionality for a means for sending (e.g., means for transmitting).

The processor 2604 may include SI processing circuitry 2642 configured to perform SI processing-related operations as discussed herein (e.g., one or more of the operations described in conjunction with FIGS. 11-15). The SI processing circuitry 2642 may further be configured to provide the functionality of a means for receiving a message (e.g., as described at step 1312 of FIG. 13 and/or block 2702 of FIG. 27 and/or block 2902 of FIG. 29). The SI processing circuitry 2642 may further be configured to provide the functionality of a means for determining that there is a system information change (e.g., as described at block 1214 of FIG. 12 and/or block 1314 of FIG. 13 and/or block 1414 of FIG. 14 and/or block 1514 of FIG. 15 and/or block 2704 of FIG. 27 and/or block 2808 of FIG. 28 and/or block 2904 of FIG. 29 and/or block 3006 of FIG. 30 and/or block 3106 of FIG. 31 and/or block 3210 of FIG. 32). The SI processing circuitry 2642 may further be configured to provide the functionality of a means for monitoring a channel for an SI change (e.g., as described at step 1218 of FIG. 12 and/or step 1318 of FIG. 13 and/or step 1418 of FIG. 14 and/or step 1518 of FIG. 15 and/or block 2706 of FIG. 27 and/or block 2810 of FIG. 28 and/or block 2906 of FIG. 29 and/or block 3008 of FIG. 30 and/or block 3108 of FIG. 31 and/or block 3212 of FIG. 32). The SI processing circuitry 2642 may further be configured to provide the functionality of a means for receiving a message including an SI modification field (e.g., as described at step 1312 of FIG. 13 and/or block 2902 of FIG. 29). The SI processing circuitry 2642 may further be configured to execute SI processing software 2652 included on the computer-readable medium 2606 to implement one or more functions described herein.

The processor 2604 may include paging processing circuitry 2643 configured to perform paging processing-related operations as discussed herein (e.g., one or more of the operations described in conjunction with FIGS. 11-15). The paging processing circuitry 2643 may further be configured to provide the functionality of a means for decoding a message using a P-RNTI (e.g., as described at block 1214 of FIG. 12 and/or block 2704 of FIG. 27 block 2806 of FIG. 28). The paging processing circuitry 2643 may further be configured to provide the functionality of a means for receiving a message via a paging resource (e.g., a paging search space and/or a paging opportunity) (e.g., as described at block 1214 of FIG. 12 and/or block 1314 of FIG. 13 and/or block 1414 of FIG. 14 and/or block 1514 of FIG. 15 and/or block 2702 of FIG. 27 and/or block 2804 of FIG. 28 and/or block 2902 of FIG. 29 and/or block 3004 of FIG. 30 and/or block 3104 of FIG. 31 and/or block 3208 of FIG. 32). The paging processing circuitry 2634 may further be configured to provide the functionality of a means for selecting a paging parameter (e.g., as described at block 1514 of FIG. 15 and/or block 3204 of FIG. 32). The paging processing circuitry 2634 may further be configured to provide the functionality of a means for determining a paging opportunity (e.g., as described at block 1514 of FIG. 15 and/or block 3206 of FIG. 32). The paging processing circuitry 2643 may further be configured to execute paging processing software 2653 included on the computer-readable medium 2606 to implement one or more functions described herein.

Figure 27:
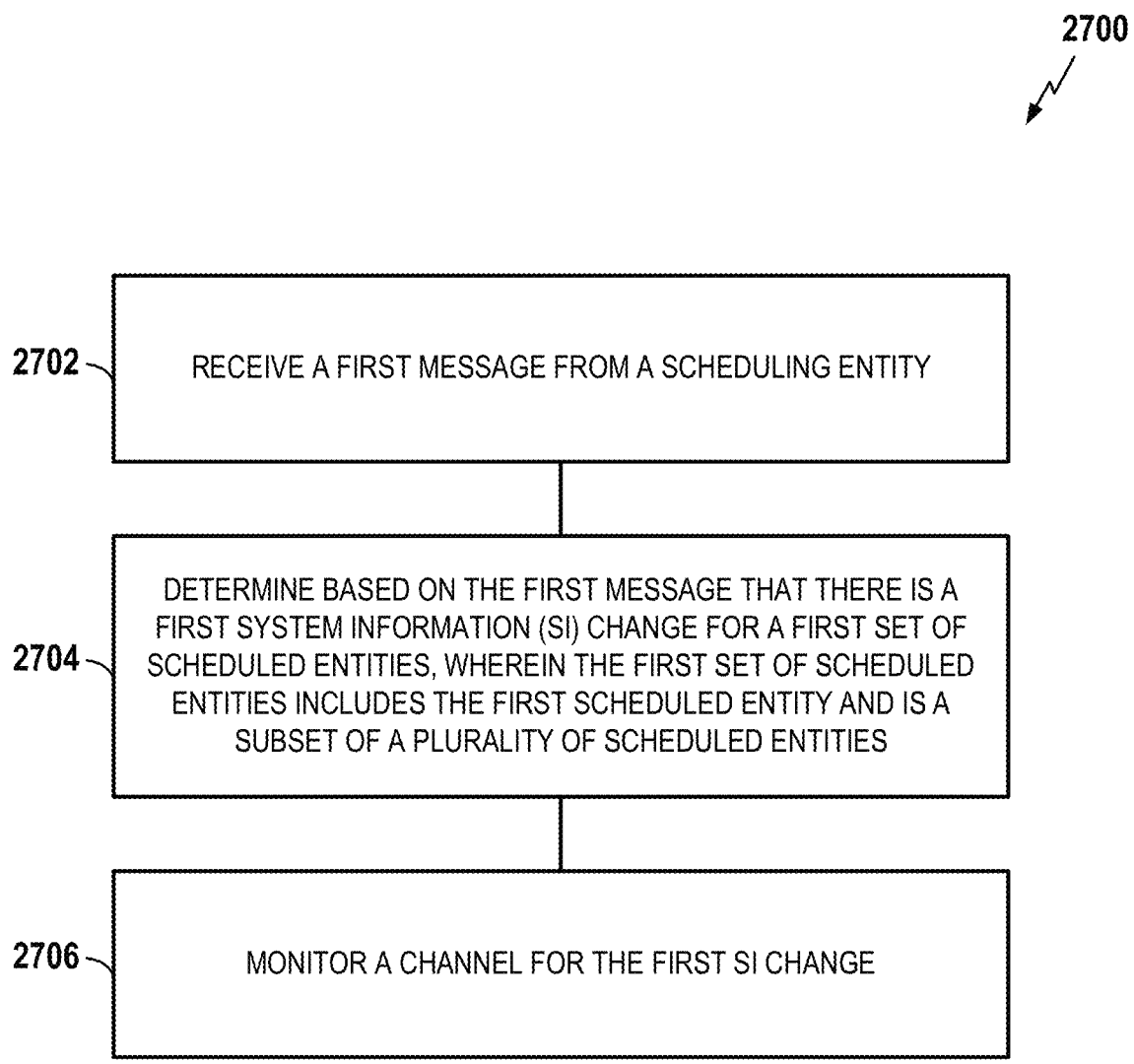
FIG. 27 is a flowchart illustrating an example process for determining an SI change according to some aspects.

FIG. 27 is a flow chart illustrating an example process 2700 for a wireless communication system in accordance with some aspects of the present disclosure. As described below, some or all illustrated features may be omitted in a particular implementation within the scope of the present disclosure, and some illustrated features may not be required for implementation of all examples. In some examples, the process 2700 may be carried out by the scheduled entity 2600 of FIG. 26. In some examples, the process 2700 may be carried out by any suitable apparatus or means for carrying out the functions or algorithm described below.

At block 2702, a scheduled entity (e.g., a UE) may receive a first message from a scheduling entity. For example, the paging processing circuitry 2643 together with the communication and processing circuitry 2641 and the transceiver 2610 may monitor a specified resource (e.g., a PDCCH) to determine whether a scheduling entity has transmitted a DCI.

In some examples, the first message may include a short message of a downlink control information (DCI). In some examples, the first SI modification field may include a systemInfoModification bit.

In some examples, the first message may include a downlink control information (DCI). In some examples, at least one bit of the DCI is repurposed for the first SI modification field. In some examples, the at least one bit may include at least one of a frequency domain resource assignment bit, a time domain resource assignment bit, a virtual resource block-to-physical resource block (VRB-to-PRB) mapping bit, a modulation and coding scheme (MCS) bit, a transport block scaling bit, or any combination thereof.

At block 2704, the scheduled entity may determine based on the first message that there is a first system information (SI) change for a first set of scheduled entities, wherein the first set of scheduled entities includes the first scheduled entity and is a subset of a plurality of scheduled entities. For example, the paging processing circuitry 2643 may determine that there is an SI change for a set of UEs or IAB nodes based on the contents of the first message, scrambling of the first message, or a resource on which the first message was received.

In some examples, determining based on the first message that there is the first SI change for the first set of scheduled entities may include determining based on at least one configuration of the first message (e.g., a bit included in the message or a P-RNTI used to scramble the message) that there is the first SI change for the first set of scheduled entities.

In some examples, determining based on the first message that there is the first SI change for the first set of scheduled entities may include determining based on at least one paging resource used for the receiving of the first message (e.g., a paging search space or a paging occasion on which the message is transmitted) that there is the first SI change for the first set of scheduled entities.

In some examples, the first message may include a first SI modification field allocated for paging the first set of scheduled entities. In some examples, the first message may include a second SI modification field allocated for paging a second set of scheduled entities of the plurality of scheduled entities. In some examples, determining based on the first message that there is the first SI change for the first set of scheduled entities may include determining based on the first SI modification field that there is the first SI change for the first set of scheduled entities.

At block 2706, the scheduled entity may monitor a channel for the first SI change. For example, the SI processing circuitry 2642 together with the communication and processing circuitry 2641 and the transceiver 2610, shown and described above in connection with FIG. 26, may monitor designated resources for SI transmissions by a scheduling entity and decode the SI transmissions to obtain new or modified SI information.

In some examples, the process may further include decoding the first message using a first paging-radio network temporary identifier (P-RNTI) of a plurality of P-RNTIs. In some examples, the first P-RNTI is allocated for paging the first set of scheduled entities. In some examples, a second P-RNTI of the plurality of P-RNTIs is allocated for paging a second set of scheduled entities of the plurality of scheduled entities. In some examples, the first set of scheduled entities is a subset of the second set of scheduled entities.

In some examples, the process may further include monitoring a first paging search space of a plurality of paging search spaces for the first message. In some examples, the first paging search space is allocated for paging the first set of scheduled entities. In some examples, a second paging search space of the plurality of paging search spaces is allocated for paging a second set of scheduled entities of the plurality of scheduled entities. In some examples, the process may further include receiving an indication that the first paging search space is allocated for paging the first set of scheduled entities.

In some examples, the process may further include selecting a first paging parameter of a plurality of paging parameters, wherein the first paging parameter is associated with the first set of scheduled entities. In some examples, the process may further include identifying a first paging occasion of a plurality of paging occasions based on the first paging parameter. In some examples, the process may further include monitoring the first paging occasion for the first message.

In some examples, the first paging parameter may include an nAndPagingFrameOffset parameter. In some examples, a second paging parameter of the plurality of paging parameters is associated with a second set of scheduled entities of the plurality of scheduled entities. In some examples, the process may further include receiving an indication that the first paging parameter is to be used for identifying the first paging occasion.

Figure 28:
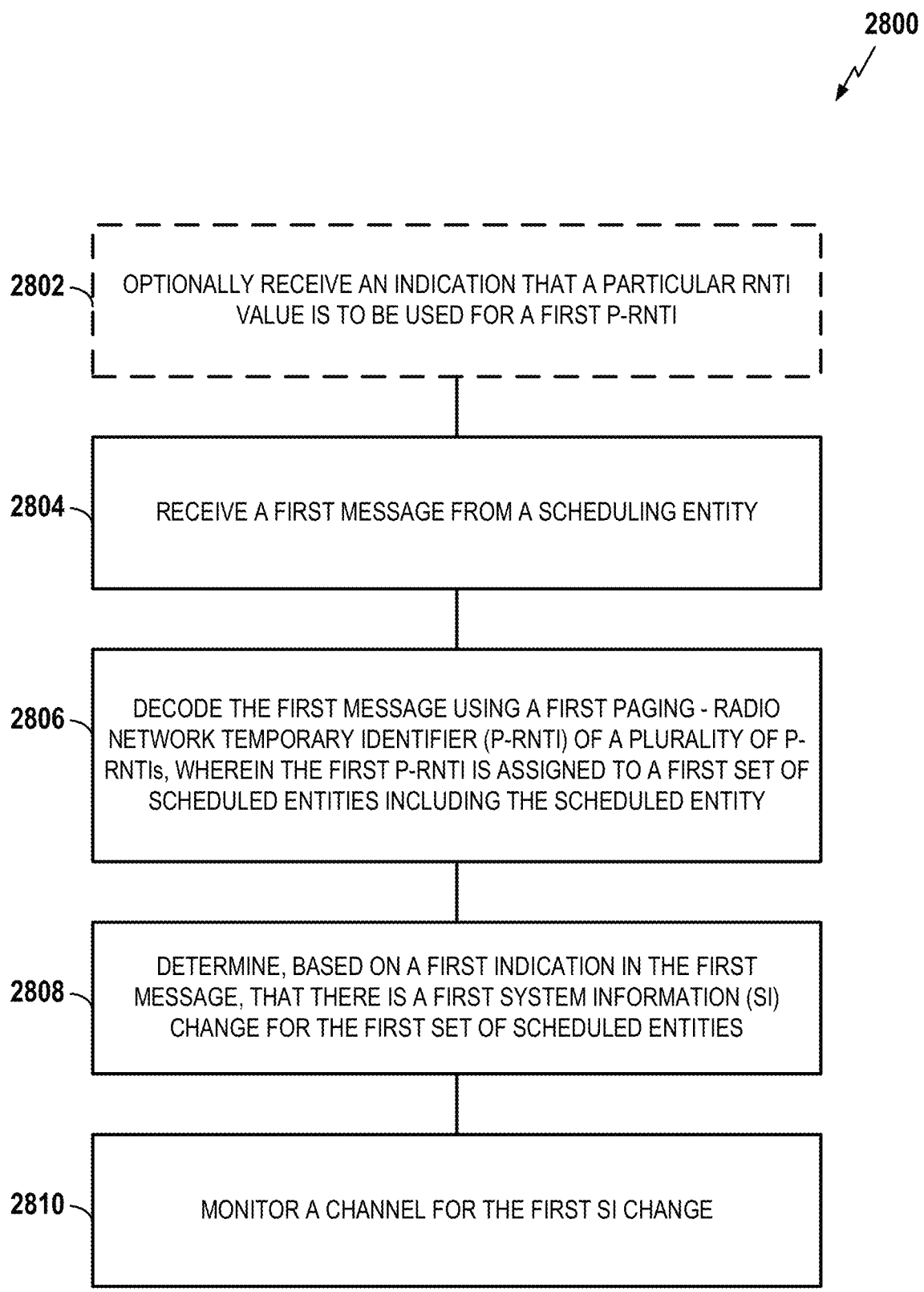
FIG. 28 is a flowchart illustrating an example process for using different P-RNTIs for indicating an SI change according to some aspects.

FIG. 28 is a flow chart illustrating an example process 2800 for a wireless communication system in accordance with some aspects of the present disclosure. In some examples, one or more aspects of the process 2800 may be implemented in conjunction with (e.g., as part of and/or in addition to) the process 2700 of FIG. 27. As described below, some or all illustrated features may be omitted in a particular implementation within the scope of the present disclosure, and some illustrated features may not be required for implementation of all examples. In some examples, the process 2800 may be carried out by the scheduled entity 2600 of FIG. 26. In some examples, the process 2800 may be carried out by any suitable apparatus or means for carrying out the functions or algorithm described below.

At optional block 2802, a scheduled entity (e.g., a UE) may receive an indication that a particular RNTI value is to be used for a first P-RNTI. For example, the paging processing circuitry 2643 together with the communication and processing circuitry 2641 and the transceiver 2610, shown and described above in connection with FIG. 26, may receive and parse a SIB or RRC message sent by a scheduling entity to obtain the indication.

At block 2804, the scheduled entity may receive a first message from a scheduling entity. For example, the paging processing circuitry 2643 together with the communication and processing circuitry 2641 and the transceiver 2610 may monitor a specified resource (e.g., a PDCCH) to determine whether a scheduling entity has transmitted a DCI.

At block 2806, the scheduled entity may decode the first message using a first paging-radio network temporary identifier (P-RNTI) of a plurality of P-RNTIs, wherein the first P-RNTI is assigned to a first set of scheduled entities including the scheduled entity. For example, the paging processing circuitry 2643 may use the first P-RNTI to descramble the DCI.

At block 2808, the scheduled entity may determine, based on a first indication in the first message, that there is a first system information (SI) change for the first set of scheduled entities. For example, the paging processing circuitry 2643 may parse the DCI to determine whether the DCI includes a short message (e.g., the short message of FIG. 7) indicating a change in SI.

At block 2810, the scheduled entity may monitor a channel for the first SI change. For example, the SI processing circuitry 2642 together with the communication and processing circuitry 2641 and the transceiver 2610, shown and described above in connection with FIG. 26, may monitor designated resources for SI transmissions by a scheduling entity and decode the SI transmissions to obtain new or modified SI information.

In some examples, the first set of scheduled entities may include at least one integrated access backhaul (IAB) node. In some examples, the first SI change may include a change in a random access channel (RACH) configuration for the at least one IAB node. In some examples, a second P-RNTI of the plurality of P-RNTIs is associated with (e.g., is assigned to) a second set of scheduled entities. In some examples, the second set of scheduled entities may include at least one user equipment (UE). In some examples, the first P-RNTI is exclusively reserved for the first set of scheduled entities. In some examples, the process further includes receiving an indication that a particular RNTI value is to be used for the first P-RNTI. In some examples, the process further includes receiving a second message from the scheduling entity, decoding the second message using a second P-RNTI of the plurality of P-RNTIs, wherein the second P-RNTI is assigned to a second set of scheduled entities that includes the scheduled entity, determining, based on a second indication in the second message, that there is a second SI change for the second set of scheduled entities, and monitoring the channel for the second SI change. In some examples, the first set of scheduled entities is a subset of the second set of scheduled entities. In some examples, the decoding of the first message may include descrambling a downlink control information (DCI) using the first P-RNTI, and obtaining the first indication from a short message of the DCI. In some examples, a process in accordance with the teachings herein may include any combination of the above operations.

Figure 29:
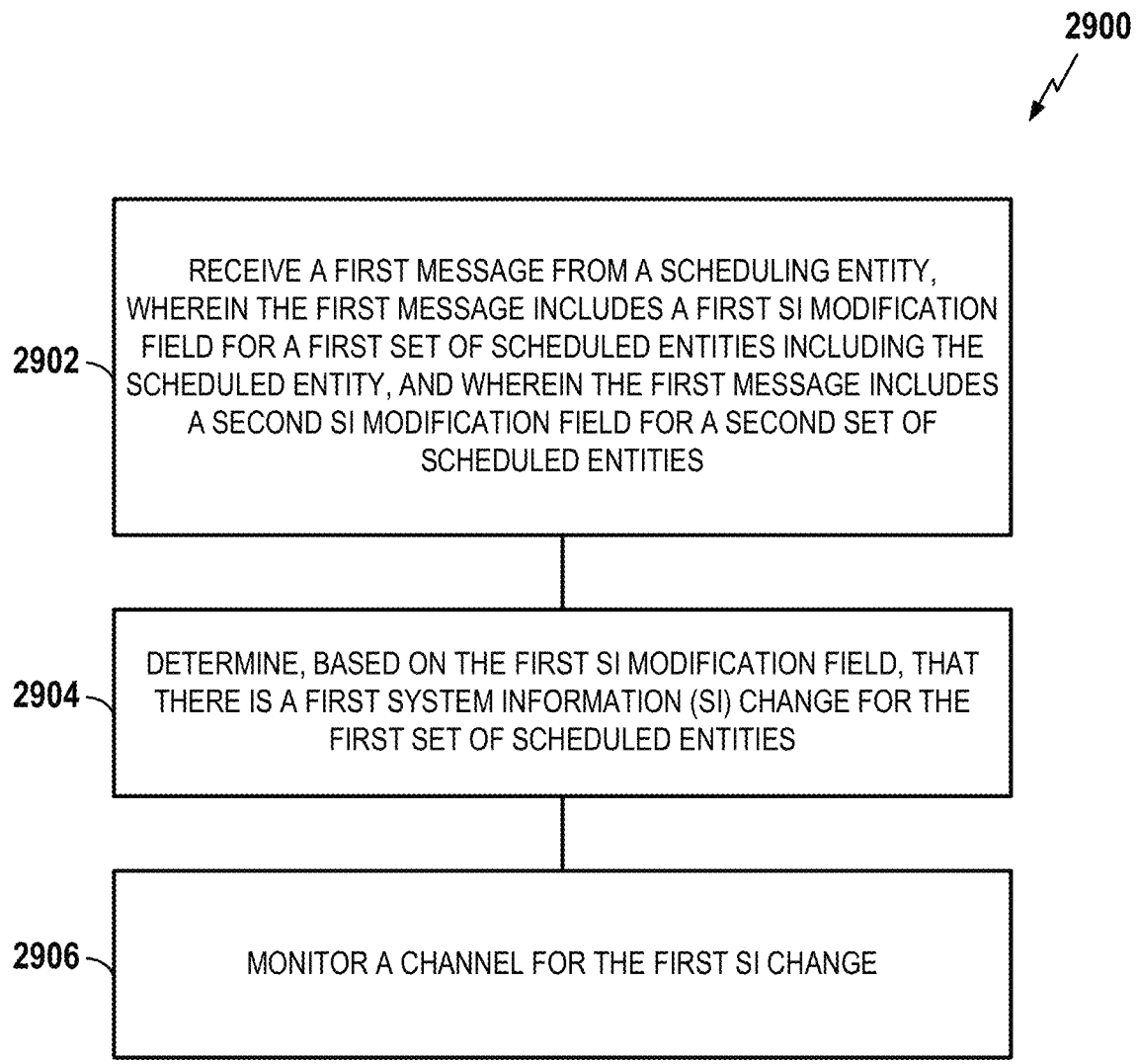
FIG. 29 is a flowchart illustrating an example process for using different bits for indicating an SI change according to some aspects.

FIG. 29 is a flow chart illustrating an example process 2900 for a wireless communication system in accordance with some aspects of the present disclosure. In some examples, one or more aspects of the process 2900 may be implemented in conjunction with (e.g., as part of and/or in addition to) the process 2700 of FIG. 27. As described below, some or all illustrated features may be omitted in a particular implementation within the scope of the present disclosure, and some illustrated features may not be required for implementation of all examples. In some examples, the process 2900 may be carried out by the scheduled entity 2600 of FIG. 26. In some examples, the process 2900 may be carried out by any suitable apparatus or means for carrying out the functions or algorithm described below.

At block 2902, a scheduled entity (e.g., a UE) may receive a first message from a scheduling entity, wherein the first message includes a first SI modification field for a first set of scheduled entities including the scheduled entity, and wherein the first message includes a second SI modification field for a second set of scheduled entities. For example, the paging processing circuitry 2643 together with the communication and processing circuitry 2641 and the transceiver 2610 may monitor a specified resource (e.g., a PDCCH) to determine whether a scheduling entity has transmitted a DCI.

At block 2904, the scheduled entity may determine, based on the first SI modification field, that there is a first system information (SI) change for the first set of scheduled entities. For example, the paging processing circuitry 2643 may parse the DCI to determine whether the DCI includes a short message (e.g., the short message of FIG. 7) indicating a change in SI.

At block 2906, the scheduled entity may monitor a channel for the first SI change. For example, the SI processing circuitry 2642 together with the communication and processing circuitry 2641 and the transceiver 2610, shown and described above in connection with FIG. 26, may monitor designated resources for SI transmissions by a scheduling entity and decode the SI transmissions to obtain new or modified SI information.

In some examples, the first set of scheduled entities may include at least one integrated access backhaul (IAB) node. In some examples, the second set of scheduled entities may include at least one user equipment (UE). In some examples, the first SI change may include a change in a random access channel (RACH) configuration for the at least one IAB node. In some examples, the first message may include a short message of a downlink control information (DCI). In some examples, the second SI modification field may include a systemInfoModification bit. In some examples, the first SI modification field may include at least one bit exclusively reserved in the short message for indicating SI changes for the first set of scheduled entities. In some examples, the first message may include a downlink control information (DCI). In some examples, the DCI may include a short message, and the second SI modification field may include a systemInfoModification bit of the short message. In some examples, at least one bit of the DCI is repurposed for the first SI modification field. In some examples, the at least one bit may include at least one of a frequency domain resource assignment bit, a time domain resource assignment bit, a virtual resource block-to-physical resource block (VRB-to-PRB) mapping bit, a modulation and coding scheme (MCS) bit, a transport block scaling bit, or any combination thereof. In some examples, the process further includes determining, based on the second SI modification field, that there is a second system information (SI) change for the second set of scheduled entities, wherein the second set of scheduled entities may include the scheduled entity, and monitoring the channel for the second SI change. In some examples, the first set of scheduled entities is a subset of the second set of scheduled entities. In some examples, a process in accordance with the teachings herein may include any combination of the above operations.

Figure 30:
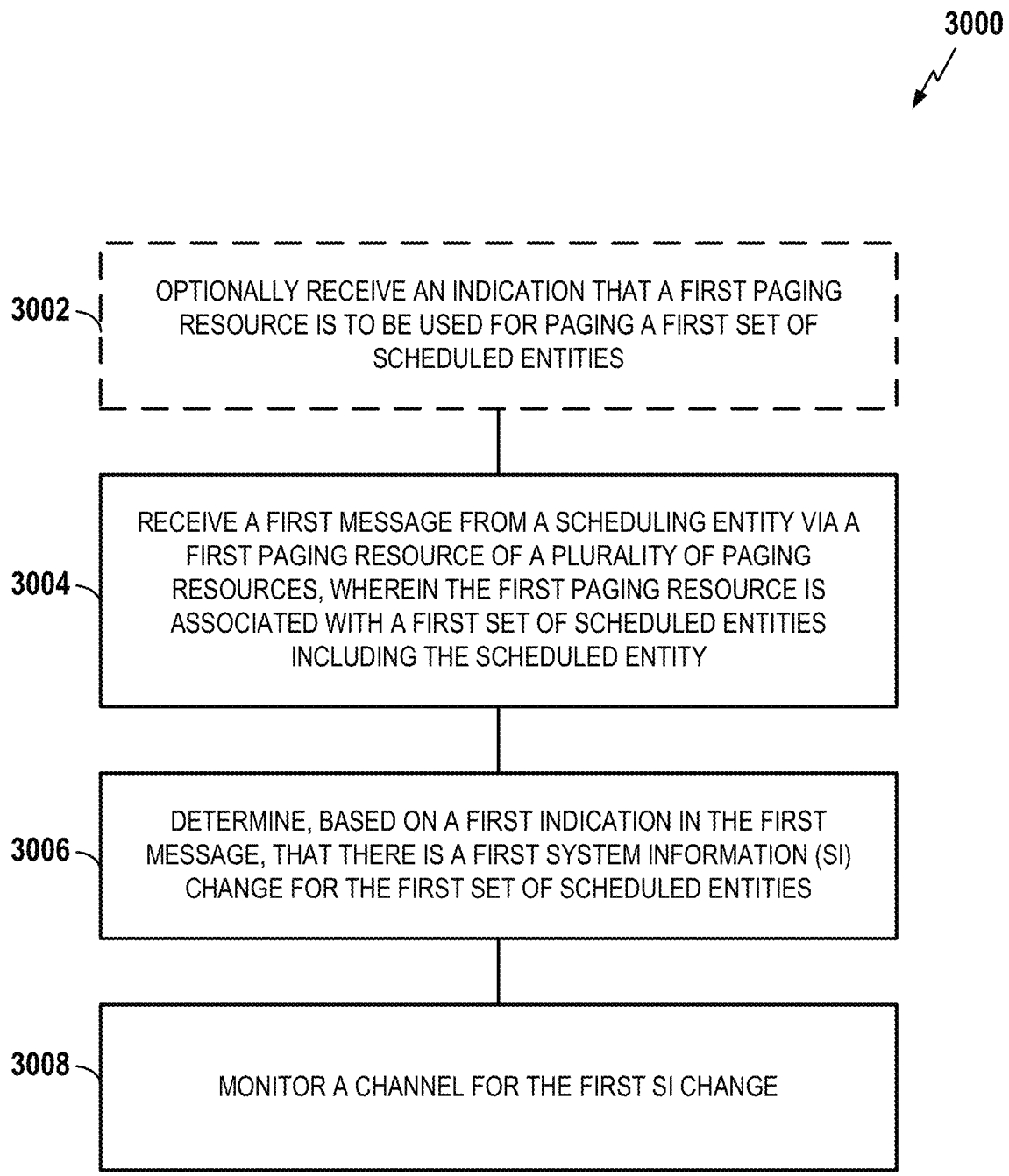
FIG. 30 is a flowchart illustrating an example process for using different paging resources for indicating an SI change according to some aspects.

FIG. 30 is a flow chart illustrating an example process 3000 for a wireless communication system in accordance with some aspects of the present disclosure. In some examples, one or more aspects of the process 3000 may be implemented in conjunction with (e.g., as part of and/or in addition to) the process 2700 of FIG. 27. As described below, some or all illustrated features may be omitted in a particular implementation within the scope of the present disclosure, and some illustrated features may not be required for implementation of all examples. In some examples, the process 3000 may be carried out by the scheduled entity 2600 of FIG. 26. In some examples, the process 3000 may be carried out by any suitable apparatus or means for carrying out the functions or algorithm described below.

At optional block 3002, a scheduled entity (e.g., a UE) may receive an indication that a first paging resource is to be used for paging a first set of scheduled entities. For example, the paging processing circuitry 2643 together with the communication and processing circuitry 2641 and the transceiver 2610, shown and described above in connection with FIG. 26, may receive and parse a SIB or RRC message sent by a scheduling entity to obtain the indication.

At block 3004, the scheduled entity may receive a first message from a scheduling entity via a first paging resource of a plurality of paging resources, wherein the first paging resource is associated with (e.g., is assigned to) a first set of scheduled entities including the scheduled entity. For example, the paging processing circuitry 2643 together with the communication and processing circuitry 2641 and the transceiver 2610 may monitor the designated paging resource associated with the first set of scheduled entities to determine whether a scheduling entity has transmitted a DCI.

At block 3006, the scheduled entity may determine, based on a first indication in the first message, that there is a first system information (SI) change for the first set of scheduled entities. For example, the paging processing circuitry 2643 may parse the DCI to determine whether one or more bits of the DCI (e.g., of a short message as in FIG. 7) indicate a change in SI.

At block 3008, the scheduled entity may monitor a channel for the first SI change. For example, the SI processing circuitry 2642 together with the communication and processing circuitry 2641 and the transceiver 2610, shown and described above in connection with FIG. 26, may monitor designated resources for SI transmissions by a scheduling entity and decode the SI transmissions to obtain new or modified SI information.

In some examples, the plurality of paging resources may include a plurality of paging search spaces, and the first paging resource may include a first paging search space of the plurality of paging search spaces. In some examples, a second paging search space of the plurality of paging search spaces is associated with a second set of scheduled entities. In some examples, the second set of scheduled entities may include at least one user equipment (UE). In some examples, the first message may include a short message of a downlink control information (DCI). In some examples, the process may further include receiving an indication that the first paging resource is to be used for paging the first set of scheduled entities.

In some examples, the process may further include selecting a first paging parameter of a plurality of paging parameters, wherein the first paging parameter is associated with the first set of scheduled entities, and determining the first paging resource based on the first paging parameter. In some examples, the first paging parameter may include an nAndPagingFrameOffset parameter. In some examples, the plurality of paging resources may include a plurality of paging opportunities, the first paging resource may include at least one first paging opportunity of the plurality of paging opportunities, and a second paging opportunity of the plurality of paging opportunities is associated with a second set of scheduled entities. In some examples, determining the first paging resource based on the first paging parameter may include determining, based on the first paging parameter, a number of total paging frames and a paging frame offset, and determining, based on the number of total paging frames and the paging frame offset, a system frame number for a paging frame.

In some examples, the first set of scheduled entities may include at least one integrated access backhaul (IAB) node. In some examples, the first SI change may include a change in a random access channel (RACH) configuration for the at least one IAB node. In some examples, a second paging search space of the plurality of paging search spaces is associated with (e.g., is assigned to) a second set of scheduled entities. In some examples, the second set of scheduled entities may include at least one user equipment (UE). In some examples, the first message may include a short message of a downlink control information (DCI). In some examples, the process further includes receiving an indication that the first paging search space is to be used for paging the first set of scheduled entities. In some examples, the process further includes receiving a second message from the scheduling entity via a second paging search space of the plurality of paging search spaces, wherein the second paging search space is associated with (e.g., is assigned to) a second set of scheduled entities, and wherein the second set of scheduled entities may include the scheduled entity, determining, based on a second indication in the second message, that there is a second system information (SI) change for the second set of scheduled entities, and monitoring the channel for the second SI change. In some examples, the first set of scheduled entities is a subset of the second set of scheduled entities. In some examples, a process in accordance with the teachings herein may include any combination of the above operations.

Figure 31:
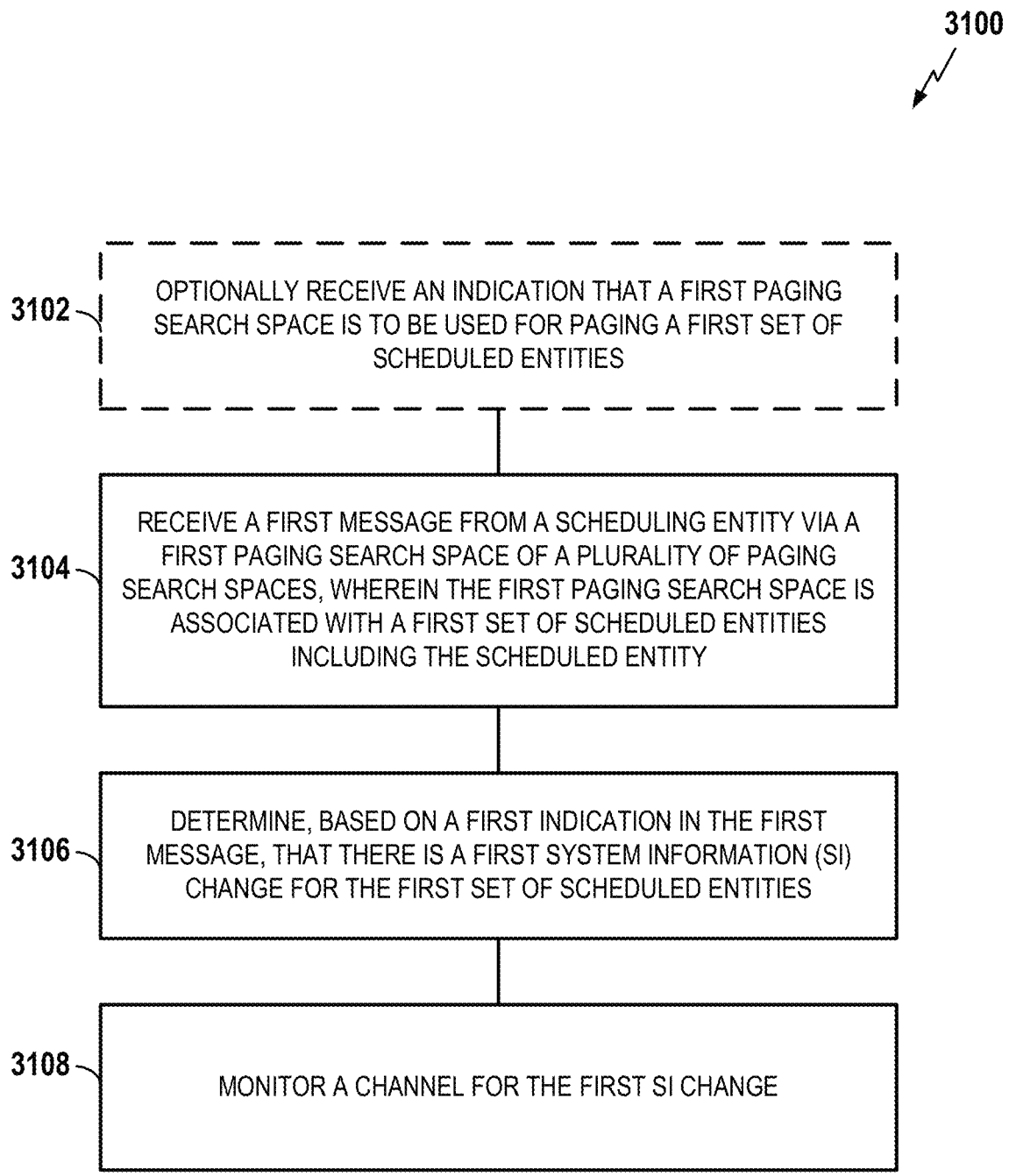
FIG. 31 is a flowchart illustrating an example process for using different paging search spaces for indicating an SI change according to some aspects.

FIG. 31 is a flow chart illustrating an example process 3100 for a wireless communication system in accordance with some aspects of the present disclosure. In some examples, one or more aspects of the process 3100 may be implemented in conjunction with (e.g., as part of and/or in addition to) the process 2700 of FIG. 27. As described below, some or all illustrated features may be omitted in a particular implementation within the scope of the present disclosure, and some illustrated features may not be required for implementation of all examples. In some examples, the process 3100 may be carried out by the scheduled entity 2600 of FIG. 26. In some examples, the process 3100 may be carried out by any suitable apparatus or means for carrying out the functions or algorithm described below.

At optional block 3102, a scheduled entity (e.g., a UE) may receive an indication that the first paging search space is to be used for paging the first set of scheduled entities. For example, the paging processing circuitry 2643 together with the communication and processing circuitry 2641 and the transceiver 2610, shown and described above in connection with FIG. 26, may receive and parse a SIB or RRC message sent by a scheduling entity to obtain the indication.

At block 3104, the scheduled entity may receive a first message from a scheduling entity via a first paging search space of a plurality of paging search spaces, wherein the first paging search space is associated with (e.g., is assigned to) a first set of scheduled entities including the scheduled entity. For example, the paging processing circuitry 2643 together with the communication and processing circuitry 2641 and the transceiver 2610 may monitor the designated paging search space associated with the first set of scheduled entities to determine whether a scheduling entity has transmitted a DCI.

At block 3106, the scheduled entity may determine, based on a first indication in the first message, that there is a first system information (SI) change for the first set of scheduled entities. For example, the paging processing circuitry 2643 may parse the DCI to determine whether one or more bits of the DCI (e.g., of a short message as in FIG. 7) indicate a change in SI.

At block 3108, the scheduled entity may monitor a channel for the first SI change. For example, the SI processing circuitry 2642 together with the communication and processing circuitry 2641 and the transceiver 2610, shown and described above in connection with FIG. 26, may monitor designated resources for SI transmissions by a scheduling entity and decode the SI transmissions to obtain new or modified SI information.

In some examples, the first set of scheduled entities may include at least one integrated access backhaul (IAB) node. In some examples, the first SI change may include a change in a random access channel (RACH) configuration for the at least one IAB node. In some examples, a second paging search space of the plurality of paging search spaces is associated with (e.g., is assigned to) a second set of scheduled entities. In some examples, the second set of scheduled entities may include at least one user equipment (UE). In some examples, the first message may include a short message of a downlink control information (DCI). In some examples, the process further includes receiving an indication that the first paging search space is to be used for paging the first set of scheduled entities. In some examples, the process further includes receiving a second message from the scheduling entity via a second paging search space of the plurality of paging search spaces, wherein the second paging search space is associated with (e.g., is assigned to) a second set of scheduled entities, and wherein the second set of scheduled entities may include the scheduled entity, determining, based on a second indication in the second message, that there is a second system information (SI) change for the second set of scheduled entities, and monitoring the channel for the second SI change. In some examples, the first set of scheduled entities is a subset of the second set of scheduled entities. In some examples, a process in accordance with the teachings herein may include any combination of the above operations.

Figure 32:
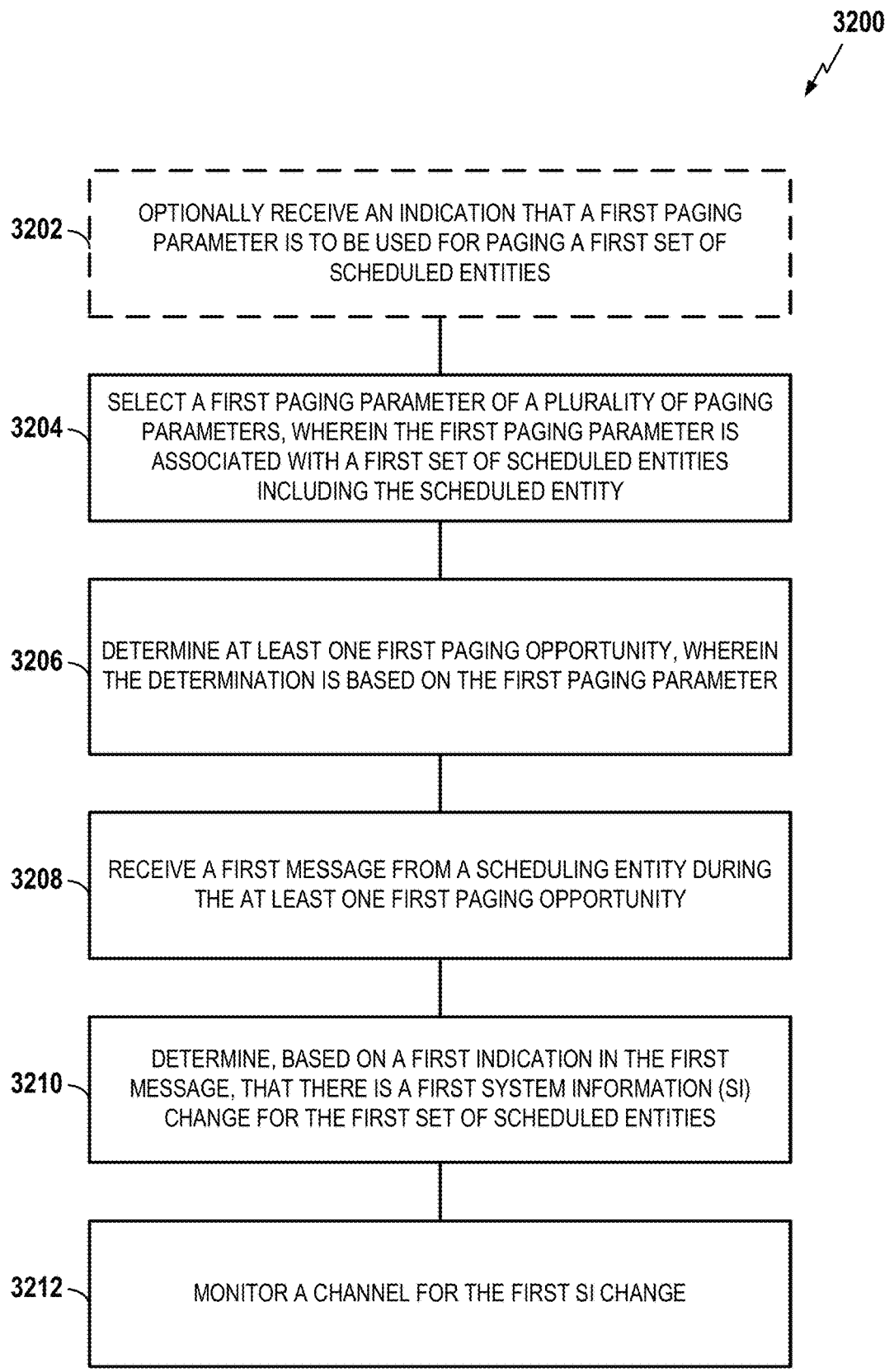
FIG. 32 is a flowchart illustrating an example process for using different paging parameters for indicating an SI change according to some aspects.

FIG. 32 is a flow chart illustrating an example process 3200 for a wireless communication system in accordance with some aspects of the present disclosure. In some examples, one or more aspects of the process 3200 may be implemented in conjunction with (e.g., as part of and/or in addition to) the process 2700 of FIG. 27. As described below, some or all illustrated features may be omitted in a particular implementation within the scope of the present disclosure, and some illustrated features may not be required for implementation of all examples. In some examples, the process 3200 may be carried out by the scheduled entity 2600 of FIG. 26. In some examples, the process 3200 may be carried out by any suitable apparatus or means for carrying out the functions or algorithm described below.

At optional block 3202, a scheduled entity (e.g., a UE) may receive an indication that the first paging parameter is to be used for paging the first set of scheduled entities. For example, the paging processing circuitry 2643 together with the communication and processing circuitry 2641 and the transceiver 2610, shown and described above in connection with FIG. 26, may receive and parse a SIB or RRC message sent by a scheduling entity to obtain the indication.

At block 3204, the scheduled entity may select a first paging parameter of a plurality of paging parameters, wherein the first paging parameter is associated with (e.g., is assigned to) a first set of scheduled entities including the scheduled entity. For example, the paging processing circuitry 2643 may select the first paging parameter based on the indication received at block 3202 or based on some other criterion (e.g., a preconfigured mapping between user classes and paging parameters, parameter calculation based on user classes, etc.).

At block 3206, the scheduled entity may determine at least one first paging opportunity, wherein the determination is based on the first paging parameter. For example, the paging processing circuitry 2643 may use the formula described above in conjunction with the fourth example implementation of FIG. 15 to calculate one or more paging opportunity locations based on the first paging parameter.

At block 3208, the scheduled entity may receive a first message from a scheduling entity during the at least one first paging opportunity. For example, the paging processing circuitry 2643 together with the communication and processing circuitry 2641 and the transceiver 2610 may monitor a paging search space during the at least one first paging opportunity associated with the first set of scheduled entities (determined at block 3206) to determine whether a scheduling entity has transmitted a DCI.

At block 3210, the scheduled entity may determine, based on a first indication in the first message, that there is a first system information (SI) change for the first set of scheduled entities. For example, the paging processing circuitry 2643 may parse the DCI to determine whether one or more bits of the DCI (e.g., of a short message as in FIG. 7) indicate a change in SI.

At block 3212, the scheduled entity may monitor a channel for the first SI change. For example, the SI processing circuitry 2642 together with the communication and processing circuitry 2641 and the transceiver 2610, shown and described above in connection with FIG. 26, may monitor designated resources for SI transmissions by a scheduling entity and decode the SI transmissions to obtain new or modified SI information.

In some examples, the first set of scheduled entities may include at least one integrated access backhaul (IAB) node. In some examples, the first SI change may include a change in a random access channel (RACH) configuration for the at least one IAB node. In some examples, a second paging opportunity of the plurality of paging opportunities is associated with (e.g., is assigned to) a second set of scheduled entities. In some examples, the second set of scheduled entities may include at least one user equipment (UE). In some examples, the first paging parameter may include an nAndPagingFrameOffset parameter. In some examples, the determination of the at least one first paging opportunity may include determining, based on the first paging parameter, a number of total paging frames and a paging frame offset, and determining, based on the number of total paging frames and the paging frame offset, a system frame number for a paging frame. In some examples, the first message may include a short message of a downlink control information (DCI). In some examples, the process further includes receiving an indication that the first paging parameter is to be used for paging the first set of scheduled entities. In some examples, the process further includes selecting a second paging parameter of the plurality of paging parameters, wherein the second paging parameter is associated with (e.g., is assigned to) a second set of scheduled entities, and wherein the second set of scheduled entities may include the scheduled entity, determining at least one second paging opportunity, wherein the determination of the at least one second paging opportunity is based on the second paging parameter, receiving a second message from the scheduling entity during the at least one second paging opportunity, determining, based on a second indication in the second message, that there is a second system information (SI) change for the second set of scheduled entities, and monitoring a channel for the second SI change. In some examples, the first set of scheduled entities is a subset of the second set of scheduled entities. In some examples, a process in accordance with the teachings herein may include any combination of the above operations.

The following provides an overview of several aspects of the present disclosure.

Aspect 1: A method for wireless communication at a user equipment, the method comprising: receiving a first message from a scheduling entity; determining based on the first message that there is a first system information (SI) change for a first set of scheduled entities, wherein the first set of scheduled entities includes the first scheduled entity and is a subset of a plurality of scheduled entities; and monitoring a channel for the first SI change.

Aspect 2: The method of aspect 1, wherein determining based on the first message that there is the first SI change for the first set of scheduled entities comprises: determining based on at least one configuration of the first message that there is the first SI change for the first set of scheduled entities.

Aspect 3: The method of aspect 1 or 2, wherein determining based on the first message that there is the first SI change for the first set of scheduled entities comprises: determining based on at least one paging resource used for the receiving of the first message that there is the first SI change for the first set of scheduled entities.

Aspect 4: The method of any of aspects 1 through 3, wherein: the first message comprises a first SI modification field allocated for paging the first set of scheduled entities; the first message further comprises a second SI modification field allocated for paging a second set of scheduled entities of the plurality of scheduled entities; and determining based on the first message that there is the first SI change for the first set of scheduled entities comprises determining based on the first SI modification field that there is the first SI change for the first set of scheduled entities.

Aspect 5: The method of aspect 4, wherein the first message comprises a short message of a downlink control information (DCI).

Aspect 6: The method of aspect 5, wherein the first SI modification field comprises a systemInfoModification bit.

Aspect 7: The method of any of aspects 4 through 6, wherein: the first message comprises a downlink control information (DCI); at least one bit of the DCI is repurposed for the first SI modification field; and the at least one bit comprises at least one of: a frequency domain resource assignment bit, a time domain resource assignment bit, a virtual resource block-to-physical resource block (VRB-to-PRB) mapping bit, a modulation and coding scheme (MCS) bit, a transport block scaling bit, or any combination thereof.

Aspect 8: The method of any of aspects 1 through 7, further comprising: decoding the first message using a first paging-radio network temporary identifier (P-RNTI) of a plurality of P-RNTIs, wherein the first P-RNTI is allocated for paging the first set of scheduled entities.

Aspect 9: The method of aspect 8, wherein a second P-RNTI of the plurality of P-RNTIs is allocated for paging a second set of scheduled entities of the plurality of scheduled entities.

Aspect 10: The method of aspect 9, wherein the first set of scheduled entities is a subset of the second set of scheduled entities.

Aspect 11: The method of any of aspects 1 through 10, further comprising: monitoring a first paging search space of a plurality of paging search spaces for the first message, wherein the first paging search space is allocated for paging the first set of scheduled entities.

Aspect 12: The method of aspect 11, wherein a second paging search space of the plurality of paging search spaces is allocated for paging a second set of scheduled entities of the plurality of scheduled entities.

Aspect 13: The method of any of aspects 11 through 12, further comprising: receiving an indication that the first paging search space is allocated for paging the first set of scheduled entities.

Aspect 14: The method of any of aspects 1 through 13, further comprising: selecting a first paging parameter of a plurality of paging parameters, wherein the first paging parameter is associated with the first set of scheduled entities; identifying a first paging occasion of a plurality of paging occasions based on the first paging parameter; and monitoring the first paging occasion for the first message.

Aspect 15: The method of aspect 14, wherein the first paging parameter comprises an nAndPagingFrameOffset parameter.

Aspect 16: The method of any of aspects 14 through 15, wherein a second paging parameter of the plurality of paging parameters is associated with a second set of scheduled entities of the plurality of scheduled entities.

Aspect 17: The method of any of aspects 14 through 16, further comprising: receiving an indication that the first paging parameter is to be used for identifying the first paging occasion.

Aspect 19: A method for wireless communication at a scheduling entity, the method comprising: determining that there is a first system information (SI) change for a first set of scheduled entities, wherein the first set of scheduled entities is a subset of a plurality of scheduled entities; generating a first message comprising a first indication of the first SI change; and transmitting the first message to the first set of scheduled entities.

Aspect 20: The method of aspect 19, wherein generating the first message comprises: generating the first message according to at least one configuration allocated for paging the first set of scheduled entities.

Aspect 21: The method of any of aspects 19 through 20, wherein transmitting the first message comprises: transmitting the first message on at least one paging resource allocated for paging the first set of scheduled entities.

Aspect 22: The method of any of aspects 19 through 21, wherein generating the first message comprises: generating the first message with a first SI modification field allocated for paging the first set of scheduled entities and a second SI modification field allocated for paging a second set of scheduled entities of the plurality of scheduled entities; and setting the first SI modification field to indicate the first SI change.

Aspect 23: The method of aspect 22, further comprising: determining that there is a second SI change for the second set of scheduled entities; and setting the second SI modification field to indicate the second SI change.

Aspect 24: The method of any of aspects 19 through 23, wherein: generating the first message comprises encoding the first message using a first paging-radio network temporary identifier (P-RNTI) of a plurality of P-RNTIs; and the first P-RNTI is allocated for paging the first set of scheduled entities.

Aspect 25: The method of aspect 24, further comprising: determining that there is a second SI change for a second set of scheduled entities of the plurality of scheduled entities; selecting a second P-RNTI of the plurality of P-RNTIs, wherein the second P-RNTI is allocated for paging the second set of scheduled entities; encoding a second message using the second P-RNTI, wherein the second message comprises a second indication of the second SI change; and transmitting the second message.

Aspect 26: The method of any of aspects 19 through 25, wherein: transmitting the first message comprises transmitting the first message via a first paging search space of a plurality of paging search spaces; and the first paging search space is allocated for paging the first set of scheduled entities.

Aspect 27: The method of aspect 26, further comprising: determining that there is a second SI change for a second set of scheduled entities of the plurality of scheduled entities; generating a second message comprising a second indication of the second SI change; and transmitting the second message via a second paging search space of the plurality of paging search spaces, wherein the second paging search space is allocated for paging the second set of scheduled entities.

Aspect 28: The method of any of aspects 19 through 27, wherein transmitting the first message comprises: selecting a first paging parameter of a plurality of paging parameters, wherein the first paging parameter is associated with the first set of scheduled entities; identifying a first paging occasion of a plurality of paging occasions based on the first paging parameter; and transmitting the first message via the first paging occasion.

Aspect 29: The method of aspect 28, further comprising: determining that there is a second SI change for a second set of scheduled entities of the plurality of scheduled entities; generating a second message comprising a second indication of the second SI change; selecting a second paging parameter of the plurality of paging parameters, wherein the second paging parameter is associated with the second set of scheduled entities; identifying a second paging occasion of the plurality of paging occasions based on the second paging parameter; and transmitting the second message via the second paging occasion.

Aspect 31: A scheduled entity comprising: a transceiver configured to communicate with a radio access network, a memory, and a processor communicatively coupled to the transceiver and the memory, wherein the processor and the memory are configured to perform any one of aspects 1 through 17.

Aspect 32: An apparatus configured for wireless communication comprising at least one means for performing any one of aspects 1 through 17.

Aspect 33: A non-transitory computer-readable medium storing computer-executable code, comprising code for causing an apparatus to perform any one of aspects 1 through 17.

Aspect 34: A scheduling entity comprising: a transceiver, a memory, and a processor communicatively coupled to the transceiver and the memory, wherein the processor and the memory are configured to perform any one of aspects 19 through 29.

Aspect 35: An apparatus configured for wireless communication comprising at least one means for performing any one of aspects 19 through 29.

Aspect 36: A non-transitory computer-readable medium storing computer-executable code, comprising code for causing an apparatus to perform any one of aspects 19 through 29.

In some examples, a method of communication at a scheduling entity is disclosed. The method includes, upon determining that there is an SI change for a first set of scheduled entities of a plurality of scheduled entities, selecting, from a plurality of paging-radio network temporary identifiers (P-RNTIs), a first P-RNTI that is assigned to the first set of scheduled entities. The scheduling entity may then generate a message that is associated with the first P-RNTI and includes an indication of the SI change and transmit the message (e.g., via a broadcast channel or in some other manner).

In some examples, a method of communication at a scheduled entity is disclosed. The method includes, upon receiving a message from a scheduling entity, decoding the message using a first P-RNTI of a plurality of P-RNTIs. The first P-RNTI is assigned to a first set of scheduled entities that includes the scheduled entity. The scheduled entity may determine, based on an indication in the message, that there is an SI change for the first set of scheduled entities and then monitor a channel for the SI change.

In some examples, a method of communication at a scheduling entity is disclosed. The method includes, upon determining that there is an SI change for a first set of scheduled entities of a plurality of scheduled entities, generating a message that includes a first SI modification field for the first set of scheduled entities and a second SI modification field for a second set of scheduled entities. The scheduling entity may then set the first SI modification field to indicate the SI change and transmit the message (e.g., via a broadcast channel or in some other manner).

In some examples, a method of communication at a scheduled entity is disclosed. The method includes receiving, from a scheduling entity, a message that includes a first SI modification field for a first set of scheduled entities and a second SI modification field for a second set of scheduled entities. Here, the first set of scheduled entities includes the scheduled entity. The scheduled entity may determine, based on the first SI modification field, that there is an SI change for the first set of scheduled entities and then monitor a channel for the SI change.

In some examples, a method of communication at a scheduling entity is disclosed. The method includes, upon determining that there is an SI change for a first set of scheduled entities of a plurality of scheduled entities, generating a first message that includes a first indication of the SI change and select, from a plurality of paging resources, a first paging resource (e.g., a paging search space, a paging opportunity, etc.) that is associated with the first set of scheduled entities. The scheduling entity may then transmit the first message via the first paging resource.

In some examples, a method of communication at a scheduled entity is disclosed. The method includes receiving a message from a scheduling entity via a first paging resource (e.g., a paging search space, a paging opportunity, etc.) of a plurality of paging resources. The first paging resource is associated with a first set of scheduled entities that includes the scheduled entity. The scheduled entity may determine, based on an indication in the message, that there is an SI change for the first set of scheduled entities and then monitor a channel for the SI change.

In some examples, a method of communication at a scheduling entity is disclosed. The method includes, upon determining that there is an SI change for a first set of scheduled entities of a plurality of scheduled entities, generating a first message that includes a first indication of the first SI change and select, from a plurality of paging search spaces, a first paging search space that is associated with the first set of scheduled entities. The scheduling entity may then transmit the first message via the first paging search space.

In some examples, a method of communication at a scheduled entity is disclosed. The method includes receiving a message from a scheduling entity via a first paging search space of a plurality of paging search spaces. The first paging search space is associated with a first set of scheduled entities that includes the scheduled entity. The scheduled entity may determine, based on an indication in the message, that there is an SI change for the first set of scheduled entities and then monitor a channel for the SI change.

In some examples, a method of communication at a scheduling entity is disclosed. The method includes, upon determining that there is an SI change for a first set of scheduled entities of a plurality of scheduled entities, generating a message that includes an indication of the SI change and select, from a plurality of paging parameters, a first paging parameter that is associated with the first set of scheduled entities. The scheduling entity may then determine at least one paging opportunity for the first set of scheduled entities based on the first paging parameter and transmit the message during the at least one paging opportunity.

In some examples, a method of communication at a scheduled entity is disclosed. The method includes selecting a first paging parameter of a plurality of paging parameters. Here, the selected first paging parameter is associated with a first set of scheduled entities that includes the scheduled entity. The scheduled entity may then determine, based on the first paging parameter, at least one paging opportunity. Upon receiving a message from a scheduling entity during the at least one paging opportunity, the scheduled entity may determine, based on a first indication in the message, that there is an SI change for the first set of scheduled entities and then monitor a channel for the SI change.

Several aspects of a wireless communication network have been presented with reference to example implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-32 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 8-16, and 26 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A method for wireless communication at a first scheduled entity, comprising:
    receiving a first message from a scheduling entity, the first message comprising a first system information (SI) modification field allocated for paging a first set of scheduled entities of a plurality of scheduled entities, the first message further comprising a second SI modification field allocated for paging a second set of scheduled entities of the plurality of scheduled entities; and
    monitoring a channel for a first SI change for the first set of scheduled entities in response to the first SI modification field indicating the first SI change, the first set of scheduled entities including the first scheduled entity and being a subset of the plurality of scheduled entities.

2. The method of claim 1, wherein determining that there is the first SI change for the first set of scheduled entities comprises:
    determining based on at least one configuration of the first message that there is the first SI change for the first set of scheduled entities.

3. The method of claim 1, wherein determining that there is the first SI change for the first set of scheduled entities comprises:
    determining based on at least one paging resource used for the receiving of the first message that there is the first SI change for the first set of scheduled entities.

4. The method of claim 1, wherein the first message comprises a short message of a downlink control information (DCI).

5. The method of claim 4, wherein the first SI modification field comprises a systemInfoModification bit.

6. The method of claim 1, wherein:
the first message comprises a downlink control information (DCI);
at least one bit of the DCI is repurposed for the first SI modification field; and
the at least one bit comprises at least one of: a frequency domain resource assignment bit, a time domain resource assignment bit, a virtual resource block-to-physical resource block (VRB-to-PRB) mapping bit, a modulation and coding scheme (MCS) bit, a transport block scaling bit, or any combination thereof.

7. The method of claim 1, further comprising:
decoding the first message using a first paging-radio network temporary identifier (P-RNTI) of a plurality of P-RNTIs,
wherein the first P-RNTI is allocated for paging the first set of scheduled entities.

8. The method of claim 7, wherein a second P-RNTI of the plurality of P-RNTIs is allocated for paging the second set of scheduled entities of the plurality of scheduled entities.

9. The method of claim 8, wherein the first set of scheduled entities is a subset of the second set of scheduled entities.

10. The method of claim 1, further comprising:
monitoring a first paging search space of a plurality of paging search spaces for the first message,
wherein the first paging search space is allocated for paging the first set of scheduled entities.

11. The method of claim 10, wherein a second paging search space of the plurality of paging search spaces is allocated for paging the second set of scheduled entities of the plurality of scheduled entities.

12. The method of claim 10, further comprising:
receiving an indication that the first paging search space is allocated for paging the first set of scheduled entities.

13. The method of claim 1, further comprising:
selecting a first paging parameter of a plurality of paging parameters, the first paging parameter being associated with the first set of scheduled entities;
identifying a first paging occasion of a plurality of paging occasions based on the first paging parameter; and
monitoring the first paging occasion for the first message.

14. The method of claim 13, wherein the first paging parameter comprises an nAndPagingFrameOffset parameter.

15. The method of claim 13, wherein a second paging parameter of the plurality of paging parameters is associated with the second set of scheduled entities of the plurality of scheduled entities.

16. The method of claim 13, further comprising:
receiving an indication that the first paging parameter is to be used for identifying the first paging occasion.

17. A first scheduled entity, comprising:
a transceiver;
a memory; and
a processor communicatively coupled to the transceiver and the memory, wherein the processor and the memory are configured to:
receive a first message from a scheduling entity via the transceiver, the first message comprising a first system information (SI) modification field allocated for paging a first set of scheduled entities of a plurality of scheduled entities, the first message further comprising a second SI modification field allocated for paging a second set of scheduled entities of the plurality of scheduled entities; and
monitor a channel for a first SI change for the first set of scheduled entities in response to the first SI modification field indicating the first SI change, the first set of scheduled entities including the first scheduled entity and being a subset of the plurality of scheduled entities.

18. A method for wireless communication at a scheduling entity, comprising:
generating a first message with a first system information (SI) modification field allocated for paging a first set of scheduled entities of a plurality of scheduled entities and a second SI modification field allocated for paging a second set of scheduled entities of the plurality of scheduled entities in response to determining that there is a first SI change for the first set of scheduled entities, the first set of scheduled entities being a subset of the plurality of scheduled entities;
setting the first SI modification field of the first message to indicate the first SI change; and
transmitting the first message.

19. The method of claim 18, wherein generating the first message comprises:
generating the first message according to at least one configuration allocated for paging the first set of scheduled entities.

20. The method of claim 18, wherein transmitting the first message comprises:
transmitting the first message on at least one paging resource allocated for paging the first set of scheduled entities.

21. The method of claim 18, further comprising:
determining that there is a second SI change for the second set of scheduled entities; and
setting the second SI modification field to indicate the second SI change.

22. The method of claim 18, wherein:
generating the first message comprises encoding the first message using a first paging-radio network temporary identifier (P-RNTI) of a plurality of P-RNTIs; and
the first P-RNTI is allocated for paging the first set of scheduled entities.

23. The method of claim 22, further comprising:
selecting a second P-RNTI of the plurality of P-RNTIs in response to determining that there is a second SI change for the second set of scheduled entities, the second P-RNTI being allocated for paging the second set of scheduled entities;
encoding a second message using the second P-RNTI, the second message comprising a second indication of the second SI change; and
transmitting the second message.

24. The method of claim 18, wherein:
transmitting the first message comprises transmitting the first message via a first paging search space of a plurality of paging search spaces; and
the first paging search space is allocated for paging the first set of scheduled entities.

25. The method of claim 24, further comprising:
generating a second message in response to determining that there is a second SI change for the second set of scheduled entities, the second message comprising a second indication of the second SI change; and
transmitting the second message via a second paging search space of the plurality of paging search spaces,
wherein the second paging search space is allocated for paging the second set of scheduled entities.

26. The method of claim 18, wherein transmitting the first message comprises:
- selecting a first paging parameter of a plurality of paging parameters, the first paging parameter being associated with the first set of scheduled entities;
- identifying a first paging occasion of a plurality of paging occasions based on the first paging parameter; and
- transmitting the first message via the first paging occasion.

27. The method of claim 26, further comprising:
- generating a second message in response to determining that there is a second SI change for the second set of scheduled entities, the second message comprising a second indication of the second SI change;
- selecting a second paging parameter of the plurality of paging parameters, the second paging parameter being associated with the second set of scheduled entities;
- identifying a second paging occasion of the plurality of paging occasions based on the second paging parameter; and
- transmitting the second message via the second paging occasion.

28. A scheduling entity, comprising:
- a transceiver;
- a memory; and
- a processor communicatively coupled to the transceiver and the memory, wherein the processor and the memory are configured to:
  - generate a first message with a first system information (SI) modification field allocated for paging a first set of scheduled entities of a plurality of scheduled entities and a second SI modification field allocated for paging a second set of scheduled entities of the plurality of scheduled entities in response to a determination that there is a first SI change for the first set of scheduled entities, the first set of scheduled entities being a subset of the plurality of scheduled entities;
  - set the first SI modification field of the first message to indicate the first SI change; and
  - transmit the first message via the transceiver.

* * * * *